(12) United States Patent
Maruyama

(10) Patent No.: US 11,971,696 B2
(45) Date of Patent: Apr. 30, 2024

(54) PROGRAMMABLE LOGIC CONTROLLER

(71) Applicant: Keyence Corporation, Osaka (JP)

(72) Inventor: Daisuke Maruyama, Osaka (JP)

(73) Assignee: KEYENCE CORPORATION, Osaka (JP)

(*) Notice: Subject to any disclaimer, the term of this patent is extended or adjusted under 35 U.S.C. 154(b) by 330 days.

(21) Appl. No.: 17/674,926

(22) Filed: Feb. 18, 2022

(65) Prior Publication Data
US 2022/0317648 A1 Oct. 6, 2022

(30) Foreign Application Priority Data
Apr. 1, 2021 (JP) ................................. 2021-062986

(51) Int. Cl.
G05B 19/05 (2006.01)
G06F 11/30 (2006.01)
G06F 11/32 (2006.01)

(52) U.S. Cl.
CPC ......... *G05B 19/056* (2013.01); *G05B 19/058* (2013.01); *G06F 11/3013* (2013.01); *G06F 11/322* (2013.01); *G06F 11/323* (2013.01)

(58) Field of Classification Search
None
See application file for complete search history.

(56) References Cited

U.S. PATENT DOCUMENTS

| | | | |
|---|---|---|---|
| 6,249,711 B1 * | 6/2001 | Aart | G05B 19/05 700/27 |
| 10,983,743 B2 | 4/2021 | Fujimura et al. | |
| 10,986,266 B2 | 4/2021 | Tsujikawa | |
| 11,188,048 B2 | 11/2021 | Miyasaka | |
| 2019/0018385 A1 | 1/2019 | Soneda et al. | |
| 2020/0125060 A1 | 4/2020 | Fujimura | |
| 2021/0103264 A1 | 4/2021 | Nakamura | |
| 2021/0103265 A1 | 4/2021 | Fujimura | |
| 2021/0240154 A1 | 8/2021 | Miyasaka | |
| 2021/0364996 A1 | 11/2021 | Miyasaka | |

FOREIGN PATENT DOCUMENTS

JP        201916325 A        1/2019

OTHER PUBLICATIONS

U.S. Appl. No. 17/674,919, filed Feb. 18, 2022 (95 pages).
U.S. Appl. No. 17/674,944, filed Feb. 18, 2022 (93 pages).

* cited by examiner

*Primary Examiner* — Ryan A Jarrett
(74) *Attorney, Agent, or Firm* — Kilyk & Bowersox, P.L.L.C.

(57) ABSTRACT

To provide a PLC having a data collection function and a data display screen generation function. The PLC includes: a collection section that collects a symbol value stored in a symbol, which is a device or a variable serving as a collection target, according to the application program; a determination section that determines whether or not the symbol value collected by the collection section according to the application program satisfies a normal condition set for the application program to detect a status different from usual regarding the symbol value; and a generation section that generates a display screen including a determination result of the determination section and information indicating the symbol value collected by the collection section according to the application program.

20 Claims, 38 Drawing Sheets

FIG. 14

MONITORING SETTING

APPLICATION NAME [PROCESS MONITORING] — 141

MONITORING SETTING | SYSTEM SETTING

MAXIMUM MONITORING TIME [**** SECONDS] — 142

SYNCHRONIZATION/ASYNCHRONIZATION [SYNCHRONOUS MODE ▽] — 143

| No. | MONITORING METHOD | ITEM NAME | START TRIGGER | END TRIGGER | MONITORING | CAUTION VALUE [ms] | | UPPER LIMIT | WARNING VALUE [ms] | | UPPER LIMIT |
|---|---|---|---|---|---|---|---|---|---|---|---|
| | | | | | | LOWER LIMIT | UPPER LIMIT | | LOWER LIMIT | UPPER LIMIT | |
| — | START DESIGNATION | WHOLE | MR000 ↑▽ | | ☐ | ☐ | ☐ | | ☐ | ☐ | |
| 1 | START/END DESIGNATION | CONVEYANCE | MR100 ↑▽ | MR101 ↑▽ | ☒ | ☐ 800 | ☐ 1200 | | ☒ 15000 | ☐ 17000 | |
| 2 | START/END DESIGNATION | PROCESSING | MR110 ↑▽ | MR111 ↑▽ | ☒ | ☒ 800 | ☐ 1200 | | ☒ 500 | ☒ 1500 | |
| 3 | START/END DESIGNATION | INSPECTION | MR120 ↑▽ | MR121 ↑▽ | ☒ | ☒ 800 | ☒ 1200 | | ☒ 500 | ☐ 1500 | |
| 4 | START/END DESIGNATION | DISCHARGE | MR130 ↑▽ | MR131 ↑▽ | ☒ | ☒ 800 | ☒ 1200 | | ☒ 500 | ☐ 1500 | |

145a / 145b / 145c / 145d / 145e / 145f / 145g

LANGUAGE SETTING — 146    [TRANSLATION] — 147

[SETTING SAVE] — 148    [SETTING READ] — 149

| ITEM | THRESHOLD | SELECTION | CALCULATION TECHNIQUE |
|---|---|---|---|
| CAUTION | UPPER LIMIT | ☑ | ±σ(68.3%) ▽ |
| | LOWER LIMIT | ☑ | ±σ(68.3%) ▽ |
| WARNING | UPPER LIMIT | ☑ | ±3σ(99.7%) ▽ |
| | LOWER LIMIT | ☑ | ±3σ(99.7%) ▽ |
| MASTER | | ☑ | AVERAGE VALUE ▽ |

THRESHOLD AUTOMATIC SETTING   DETAILS OF CONDITION

FIG. 16

MONITORING ITEM   MANUAL SETTING

[ON] ENABLE MONITORING

| MONITORING METHOD | START/END TRIGGER ▽ | |
|---|---|---|
| ITEM NAME | WHOLE CYCLE | |
| START TRIGGER | MR0 | ↑ ▽ |
| END TRIGGER | hogebar | ↑ ▽ |

FIG. 18

MONITORING SETTING

APPLICATION NAME [PROCESS MONITORING ▷]—141

| MONITORING SETTING | SYSTEM SETTING |

OPERATION AT TIME OF DETECTION
☑ SAVE OPERATION RECORD
    OPERATION RECORD ID [ID0 ▷]  — 161
☑ REGISTRATION IN CPU INPUT/ERROR — 162

DATA SETTING
☐ USE MEMORY CARD
    USED MEMORY CARD [BASIC UNIT ▷] — 163

HISTORY DATA
    AMOUNT OF CHART SAVING DATA [20] %
    NUMBER OF MAXIMUM SAVING PIECES [10] PIECES — 164

TREND DATA
☐ HOLD (DETAILS) — 165a
(DETAILS) — 165b (ADVANCED SETTING) — 166

MONITORING SETTING

APPLICATION NAME [TIMING MONITORING] ─ 141     [LANGUAGE SETTING] ─ 146  [TRANSLATION] ─ 147

MONITORING SETTING | SYSTEM SETTING

| | 145a | | 145b | 145c | 145d | 145e | 145h | 145f | | 145g | |
|---|---|---|---|---|---|---|---|---|---|---|---|
| No. | MONITORING METHOD | ITEM NAME | START TRIGGER | END TRIGGER | MONITORING | MAXIMUM MONITORING TIME | CAUTION VALUE [ms] | | WARNING VALUE [ms] | |
| | | | | | | | LOWER LIMIT | UPPER LIMIT | LOWER LIMIT | UPPER LIMIT |
| — | START DESIGNATION | WHOLE | MR000 ↑▶ | | ☑ | | ☐ | ☐ | ☐ | ☐ 17000 |
| 1 | START/END DESIGNATION | CONVEYANCE | MR100 ↑▶ | MR101 ↑▶ | ☑ | *** | ☐ | ☐ | ☑ 15000 | ☑ 1500 |
| 2 | START/END DESIGNATION | PROCESSING | MR110 ↑▶ | MR111 ↑▶ | ☑ | *** | ☑ 800 | ☑ 1200 | ☑ 500 | ☑ 1500 |
| 3 | START/END DESIGNATION | INSPECTION | MR120 ↑▶ | MR121 ↑▶ | ☑ | *** | ☑ 800 | ☑ 1200 | ☑ 500 | ☑ 1500 |
| 4 | START/END DESIGNATION | DISCHARGE | MR130 ↑▶ | MR131 ↑▶ | ☑ | *** | ☑ 800 | ☑ 1200 | ☑ 500 | ☑ 1500 |

[SETTING SAVE] ─ 148    [SETTING READ] ─ 149

FIG. 29

| MONITORING TECHNIQUE | | STATE DETERMINATION TECHNIQUE | | |
|---|---|---|---|---|
| | | UPPER AND LOWER LIMITS | PEAK (BOTTOM) UPPER AND LOWER LIMITS | CHANGE TIMING |
| | ONLY START TRIGGER | POSSIBLE (FIRST PATTERN) | POSSIBLE (FOURTH PATTERN) | POSSIBLE (FIFTH PATTERN) |
| | START TRIGGER/ END TRIGGER | POSSIBLE (SECOND PATTERN) | IMPOSSIBLE | IMPOSSIBLE |
| | START TRIGGER/ MONITORING TIME | POSSIBLE (THIRD PATTERN) | IMPOSSIBLE | IMPOSSIBLE |
| | CONSTANT MONITORING | | IMPOSSIBLE | IMPOSSIBLE |
| | SAMPLE TRIGGER | | | | ns to the outside of the PLC (JP 2019-016325 A).

PROGRAMMABLE LOGIC CONTROLLER

CROSS-REFERENCE TO RELATED APPLICATIONS

The present application claims foreign priority based on Japanese Patent Application No. 2021-062986, filed Apr. 1, 2021, the contents of which are incorporated herein by reference.

BACKGROUND OF THE INVENTION

1. Field of the Invention

The present invention relates to a programmable logic controller.

2. Description of Related Art

A programmable logic controller (PLC) is a controller that controls industrial machines such as manufacturing equipment, conveyance apparatuses, and inspection apparatuses in factory automation. The PLC controls various expansion units and controlled equipment by executing a user program such as a ladder program created by a programmer.

In order to monitor an operation of the PLC, it is proposed to collect data held by the PLC and monitor the data with a computer (PC) or an HMI (human interface: display apparatus) connected to the outside of the PLC (JP 2019-016325 A).

Meanwhile, in the invention of JP 2019 016325 A, information is collected in an IPC (industrial computer) provided outside the PLC, and it is not possible to collect necessary information only with the PLC and provide the information to a peripheral apparatus.

SUMMARY OF THE INVENTION

Therefore, an object of the present invention is to provide a PLC having a data collection function and a data display screen generation function.

The present invention provides, for example, a programmable logic controller including: a storage section that stores an application program; and an execution section that executes the application program. The execution section includes: a collection section that collects a symbol value stored in a symbol, which is a device or a variable serving as a collection target, according to the application program; an analysis section that determines whether or not the symbol value collected by the collection section according to the application program satisfies a normal condition set for the application program to detect a status different from usual regarding the symbol value; and a generation section that generates a display screen including a determination result of the determination section and information indicating the symbol value collected by the collection section according to the application program.

According to the present invention, the PLC having the data collection function and the data display screen generation function is provided.

BRIEF DESCRIPTION OF THE DRAWINGS

FIG. 14 is a diagram illustrating a setting wizard;
FIG. 15 is a diagram illustrating a threshold automatic setting;
FIG. 16 is a diagram illustrating a monitoring item setting screen;
FIG. 18 is a diagram illustrating the setting wizard;
FIG. 22 is a diagram illustrating the setting wizard;
FIG. 29 is a diagram illustrating a combination of a monitoring technique and a state determination technique.

DETAILED DESCRIPTION OF PREFERRED EMBODIMENTS

Hereinafter, an embodiment will be described in detail with reference to the accompanying drawings. Note that the following embodiment does not limit the invention according to the claims, and all combinations of characteristics described in the embodiment are not necessarily essential for the invention. Two or more characteristics of the plurality of characteristics described in the embodiment may be arbitrarily combined. In addition, the same or similar configurations are denoted by the same reference signs, and redundant descriptions thereof are omitted. A lower-case alphabet is sometimes added to ends of reference signs indicating the same or similar elements. When matters common to the plurality of elements are described, the lower-case alphabet is omitted <System Configuration>

First, in order to enable whose skilled in the art to better understand a programmable logic controller (PLC, which may be simply referred to as a programmable controller), a configuration of a general PLC and the operation thereof will be described.

Figure 1:
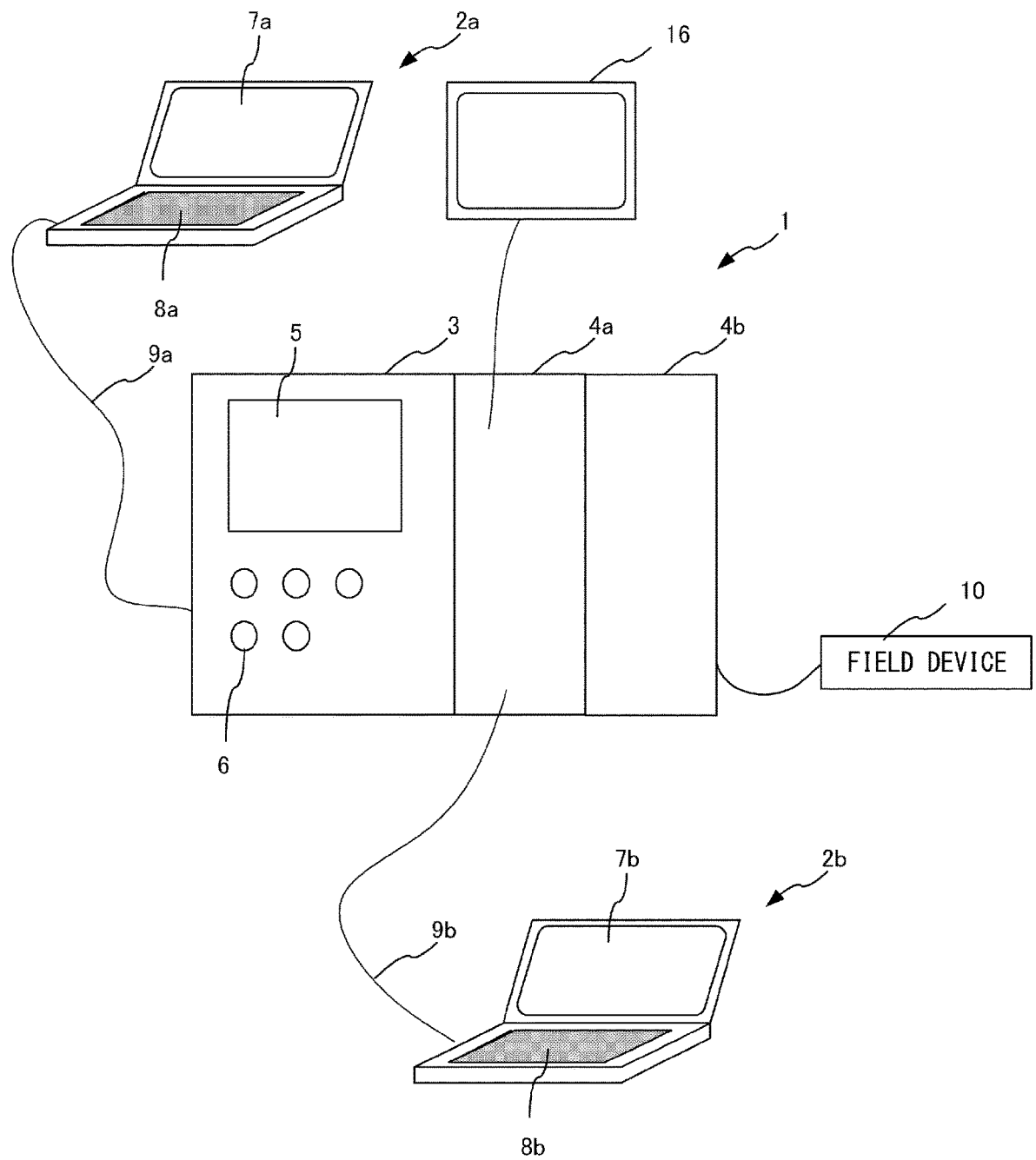
FIG. 1 is a diagram illustrating a PLC system.

FIG. 1 is a conceptual diagram illustrating a configuration example of a programmable logic controller system according to an embodiment of the present invention. As illustrated in FIG. 1, the system includes: a PC 2a configured to edit a user program such as a ladder program; and a PLC (programmable logic controller) 1 configured for the integrated control of various control apparatuses installed in a factory or the like. The PC is an abbreviation for personal computer. The user program may be created using a graphical programming language such as a ladder language and a flowchart-format motion program such as a sequential function chart (SFC), or may be created using a high-level programming language such as C language. Hereinafter, the user program executed by a basic unit 3 is assumed to be the ladder program for convenience of the description. The PLC 1 includes the basic unit 3 incorporating a CPU, and one or a plurality of expansion units 4. The one or plurality of expansion units 4 are detachable from the basic unit 3.

The basic unit 3 includes a display part 5 and an operation part 6. The display part 5 can display an operation status and the like of each of the expansion units 4 attached to the basic unit 3. The display part 5 switches a display content according to an operation content of the operation part 6. The display part 5 typically displays a current value (device value) of a device in the PLC 1, error information generated in the PLC 1, and the like. The device is a name indicating an area on a memory provided to store a device value (device data), and may be referred to as a device memory. The device value is information indicating an input state from input equipment, an output state to output equipment, or a state of an internal relay (auxiliary relay), a timer, a counter, a data memory, or the like set on the user program. Types of the device value include a bit type and a word type. The bit device stores a 1-bit device value. A word device stores a device value of one word. The PLC 1 may be configured to handle the variable in addition to the device. The device and the variable are referred to as symbols, and a value indicated by the symbol is referred to as a symbol value.

The expansion unit 4 is prepared for expanding a function of the PLC 1. A field device (controlled apparatus) 10 corresponding to a function of the expansion unit 4 is sometimes connected to each of the expansion units 4, whereby each field device 10 is connected to the basic unit 3 via the expansion unit 4. The field device 10 may be input equipment such as a sensor and a camera, or may be output equipment such as an actuator. In addition, a plurality of field devices may be connected to one expansion unit 4.

For example, the expansion unit 4b may be a positioning unit that drives a motor (the field device 10) to position a workpiece, or may be a counter unit. The counter unit counts a signal from an encoder (the field device 10) such as a manual pulsar.

The expansion unit 4a is a data collection unit that executes a flow to collect collection target data from the basic unit 3 and the expansion unit 4b, perform data processing on the collection target data to create display target data, and create display data for displaying a dashboard on the display part 7 or the PC 2. The basic unit 3 is sometimes also referred to as the CPU unit. Note that the system including the PLC 1 and the PC 2 may be referred to as the programmable logic controller system.

The PC 2a is a computer that is operated mainly by a programmer. On the other hand, the PC 2b is a computer that is operated by a field manager. The PC 2b may be a programmable display whose screen is set by a user. In this case, a screen displaying an analysis result or the like may be set by the user. A web browser function may be installed in advance in the programmable display, and the analysis result or the like may be displayed by the web browser function. The PC 2a may be referred to as a programming support apparatus (setting apparatus). The PC 2 is, for example, a portable notebook type or tablet type personal computer or a smartphone, and is an external computer including a display part 7 and an operation part 8. The external computer is a computer outside the PLC 1. The ladder program, which is an example of the user program configured to control the PLC 1, is created using the PC 2a. The created ladder program is converted into a mnemonic code in the PC 2a. The PC 2 is connected to the basic unit 3 of the PLC 1 via a communication cable 9 such as a universal serial bus (USB) cable. For example, the PC 2a sends the ladder program converted into the mnemonic code to the basic unit 3. The basic unit 3 converts the ladder program into a machine code and stores the machine code in a memory provided in the basic unit 3. Note that the mnemonic code is transmitted to the basic unit 3 here, the present invention is not limited thereto. For example, the PC 2a may convert the mnemonic code into an intermediate code, and send the intermediate code to the basic unit 3.

Note that the operation part 8 of the PC 2 may include a pointing device such as a mouse connected to the PC 2 although not illustrated in FIG. 1. In addition, the PC 2 may be configured to be detachably connected to the basic unit 3 of the PLC 1 via another communication cable 9 other than the USB cable. In addition, the PC 2 may be connected to the basic unit 3 of the PLC 1 by wireless communication without using the communication cable 9.

A human interface (HMI) 16 is a display apparatus that reads and displays information stored in a device or a buffer of the PLC 1. The HMI 16 may include, for example, a touch panel type input apparatus.

<Programming Support Apparatus>

Figure 2:
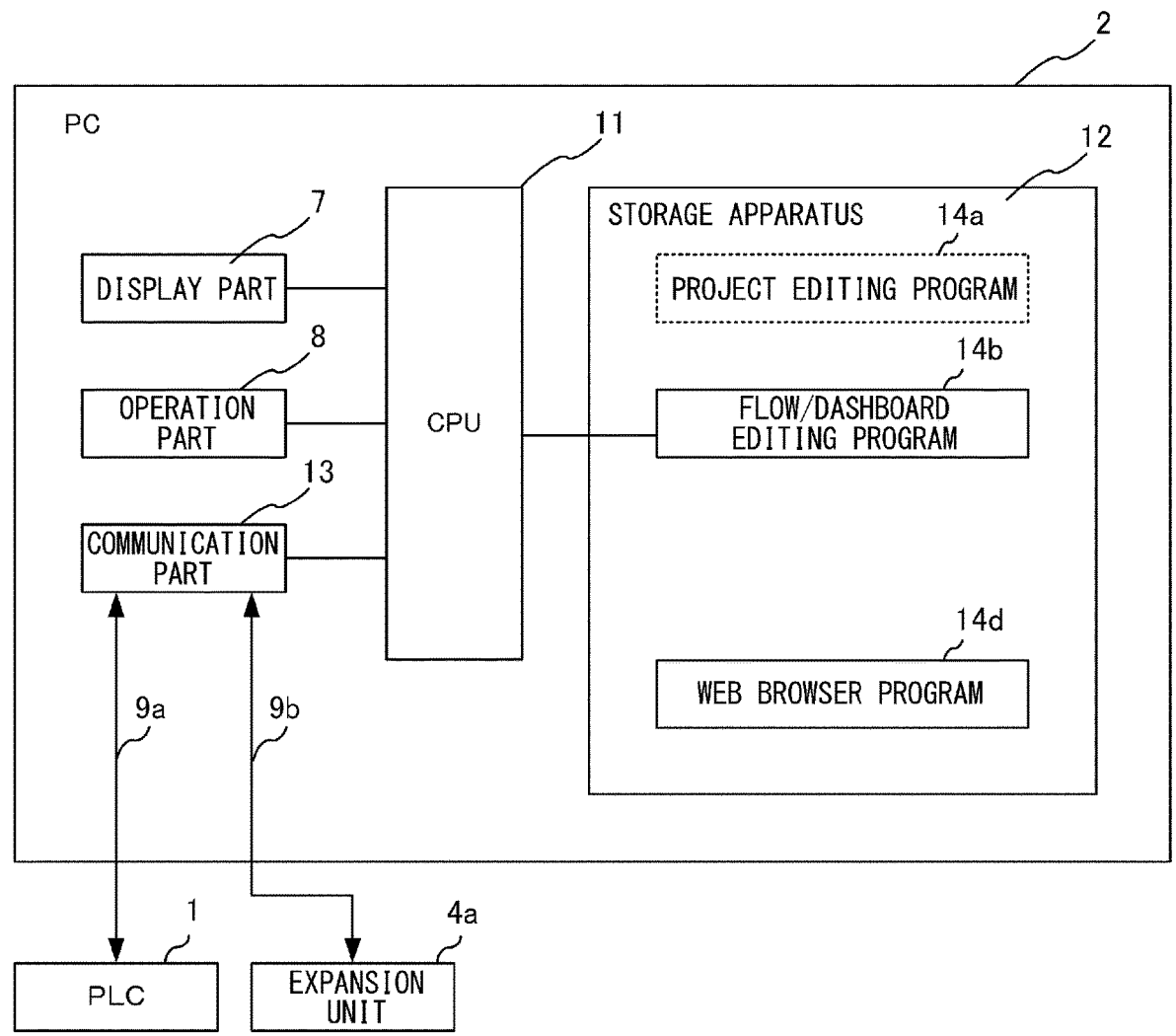
FIG. 2 is a diagram illustrating a PC.

FIG. 2 is a block diagram illustrating an electrical configuration of the PC 2. As illustrated in FIG. 2, the PC 2 includes a CPU 11, the display part 7, the operation part 8, a storage apparatus 12, and a communication part 13. The display part 7, the operation part 8, the storage apparatus 12, and the communication part 13 are electrically connected to the CPU 11. The storage apparatus 12 includes a RAM, a ROM, an HDD, and an SSD, and may further include a detachable memory card. The CPU is an abbreviation for central processing unit. The ROM is an abbreviation for read-only memory. The RAM is an abbreviation for random access memory. The HDD is an abbreviation for hard disk drive. The SSD is an abbreviation of solid state drive.

A user of the PC 2a causes the CPU 11 to execute a project editing program 14 stored in the storage apparatus 12, and edits project data through the operation part 8. That is, the PC 2a is an engineering tool and functions as the programming support apparatus. The project data includes one or more user programs (e.g., the ladder program, a control program, a motion program, and the data utilization program), configuration information of the basic unit 3 and the expansion unit 4, drawing data of WebHMI, setting information of specific functions provided in the basic unit 3 and the expansion unit 4, and the like. The configuration information is information indicating connection positions of the plurality of expansion units 4 with respect to the basic unit 3 or indicating functions provided in the basic unit 3 (e.g., a data collection function, a communication function, and a positioning function), and information indicating functions of the expansion unit 4 (e.g., a communication function, a positioning function, a photographing function) and the like. The drawing data is a display component group configured to implement WebHMI. The drawing data is achieved by markup data describing a structure of a front end (e.g., HTML data), style data describing a decoration (e.g., CSS data), and a code describing dynamic processing (e.g., JavaScript (registered trademark) code). Note that the front end refers to a portion that is directly visible to the user in a web page, a web service, and a web application. The style data describing the decoration may be provided, for example, in a file format. In this case, the style data may be called by a description that calls an external style data file in the markup data describing the structure. The code describing the dynamic processing may be provided, for example, in a file format. In this case, the code describing the dynamic processing may be called by a description that calls an external code file in the markup data describing the structure. The front end in a format that can call and use the external style data file and the external code file has high reusability and maintainability, and for example, a general-purpose front end component or the like can be used. When such a general-purpose and highly reusable web drawing technology is adopted, components can be reused in development of WebHMI and the like, and the maintainability of WebHMI and the like can be also improved. Hereinafter, the drawing data is referred to as a display component. The data utilization program includes a program configured to collect control data (such as device values) in the PLC 1, process data, and create data to be passed to WebHMI. The setting information of the specific function includes setting information related to the functions (e.g., data collection function, communication function, and positioning function) provided in the basic unit 3. For example, in the case of the data collection function, setting information on a data collection condition and a data collection target is included. Setting information related to the functions (e.g., communication function, positioning function, data utilization function, and photographing function) of the expansion unit 4 may also be included. Here, the editing of project data includes creating and changing (re-editing) of project data. The user can read project data stored in the storage apparatus 12 as necessary, and change this project data using the project editing program 14a. The communication part 13 communicates with the basic unit 3 via a communication cable 9a. The CPU 11 transfers the project data to the basic unit 3 via the communication part 13. The communication part 13 communicates with the expansion unit 4a via a communication cable 9b.

The CPU 11 may execute a flow/dashboard editing program 14b to create setting data of the flow (data utilization program) and the dashboard. The flow/dashboard editing program 14b may be a part of the project editing program 14a.

Figure 4:
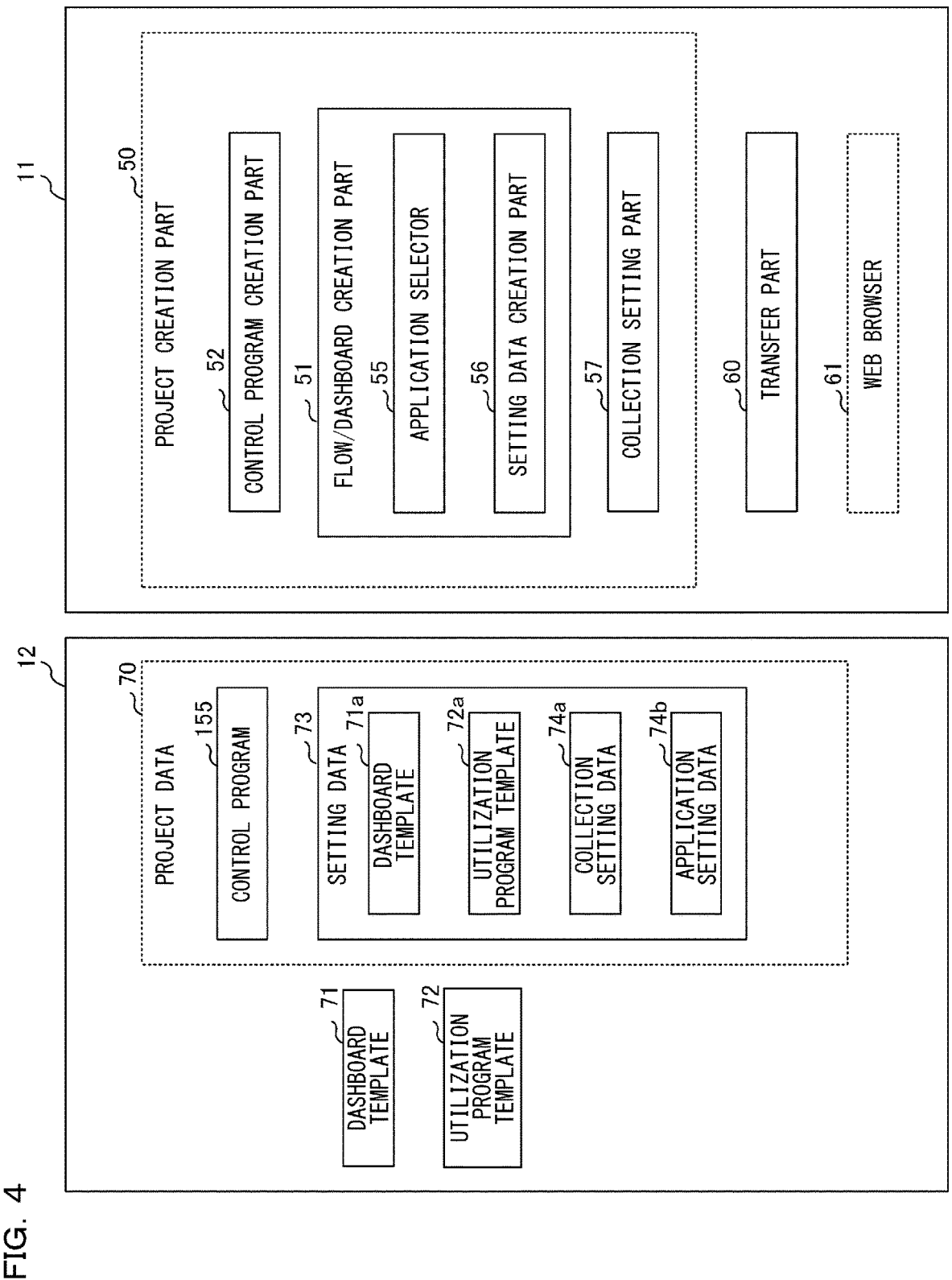
FIG. 4 illustrates functions implemented by a CPU of a programming support apparatus.

The CPU 11 may execute a web browser program 14d to function as a web browser 61 illustrated in FIG. 4. The web browser 61 may also be a part of the project editing program 14a. The web browser 61 displays a display screen (dashboard) provided by the PLC 1 on the display part 7. Note that the project editing program 14a or the flow/dashboard editing program 14b may incorporate the function of displaying the display screen (dashboard) provided by the PLC 1 on the display part 7. The CPU 11 transfers the setting data of the flow and dashboard to the expansion unit 4a via the communication part 13.

<PLC>

Figure 3:
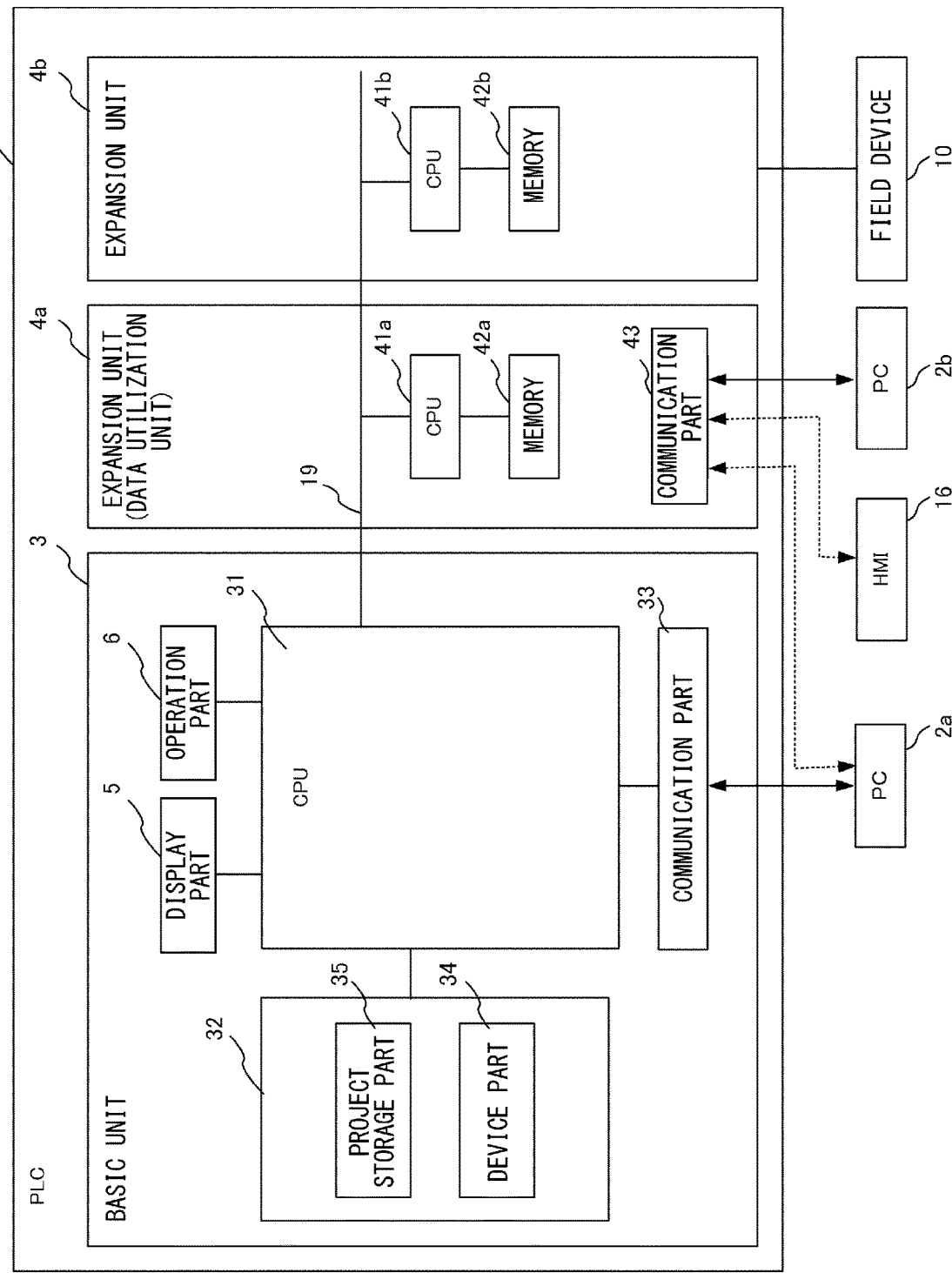
FIG. 3 is a diagram illustrating a PLC.

FIG. 3 is a block diagram illustrating an electrical configuration of the PLC 1. As illustrated in FIG. 3, the basic unit 3 includes a CPU 31, the display part 5, the operation part 6, a storage apparatus 32, and a communication part 33. The display part 5, the operation part 6, the storage apparatus 32, and the communication part 33 are electrically connected to the CPU 31. The storage apparatus 32 may include a RAM, a ROM, a memory card, and the like. The storage apparatus 32 includes a plurality of storage areas such as a device part 34 and a project storage part 35. The device part 34 includes a bit device, a word device, and the like, and each of the devices stores a device value. The project storage part 35 stores the project data input from the PC 2a. The storage apparatus 32 also stores a control program for the basic unit 3. As illustrated in FIG. 3, the basic unit 3 and the expansion unit 4 are connected via a unit internal bus 19 which is a type of expansion bus. Note that a communication function related to the unit internal bus 19 is mounted on the CPU 31, but may be mounted as a part of the communication part 33. The communication part 33 may include a network communication circuit. The CPU 31 receives the project data from the PC 2a via the communication part 33.

Here, the unit internal bus 19 will be supplementarily described. The unit internal bus 19 is a communication bus used for input/output refresh. The input/output refresh is processing of updating the device value between the basic unit 3 and the expansion unit 4. The input/output refresh is executed every time the ladder program is executed once (that is, every scan).

The expansion unit 4 includes a CPU 41 and a memory 42. A CPU 41b of the expansion unit 4b controls the field device 10 according to an instruction (device value) from the basic unit 3 stored in the device. In addition, the CPU 41b stores a control result of the field device 10 in a device called a buffer memory. The control result stored in the device is transferred to the basic unit 3 by the input/output refresh. In addition, the control result stored in the device is sometimes transferred to the basic unit 3 according to a read command from the basic unit 3 even at a different timing from the input/output refresh. The memory 42 includes a RAM, a ROM, and the like. In particular, a storage area used as the buffer memory is secured in the RAM. The memory 42 may have a buffer that temporarily holds data (e.g., still image data or moving image data) acquired by the field device 10.

A CPU 41a of the expansion unit 4a functioning as a data utilization unit (analysis unit) communicates with the PC 2a via a communication part 43 and the cable 9b. The communication part 43 includes a communication circuit that executes network communication. When an operation record analysis application is set as a data utilization application, the CPU 41a analyzes the device values collected in the basic unit 3 to create an analysis report including the analysis result. For example, the CPU 41a analyzes symbol values included in operation record data to identify an abnormal symbol and a time when the symbol has become abnormal, and create an analysis report including an analysis result in which the abnormal symbol and the time when the symbol has become abnormal are associated with each other. The operation record data includes information for reproducing a status around an operation record saving event occurrence time. Therefore, the operation record data may be managed in association with the analysis report. In addition, the operation record data includes symbol values of many symbols configured to reproduce the status around the operation record saving event occurrence time. Therefore, a data size of the operation record data is likely to be large. For example, the CPU 41a may read data necessary for the analysis report out of the operation record data and additionally save the read data as data for the analysis report in the operation record data. Here, the additional saving refers to, for example, saving the data for the analysis report, crated by reading and copying the data necessary for the analysis report from the operation record data and tagging the copied data, to be added in the operation record data. When data processing is applied, for example, by tagging the data in this manner, it becomes easier to create the analysis report.

The operation record data may include a camera image. In this case, the user can grasp the status around the operation record saving event occurrence time in more detail by reproducing the camera image. The analysis report may include a user interface (UI) for reproducing the camera image. The camera image has a large data size. Therefore, when a click or scroll operation is received in the UI for reproducing the camera image, only necessary camera image data may be partially downloaded. For example, when creating the analysis report, the CPU 41a may process the camera image according to the display order in the analysis report or generate index information indicating a correspondence relationship between a time and a saving position of the camera image. As a result, the CPU 41a may partially download the camera image corresponding to the display time (time of an internal clock for reproduction) at a high speed.

In a narrow sense, the analysis report means the analysis result itself, but, in a broad sense, the analysis report may mean a web application that displays the analysis result or a user interface thereof. The CPU 41a determines, for example, whether a device value is within a normal range, whether a timing at which the device value changes is within a normal range, and the like. Whether the timing at which the device value changes is within the normal range may be, for example, whether a length of a period during which the device value is "1" (ON) is within a normal range. In addition, it may be determined whether or not the number of changes of a device value in a certain process or cycle is within a normal range. When a device value collected from a certain device does not satisfy a normal condition, the device may be called an abnormal device because the device behaves differently from usual. The CPU 41a may create an analysis report in a web format and provide the analysis report to the web browser of the PC 2b via the communication part 43 and the communication cable 9b.

The data utilization unit is an expansion unit that executes the data utilization applications. The data utilization applications include a data utilization program (e.g., flow) that collects control data and performs data processing, and a dashboard that displays an execution result of the data utilization program. Here, the flow is adopted as an example of the data utilization program, but a user program in another language may be adopted. The flow may have a calculation block that collects data, a calculation block that executes data processing, and a calculation block that creates display data. The dashboard includes a graph display component and a numerical display component. The analysis report may include a graph display component, a numerical value display component, or the like. These display components may be achieved by markup data describing a structure of a front end, style data describing a decoration, a code describing dynamic processing, and the like. In the present embodiment, the flow is achieved by a flow template. The flow template is prepared for each application in advance and has one or more calculation blocks in which parameters designated by the user are set. The dashboard is also achieved by a template. The dashboard template has one or more display components in which parameters designated by the user are set. The parameters are a wide variety of types of information, for example, a dashboard name, a device name, a numerical value, a name of a unit variable, and the like. The unit variable is a variable configured for the expansion unit 4a to hold an execution result of the flow.

The CPU 41a stores the setting data of the flow and dashboard received from the PC 2a in a memory 42a. The CPU 41a executes the flow according to the setting data, collects a device value, and creates display data to be displayed on the dashboard. The CPU 41a communicates with the PC 2b via the communication part 43 and the cable 9b. The CPU 41a transmits the display data of the dashboard to the PC 2b. As a result, the PC 2b displays the dashboard including various types of data related to the PLC 1.

The HMI 16 may also be connected to the communication part 43 and communicate with the CPU 41a via the communication part 43. The CPU 41a stores the display data in a predetermined buffer or device. The HMI 16 reads the display data from the predetermined buffer or device and displays the display data.

FIG. 4 is a diagram illustrating functions implemented by the CPU 1ib of the PC 2a. A project creation part 50 is a function implemented as the CPU 11 executes the project editing program 14a. The project creation part 50 includes a control program creation part 52, a flow/dashboard creation part 51, and a collection setting part 57. The project creation part 50 creates project data 70 including a user program such as a ladder program according to a user instruction input through the operation part 8.

The control program creation part 52 creates a control program 155 such as a ladder program to be executed by the CPU 31 according to a user instruction input through the operation part 8. The control program 155 is stored in the storage apparatus 12 as a part of the project data 70.

The flow/dashboard creation part 51 is a function implemented as the CPU 11 executes the flow/dashboard editing program 14b. The flow/dashboard creation part 51 includes an application selector 55 and a setting data creation part 56. The application selector 55 displays a selection screen, which supports the user to select one application from a plurality of applications (data utilization programs), on the display part 7, and receives the selection of the application by the user. As the applications, there may be a real-time monitoring application that monitors a device or a variable, which is a monitoring target, in real time, an operation record analysis application that analyzes an operation record for reproducing an operation state of the PLC 1 and generates an analysis report, and the like. In addition, there may be a calculation application that calculates a key performance indicator (KPI), such as a utilization rate, a non-defective product rate, and a cycle time, and the like as the application.

The setting data creation part 56 creates application setting data 74b including a parameter related to the application (data utilization program) selected by the user and a parameter related to a display setting of the dashboard according to a user instruction. Examples of the parameter include a monitoring target device or variable, a monitoring item name (e.g., a name of a process), a monitoring condition per monitoring target, an interpretation target file, an interpretation target device, an interpretation target period, a display target, a display component name, a unit, and the like. The setting data creation part 56 may provide the PLC 1 with information necessary for creating the application setting data 74b in a file format such as CSV. A setting part 78 may read the provided file such as CSV and create the application setting data 74b. The setting data creation part 56 extracts a template for displaying the dashboard selected by the user. For example, a dashboard template 71a is extracted from a dashboard template 71 and saved in setting data 73. The dashboard template 71 has various display components (graph modules) configured to achieve the dashboard. The setting data creation part 56 extracts a template of a data utilization program which executes data processing necessary for displaying data on the dashboard selected by the user For example, a utilization program template 72a is extracted from a utilization program template 72 and saved in the setting data 73. The utilization program template 72 has a calculation component (program module) configured to execute the data processing. The setting data creation part 56 creates the setting data 73 including the dashboard template, the template of the data utilization program, and the application setting data 74b set in these templates, and stores the setting data 73 in the storage apparatus 12. Note that the setting data creation part 56 may create collection setting data 74a including a collection target device or variable, a collection condition, and the like.

The setting data creation part 56 may create another application that refers to a measurement result of a monitoring target calculated in a real-time monitoring application. The measurement result of the monitoring target calculated by the real-time monitoring application is output to a predetermined variable per measurement result. The setting data creation part 56 sets the other application or an application newly created by the user so as to refer to the variable indicating the measurement result. Examples of the measurement result of the monitoring target calculated in the real-time monitoring application may include time results, such as a processing time of each process, a time between a preceding process and a subsequent process, and a time indicating a length of the whole process, a characteristic amount of time-series data (waveform data), a characteristic amount of a camera image, and the like. The setting data creation part 56 may set a dashboard, to be created by the user, so as to refer to the variable indicating the measurement result. Note that the measurement result of the monitoring target calculated in the real-time monitoring application may be stored in a database. This may be achieved by linking the real-time monitoring application with a database function.

The collection setting part 57 defines an operation of collecting a device or a variable according to a user instruction. Furthermore, the collection setting part 57 creates the collection setting data 74a including the collection target device or variable, the collection condition, and the like. The collection setting data 74a may be included in the setting data 73. The collection setting part 57 and the setting data creation part 56 may be integrated into one.

The transfer part 60 transfers the project data 70 to the basic unit 3 or transfers the setting data 73 to the expansion unit 4a. The web browser 61 is implemented as the CPU 11 executes the web browser program 14d.

Figure 5:
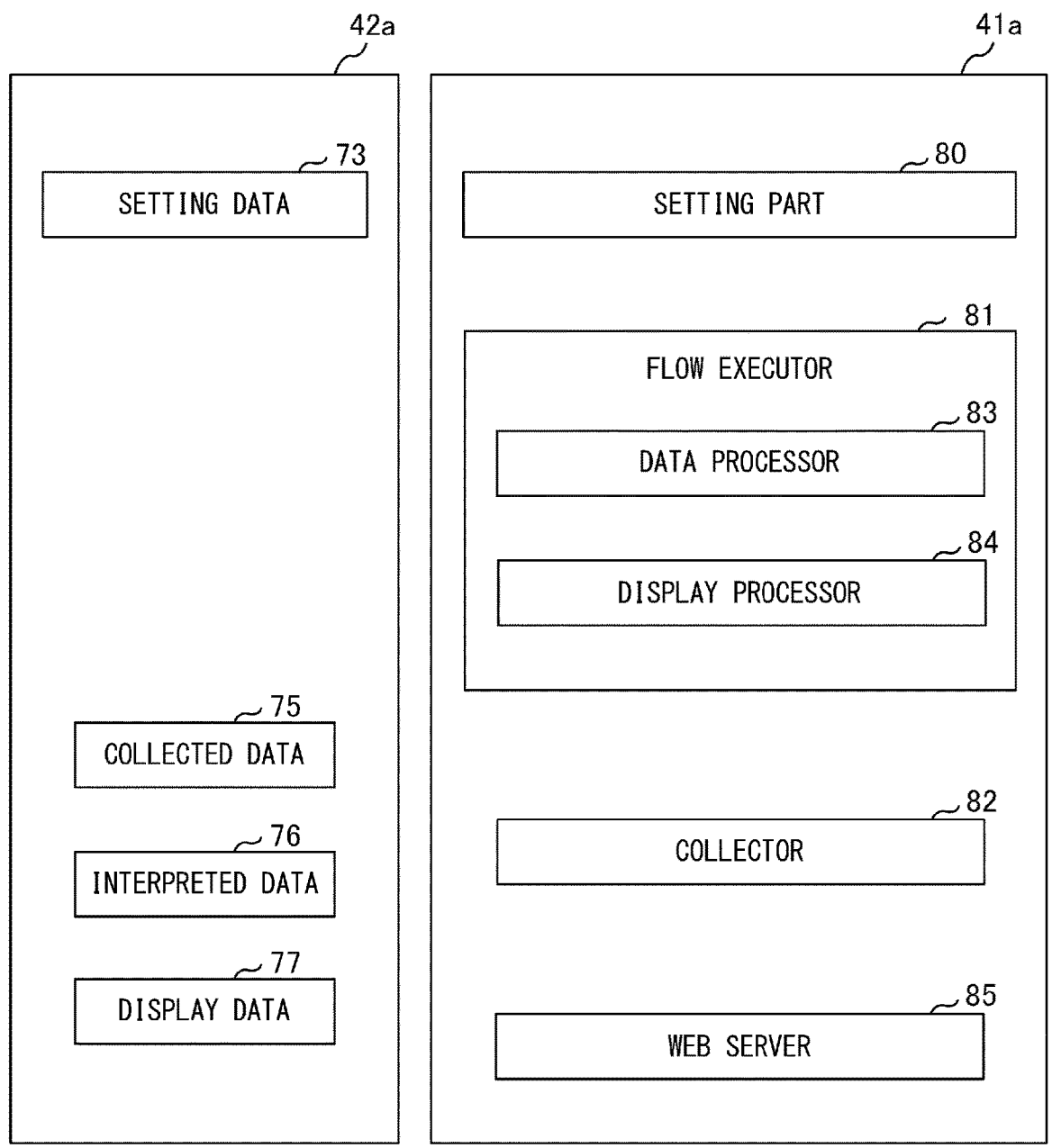
FIG. 5 illustrates functions implemented by a CPU of an expansion unit (data utilization unit)

FIG. 5 illustrates functions implemented by the CPU 41a of the expansion unit 4a. Some or all of the functions of the expansion unit 4a to be described below may be mounted on the basic unit 3. A setting part 80 stores the setting data 73 received from the PC 2a in the memory 42a. The setting part 80 may set which device value needs to be collected for the basic unit 3 according to the setting data 73. The setting data 73 includes the dashboard template 71a, the utilization program template 72a, the collection setting data 74a, and the application setting data 74b. The collection setting data 74a may be passed from the PC 2a to the expansion unit 4a in a state of being assigned to the dashboard template 71a and the utilization program template 72a, or may be passed from the PC 2a to the expansion unit 4a in a state of being separated from the dashboard template 71a and the utilization program template 72a. A flow executer 81 is a function implemented as the CPU 41a executes the flow in the utilization program template 72a according to the collection setting data 74a. The collector 82 collects a device value designated by the collection setting data 74a from the basic unit 3 and the expansion unit 4b, creates collected data 75, and stores the collected data 75 in the memory 42a. A data processor 83 applies the data processing designated by the collection setting data 74a to the collected data 75, creates interpreted data 76, and stores the interpreted data 76 in the memory 42a. A display processor 84 creates dashboard display data 77 (e.g., HTML data and image data, a cascading style sheet (CSS), and JavaScript (registered trademark) code) based on the dashboard template 71a designated by the application setting data 74b and the display target data. A web server 85 provides the dashboard display data 77 to the web browser 61 such as the PC 2b.

Figure 6:
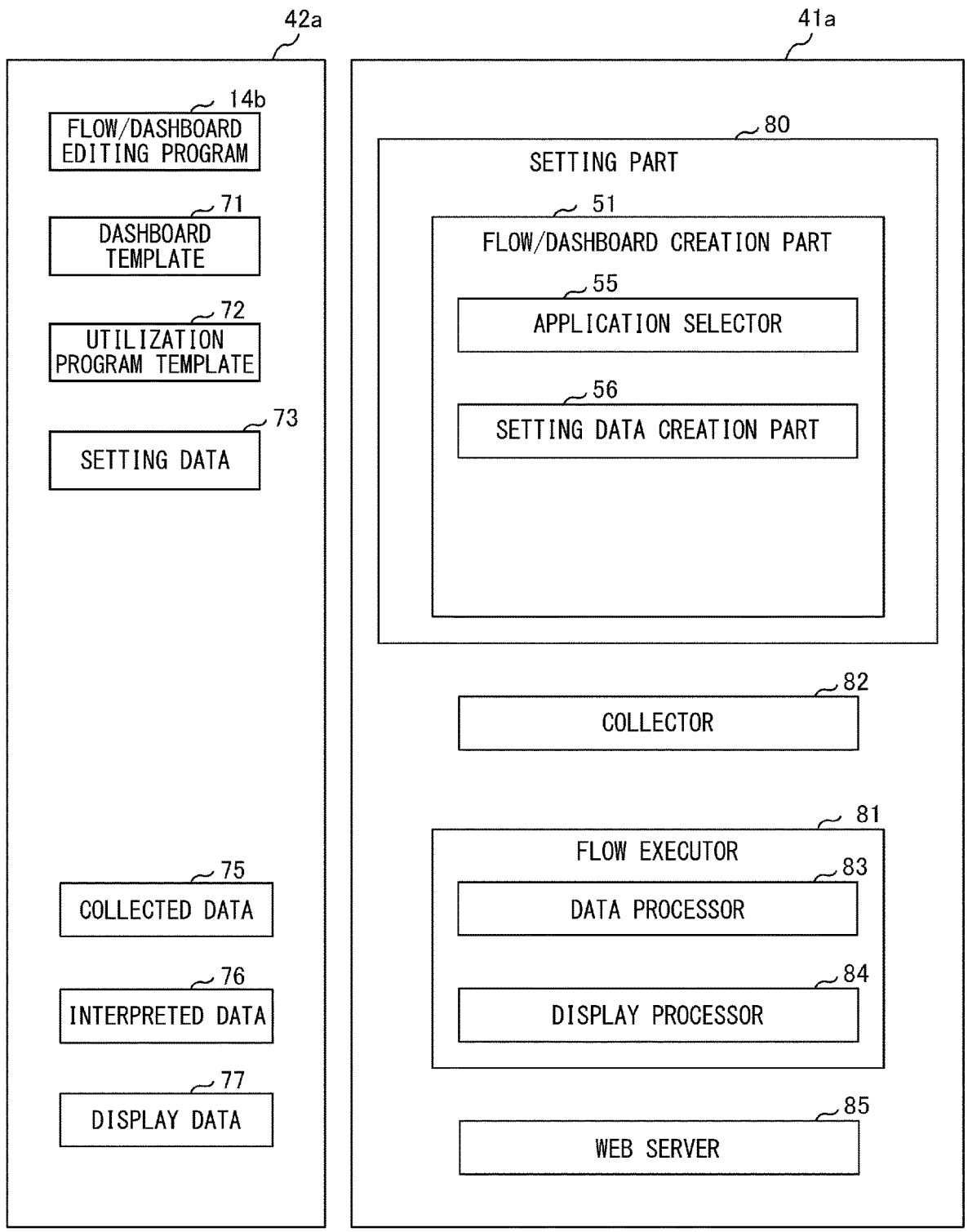
FIG. 6 illustrates functions implemented by the CPU of the expansion unit (data utilization unit)

FIG. 6 is a diagram illustrating other functions implemented by the CPU 41a of the expansion unit 4a. Some or all of the functions of the expansion unit 4a to be described below may be mounted on the basic unit 3. Here, the expansion unit 4a provides a setting editing function of a dashboard or the like by the web-based technology for the PC 2b. Note that the setting editing function may be called from the dashboard and executed. In addition, the setting editing function may also be provided in the PC 2a, which is a programming support apparatus. Note that a function similar to the function that has been already described is denoted by the same reference sign, and a description of such a function is omitted.

The setting part 80 includes the flow/dashboard creation part 51 described above. The flow/dashboard creation part 51 is a function implemented as the CPU 41a executes the flow/dashboard editing program 14b. The flow/dashboard editing program 14b may cause the CPU 41a to function as a web processor that communicates with the so-called web browser 61 via the web server 85 to provide a display screen and receive an input. The application selector 55 displays the selection screen, which supports the user to select one dashboard from a plurality of dashboards (real-time monitoring applications), on a display part 7b of the PC 2b through the web server 85, and receives the section of the dashboard by the user. The setting data creation part 56 receives a user designation for parameters related to a flow associated with the dashboard selected by the user and parameters related to the dashboard display setting through the web server 85. The parameters include the collection target device, an interpretation target device, an interpretation target period, a display target, a name of a display component, a unit, and the like. The setting data creation part 56 extracts the dashboard template 71a configured to display the dashboard selected by the user from the dashboard template 71. The dashboard template 71 has various display components (graph modules) configured to achieve the dashboard. The setting data creation part 56 extracts the utilization program template 72a, which executes data processing necessary for displaying data on the dashboard selected by the user, from the utilization program template 72. The utilization program template 72 has a calculation component (program module) configured to execute the data processing. The flow/dashboard creation part 51 may also create the collection setting data 74a and the application setting data 74b described above according to a user instruction input from the web browser 61. The setting data creation part 56 creates the setting data 73 including the dashboard template 71a, the utilization program template 72a, the collection setting data 74a, and the application setting data 74b, and stores the setting data 73 in the memory 42a.

Figure 7:
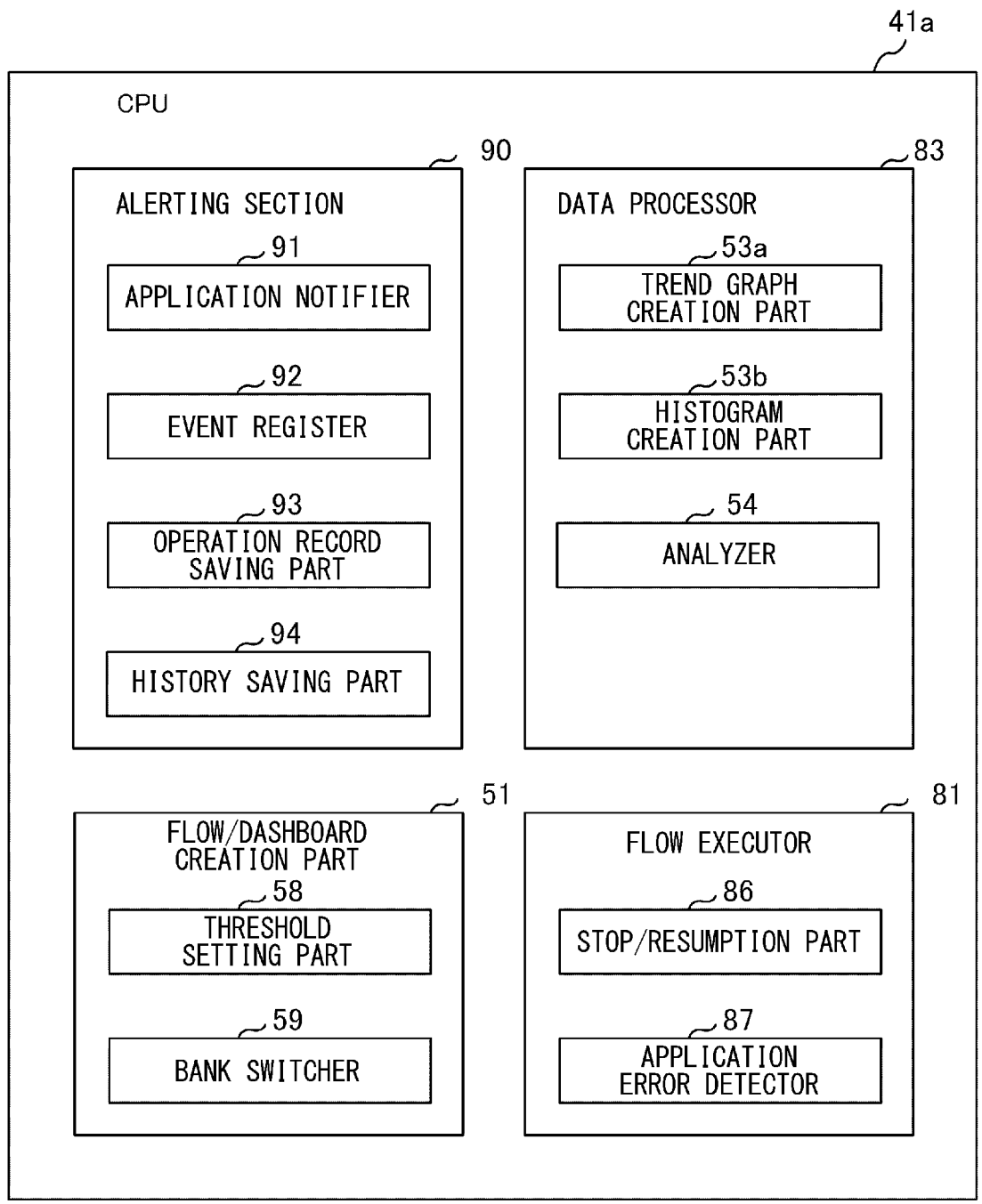
FIG. 7 illustrates functions implemented by the CPU of the expansion unit (data utilization unit)

FIG. 7 illustrates additional functions implemented in the expansion unit 4a.

An alerting part 90 is a function of issuing a notification to peripheral equipment based on a determination result of the flow executer 81 (an analyzer 54). The peripheral equipment includes the HMI 16, the PCs 2a and 2b, and the like. An application notifier 91 is a function of notifying the peripheral equipment that a monitoring state of a real-time monitoring application has changed from a normal state to a caution state or a warning state. The real-time monitoring application is an application that displays device values on a display screen when a user program (ladder program) is executed in the PLC 1. The real-time monitoring application is distinguished from an application that displays only past device values saved in a memory card or the like. The real-time monitoring application may also include the function of displaying these past device values.

An event register 92 is a function of registering the change of the monitoring state of a monitoring application from the normal state to the caution state or the warning state in the basic unit 3 as an event. The CPU 31 of the basic unit 3 has a function of saving histories of errors and events. The event register 92 transmits a communication command via the internal bus 19 to request the CPU 31 of the basic unit 3 to register the event.

An operation record saving part 93 is a function of requesting the CPU 31 of the basic unit 3 to save a collected device value (operation record). The CPU 31 stores the device value in a ring buffer or the like every scan time of the ladder program. The CPU 41a of the expansion unit 4a acquires and analyzes this device value to determine whether or not a saving condition is satisfied. When the saving condition is satisfied, the operation record saving part 93 transmits a saving request to the CPU 31 via the internal bus 19. The CPU 31 saves the device value stored in the ring buffer as an operation record according to the saving request. The flow executer 81 (analyzer 54) may read and analyze the operation record from the basic unit 3 to acquire an analysis result, and may save the analysis result in the interpreted data 76.

Here, the operation record may a record of an operation state of PLC 1 at a scan time level. For example, the operation record may be obtained by recording, for example, symbol values and collection times of all symbols related to the operation of the PLC 1 in time series per scan. For example, all the symbols related to the operation may be all symbols used in the user program such as the ladder program, or may be all symbols included in units of a program or units of a unit selected by the user. In this case, the symbols, which are targets of the operation record, may be collectively selectable in significant units such as the units of the program or the units of the unit. The symbols, which are targets of the operation record, may be individually added or removed. When trouble occurs, for example, the operation record may be generated by recording symbol values and collection times of all symbols related to the operation of the PLC 1 around a trouble occurrence time in time series per scan. The user may be able to accurately grasp what has happened at the time of occurrence of the trouble even afterward based on the operation record. The operation record may include a lot of information in order to reproduce the status at that time. If there is a lot of information, the data volume of the operation record increases, so that handling of the operation record (data processing or the like) becomes difficult, and a load is applied to the collection of the operation record. Therefore, the symbol as a collection target can be selected by the user in units of the program or units of the unit.

In addition, the operation record may include time-series camera images together with capturing times thereof in addition to the symbols. As a result, for example, when trouble occurs, the user may be able to accurately grasp what has happened around a trouble occurrence time retroactively even afterward. In particular, it may be useful to grasp the status if camera images indicating changes in appearance of a facility are included in the operation record. Therefore, the camera images may be recorded in conjunction with the time series of execution of the user program. A writing history from external equipment such as a human machine interface (HMI) or a PC or a writing history from the PLC may be included in the operation record as a change point event. As a result, for example, the user can confirm in time series what kind of change point event has occurred before and after the occurrence of the trouble. Further, the operation record may include project data. As the operation record includes the project data obtained when the operation record data has been generated, the status can be reproduced by the project data that has been actually used at the time of generating the operation record even if there are a plurality of versions of the project data. The operation record may include an analysis report. As the operation record includes the analysis report including an analysis result obtained by analyzing operation record data, it is possible to align the analysis result with the operation record data.

A history saving part 94 is a function of saving a device value acquired when the caution state or the warning state has occurred, dashboard display data (chart or graph), and a threshold as histories. These histories are useful for reproducing an unusual operation occurring in the past on the display screen.

The data processor 83 may have a function of performing statistical processing on the collected data 75 (device value or the like). A trend graph creation part 53a creates a trend graph from the collected data 75. For example, the trend graph creation part 53a is a function of selecting a statistical value (maximum value, average value, or minimum value) for each of designated number of device values included in the collected data 75, and accumulating the selected statistical value in association with time information indicating time at which this statistic value has been collected. Since one measurement value is selected from the designated number of measurement values and saved, a data compression effect can be obtained. When the designated number increases, the amount of data to be saved is reduced, and data that indicates a longer-term trend is obtained.

A histogram creation part 53b creates a distribution of the designated number of device values included in the collected data 75. For example, it is possible to obtain a distribution of measurement values for hundreds of points collected most recently.

The analyzer 54 analyzes whether a symbol value collected by a collection section according to an application program satisfies a normal condition set for the application program. As a result, the analyzer 54 detects a status different from usual regarding the symbol value. Examples of the normal condition include thresholds to be used to detect the caution state and the warning state.

The flow/dashboard creation part 51 may have a threshold setting part 58 and a bank switcher 59. The threshold setting part 58 is a function of assisting the user in setting the thresholds to be used to detect the caution state and the warning state. For example, the threshold setting part 58 may execute learning based on device values collected in the past and propose the thresholds to the user based on the learning result. The bank switcher 59 prepares sets (banks) of thresholds in advance according to types of products manufactured under the control of the PLC 1, and switches the set of thresholds when the type of product is changed.

The flow executer 81 may have a stop/resumption part 86 and an application error detector 87. The stop/resumption part 86 is a function of temporarily stopping a monitoring application or resuming an operation of the monitoring application. The monitoring application sometimes accesses a memory card to save various types of data. The data is sometimes damaged if the memory card is withdrawn while the monitoring application is accessing the memory card. Thus, when the memory card is withdrawn, the monitoring application needs to be stopped. In addition, an operation of an actuator is sometimes not be stable until a certain time has elapsed after the power is turned on. In such a period, it may be unnecessary for the monitoring application to monitor the actuator. Thus, when receiving a stop request of a monitoring application from the PC 2a, the PC 2b, or the like, the stop/resumption part 86 temporarily stops an operation of the monitoring application. When receiving a request to resume the monitoring application from the PC 2a, the PC 2b, or the like, the stop/resumption part 86 resumes an operation of the monitoring application. The application error detector 87 detects an error in a monitoring application itself and notifies the peripheral equipment of the occurrence of the error. For example, the application error detector 87 issues a notification to the peripheral equipment when the destination of a device or a variable serving as a monitoring target is incorrect or a free space of a memory card for saving a monitoring result is insufficient. The application error detector 87 may be included in the alerting part 90.

Real-Time Monitoring Application

Hereinafter, a plurality of real-time monitoring applications that provide dashboards will be described. Such applications monitor monitoring target devices or variables in real time. As the real-time monitoring applications, the following may exist.

(I) Process Monitoring (Cycle Chart): A cycle operation refers to repeated execution of a plurality of processes per cycle. In cycle monitoring, a bit device indicating a start timing of each of the plurality of processes forming the cycle operation and a bit device indicating an end timing are set as monitoring target devices. A time interval from the start to the end of a whole cycle operation and a time intervals from the start and the end of each of the processes in one cycle are monitored. The whole cycle operation refers to the whole of one cycle. For example, it may be monitored whether a time (process time) from a start trigger to an end trigger is within a specified range. When monitoring results of the plurality of processes are displayed at the same time, it is easy for the user to confirm a process that is a bottleneck among the plurality of processes. When an abnormality occurs for a certain process, monitoring results (charts) are saved not only for the process but also for other processes executed before and after the process.

(II) Timing Monitoring: A timing of on and/or off of a monitoring target bit device is monitored. For example, it is monitored whether a time from a start trigger to an end trigger is within a specified range. In timing monitoring, when an abnormality occurs for a certain process, only a monitoring result (chart) of the process is saved.

(III) Waveform Upper/Lower Limit Monitoring: It is monitored whether a waveform (monitoring target waveform) formed of time-series device values (or analog values stored in variables) is within a range from an upper limit value to a lower limit value set in advance.

(IV) Waveform Guard Band Monitoring: Whether a waveform (monitoring target waveform) formed of time-series device values (or analog values stored in variables) is within a predetermined guard band is monitored in time series. The guard band is a band-shaped range surrounded by two threshold waveforms. The guard band may be defined by an upper limit value or a lower limit value that changes as time elapses. That is, the guard band may be defined by the upper limit value of the time series and the lower limit value of the time series.

(V) Camera Monitoring: Whether characteristic amount data (e.g., brightness, a blue color difference, a red color difference, or the like) of a monitoring target camera image satisfies a predetermined detection condition is monitored. When the field device 10 is a camera, a camera monitoring application is executed.

The real-time monitoring application is an application configured for constant monitoring based on symbol values of symbols of the PLC 1, and is, for example, an application that constantly collects symbol values of one or a plurality of symbols at a scan time level according to a setting of the real-time monitoring application and constantly displays information based on the collected symbol values while updating the information in real time. The one or plurality of symbols to be constantly monitored are set in advance by a user. The real-time monitoring application has, for example, a web server function, and can be set from a general-purpose browser via the communication part 43. Since the setting can be performed from the general-purpose browser, the setting or monitoring can be performed from a PC, a smartphone, or a tablet without using a dedicated tool such as a programming support apparatus. In addition, for the one or plurality of symbols to be constantly monitored, the real-time monitoring application automatically sets a threshold corresponding to the symbols based on symbol values in a plurality of cycles in the normal state. For example, the real-time monitoring application receives a user instruction, and automatically sets a threshold for monitoring states of a plurality of symbols to be constantly monitored, for the symbols, based on variations in the symbol values in the plurality of cycles in the normal state. The threshold is set to monitor a state different from usual, that is, an abnormal state, and the real-time monitoring application issues an alarm when the symbol values of the monitoring target symbols exceed the threshold. In this manner, for example, the PLC 1 can catch a sign before a facility is shut down. The PLC 1 may set the alarm when the symbol values of the monitoring target symbols exceed the threshold as a result of the sign monitoring performed by the real-time monitoring application as a saving condition for an operation record. The PLC 1 saves operation record data before and after the trigger with the occurrence of the alarm by the real-time monitoring application as an event trigger. When the saving of the operation record data is completed, the PLC 1 turns on a saving-completed device. The operation record analysis application may automatically analyze the operation record data when receiving the completion of saving of the operation record data. For example, the operation record analysis application may analyze the operation record data in response to turning on the saving-completed device. The operation record analysis application analyzes symbol values (e.g., device values of all bit devices) of symbols to be analyzed, and extracts a symbol of a factor candidate causing an alert. In this manner, the operation record analysis application automatically analyzes the factor of the occurrence of the alarm by the real-time monitoring application from the operation record data saved due to the occurrence of the alarm, and extracts a symbol different from usual from the operation record data. As a result, the CPU 41a constantly monitors the state of the facility by a sign monitoring function of the real-time monitoring application, and issues the alert due to a change factor. Further, the CPU 41a automatically analyzes the alert factor and extracts the symbol different from usual. That is, the PLC 1 monitors the sign of the facility to be controlled by constantly monitoring the symbol value, notifies the sign through the alarm before the facility to be controlled is stopped, and automatically analyzes the factor of the sign.

[Details of Process Monitoring Application]

Figure 8:
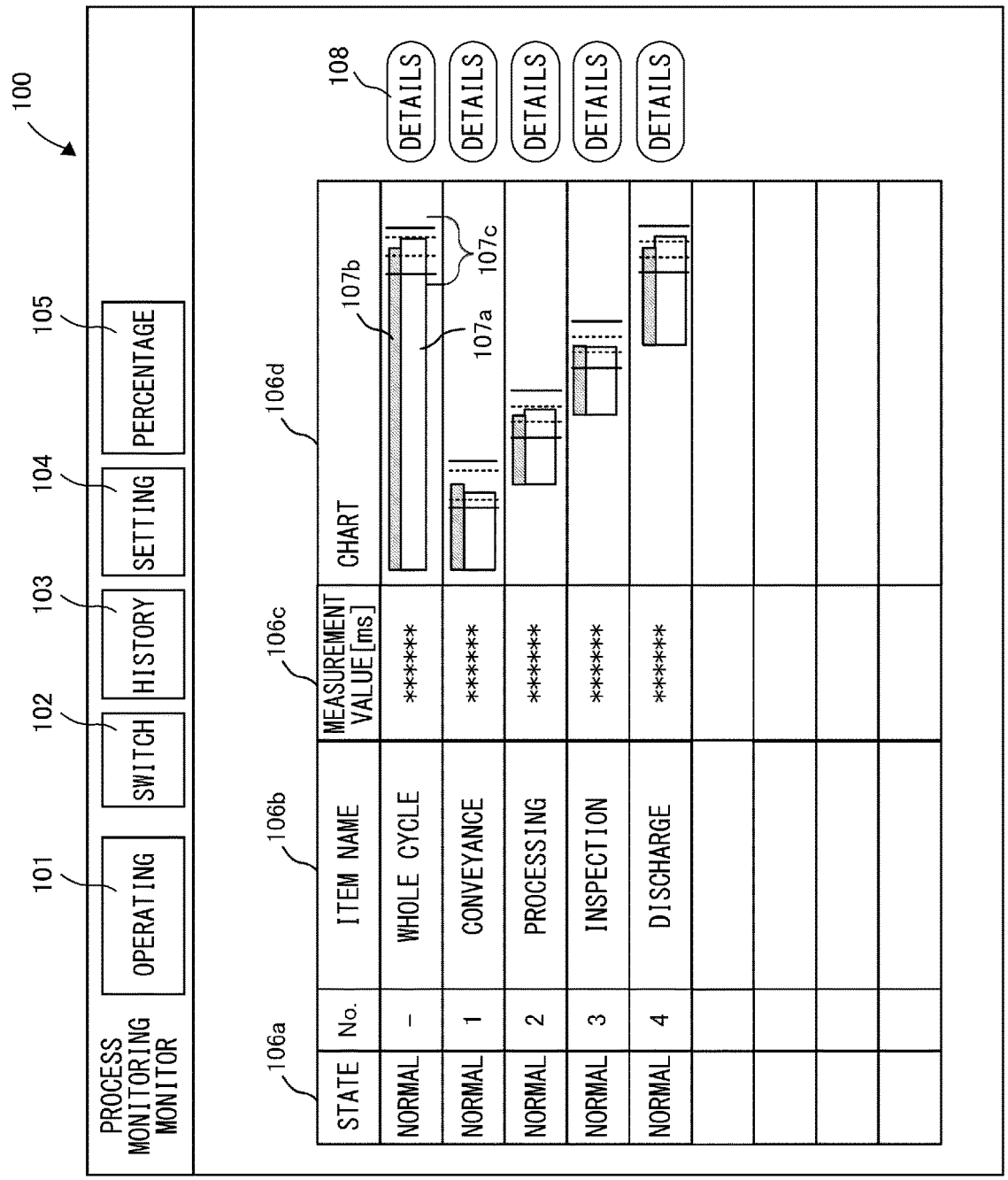
FIG. 8 is a diagram illustrating a display screen.

FIG. 8 illustrates a dashboard 100 of a process monitoring application displayed on the PC 2b. The dashboard 100 is displayed, for example, by the web browser 61 according to the display data 77. The dashboard 100 may be displayed on a display apparatus by software different from a web bowser such as the PC 2a and the HMI 16. The dashboard 100 is a display screen (user interface) that displays a monitoring result in real time. An operation display part 101 displays whether the process monitoring application is operating or stopped. A switch button 102 is a button for instructing the stop/resumption part 86 to switch an operation state of the process monitoring application between "operating" and "stopped". The switch button 102 may be capable to switching on/off of a test operation mode as well as the operation/non-operation of the application. The test operation mode is a mode in which a determination on the warning state and the caution state is executed and a determination result is displayed, but the determination result is not recorded as a history. The history button 103 is a button for instructing the history saving part 94 to save the currently displayed information (measurement value, chart, or the like) as a history. A setting button 104 is a button for calling a setting wizard of the process monitoring application. A percentage button 105 is a button for requesting the display processor 84 to display a measurement value (time from a start trigger to an end trigger) of each process using a percentage per process. In this manner, the display data 77 includes display components that achieve a control object such as the button.

A state display area 106a indicates whether a measurement value is the normal state, the caution state, or the warning state. An item name display area 106b displays a name of each process. A measurement value display area 106c displays a measurement value of time from a start trigger to an end trigger. A chart display area 106d displays a measurement value using a bar-shaped object 107a. The chart display area 106d may display an upper limit value and a lower limit value for determining whether or not a measurement value is in the warning state and an upper limit value and a lower limit value for determining whether a measurement value is the caution state using vertical line objects 107c. Furthermore, the chart display area 106d may display master data of a learning result or a measurement value designated by the user using a bar-shaped object 107b. The object 107b of the master data may be hatched, for example, to be visually differentiated from the object 107a of the measurement value. A detail button 108 is a button for instructing a display of details of a measurement value (e.g., a trend graph and a histogram).

In FIG. 8, the chart display area 106d displays a measurement value in the synchronous mode (cut-out mode). The synchronous mode is a mode in which a measurement value of each process is displayed starting from a timing of a start trigger in the whole cycle operation. In the synchronous mode, the chart display area 106d displays the measurement value and the master data per whole cycle. The measurement value is updated in real time. Therefore, the object 107a indicating the measurement value of the whole cycle gradually extends from left to right as time elapses. When a start trigger is generated in each of the processes, the object 107a indicating a measurement value of the process gradually extends from left to right as time elapses. When an end trigger is generated, the object 107b stops extending. Note that the object 107b of the master data is always displayed as an object having a fixed length.

In this manner, the display data 77 has the display components configured to achieve the plurality of display areas 106. In addition, since the display processor 84 updates the display data 77 as time elapses, the information displayed on the dashboard 100 is also updated.

Figure 9:
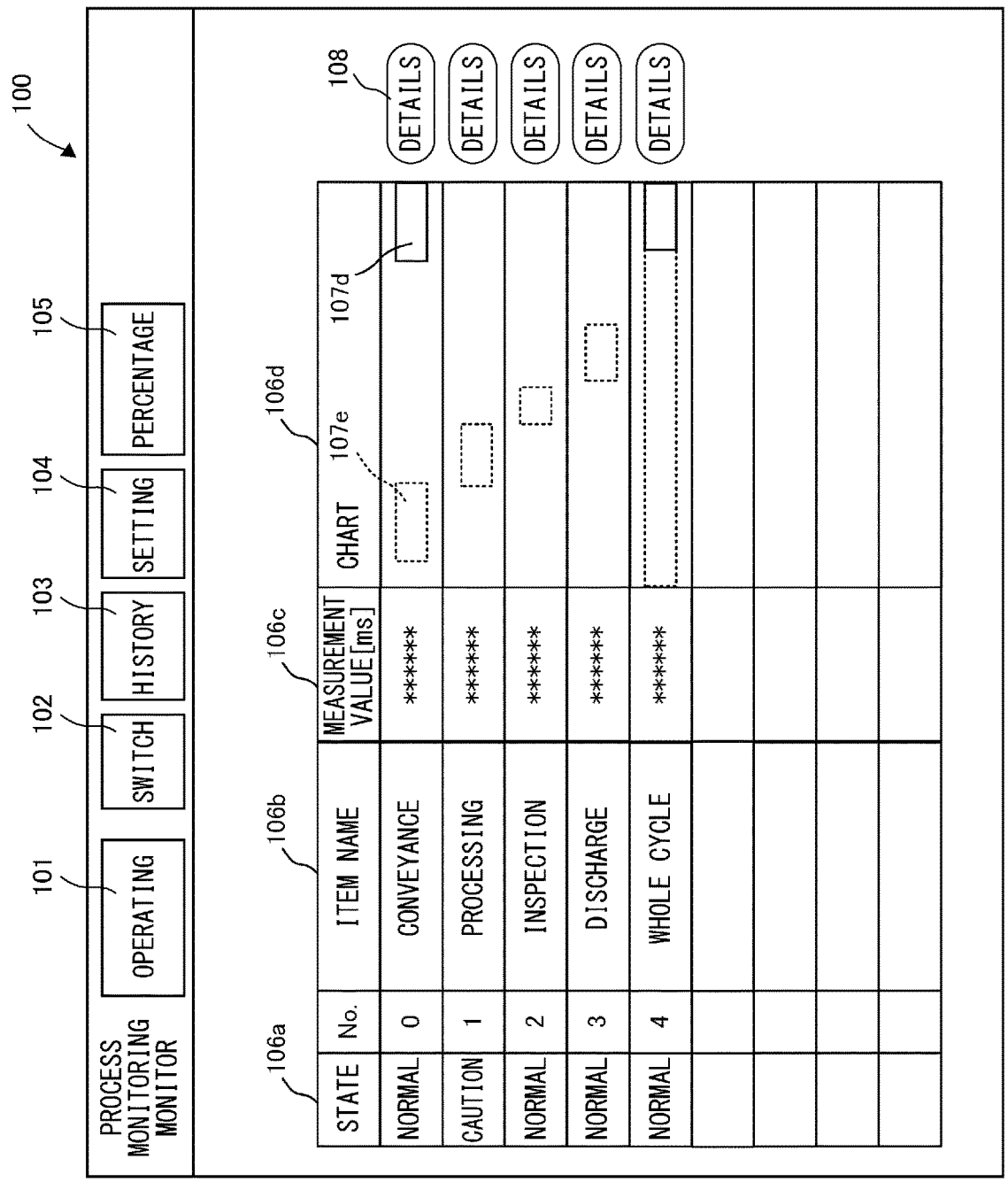
FIG. 9 is a diagram illustrating the display screen.

FIG. 9 illustrates the dashboard 100 of the process monitoring application in an asynchronous mode. Among measurement values of a duration of each process in the asynchronous mode, the most recent measurement value is displayed as a bar-shaped object 107d moving from right to left. A past measurement value is displayed as a dashed bar-shaped object 107e. That is, when a start trigger is detected for a certain process, the object 107d extends from a right edge of the chart display area 106d to a left edge. When an end trigger is detected for the process, the object 107d stops extending since the measurement value has been defined. Thereafter, the object 107d moves to the left over time while the object 107d maintains a fixed length corresponding to the measurement value. Note that the object 107d is not allowed to move further to the left once reaching the left edge of the chart display area 106d, and thus, the object 107d is displayed to shrink as time elapses.

The chart display area 106d may display measurement values for a plurality of consecutive whole cycles. For example, it can be seen visually that, as a distance from the right edge of the object 107e indicating the past measurement value to the left edge of the object 107d indicating the next measurement value is shorter for a certain process, the process has less time to spare and becomes a bottleneck in the whole cycle.

Colors of the objects 107a, 107b, 107d, and 107e may vary depending on the normal state, the caution state, and the warning state. For example, the normal state, the caution state, and the warning state may be visually differentiated using green, yellow, and red, respectively.

Figure 10:
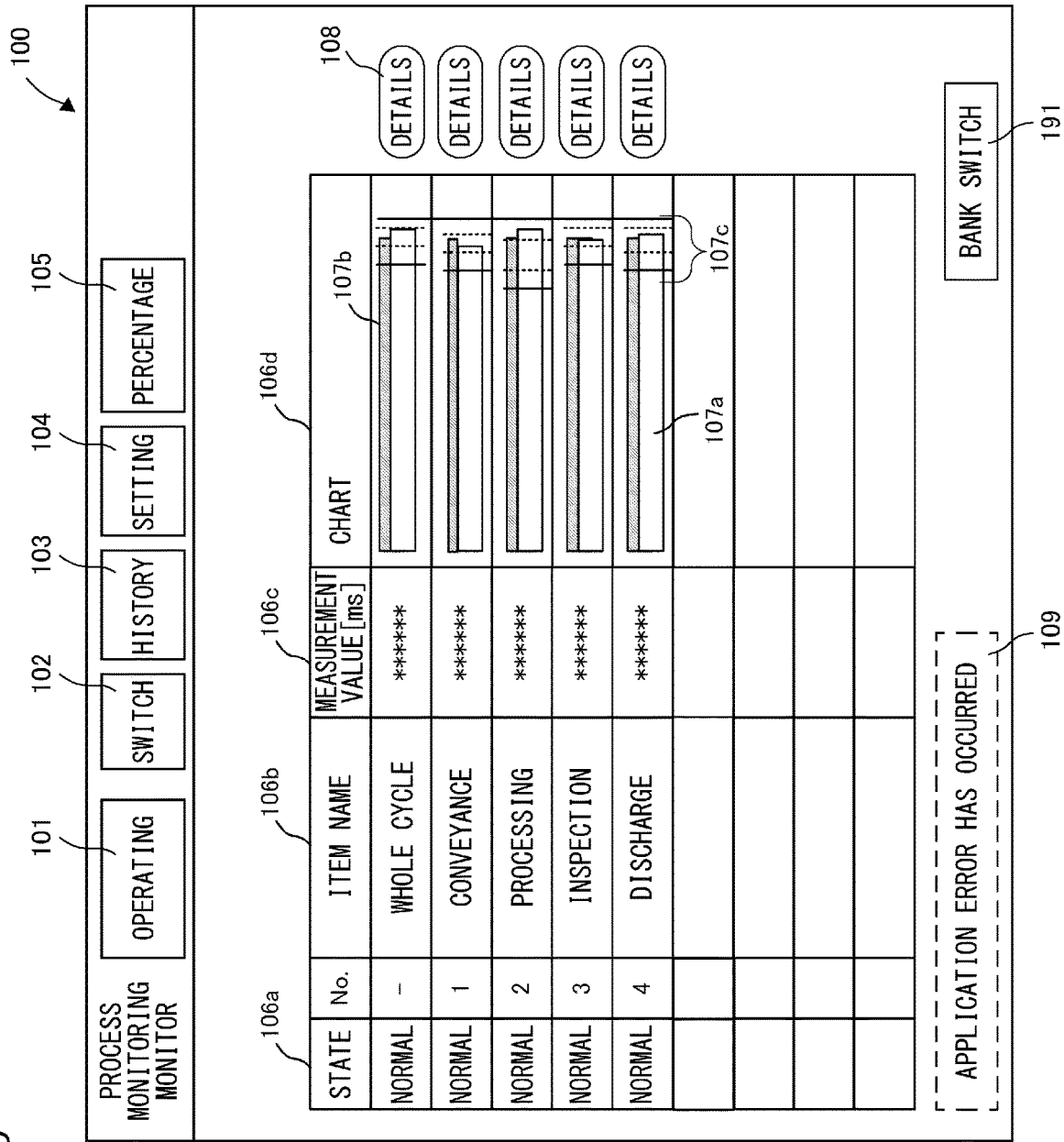
FIG. 10 is a diagram illustrating the display screen.

FIG. 10 illustrates a percentage display mode called by the percentage button 105. The percentage display mode is a mode in which, for example, the objects 107a and 107b are normalized and displayed such that a larger one of an upper limit value of the warning state or an upper limit value of the caution state is 70% of the entire length of the chart display area 106d. Alternatively, in this mode, the objects 107a and 107b may be normalized and displayed such that a smaller one of a lower limit value of the warning state or a lower limit value of the caution state is 30% of the entire length of the chart display area 106d. Alternatively, in this mode, the objects 107a and 107b may be normalized and displayed such that the master data is 50% of the entire length of the chart display area 106d. Alternatively, in this mode, the objects 107a and 107b may be normalized and displayed with a predetermined maximum monitoring time as 100%. A specific numerical value that specifies a percentage is merely an example. A display setting related to the percentage display mode (such as parameters indicating percentages) may also be selected or designated by the user in the setting wizard to be described later.

In FIG. 10, a notification display area 109 indicating that an application error has occurred is provided. If any application error has not occurred, the notification display area 109 may display that it is normal or may display nothing. When the application error detector 87 detects an application error, a notification is issued. Based on this notification, the notification display area 109 displays an error message (notification content) together with an error code, an occurrence date and time, and the like.

In FIG. 10, a bank switch button 191 is provided. The bank switch button 191 is a button for designating one bank among a plurality of banks for the bank switcher 59. When the bank switch button 191 is pressed in a case where no bank has been created yet by the user, the bank switcher 59 may display a new back creation screen on the display part 7, for example, to receive a designation of bank identification information (e.g., a bank number or a bank name). In this manner, the plurality of banks are saved in the memory 42a. The plurality of banks may be a part of the setting data 73.

Each of the banks is associated with a caution state threshold setting, a warning state threshold setting, and a chart display setting (e.g., a setting for creation and display of a trend graph and a setting for creation and display of a histogram). Therefore, these settings can also be switched collectively by switching the bank.

Figure 11:
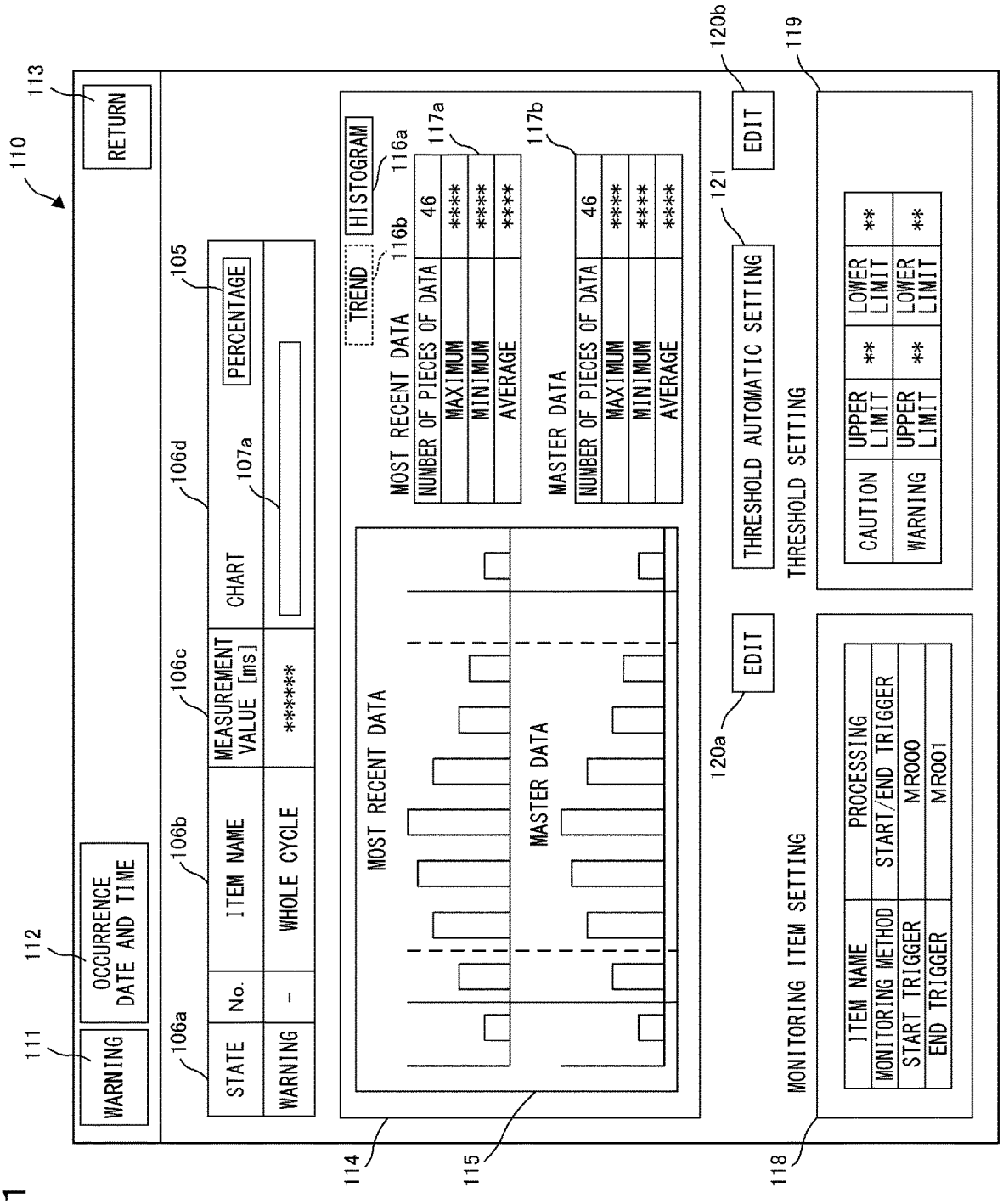
FIG. 11 is a diagram illustrating the display screen.

FIG. 11 illustrates a detail screen 110 to be displayed by pressing the detail button 108. When information indicating that the detail button 108 has been pressed is received through the web server 85, the display processor 84 transmits display data for displaying the detail screen 110 to the web browser 61 through the web server 85. Note that the display data for displaying the detail screen 110 may be a part of the display data 77.

A state display area 111 indicates a state of a process selected by the detail button 108. A date and time display area 112 indicates the date and time when the state indicated in the state display area 111 has occurred. A return button 113 is a button for instructing return to the dashboard 100 from the detail screen 110. Details of the state of the process selected by the detail buttons 108 are indicated in the display areas 106a to 106d. The percentage button 105 may be provided in the chart display area 106d.

A detailed display area 114 displays a histogram if a button 116a is pressed, and displays a trend graph if a button 116b is pressed. a histogram display area 115 contrastably displays a histogram of the most recent data and a histogram of the master data. The histogram display area 115 may display thresholds (upper limit values and lower limit values) of the warning state and the caution state in vertical lines. A statistical value display area 117a displays statistical values (the number of pieces of data, a maximum value, a minimum value, and an average value) of the most recent data. A statistics display area 117b displays statistical values (the number of pieces of data, a maximum value, a minimum value, and an average value) of the master data.

A monitoring item setting display area 118 displays an item name (process name) set as a monitoring item, a monitoring method, a bit device serving as a start trigger, and a bit device serving as an end trigger. An edit button 120a is a button for instructing editing of a setting of the monitoring item. When the edit button 120a is pressed, the CPU 41a (display processor 84 and setting part 80) of the expansion unit 4a may display a setting editing screen for the PC 2b.

A threshold setting display area 119 displays thresholds (upper limit values and lower limit values) of the warning state and the caution state. An edit button 120b is a button for instructing editing of a threshold setting. When the edit button 120b is pressed, the CPU 41a of the expansion unit 4a may display a threshold setting editing screen for the PC 2b. A threshold automatic setting button 121 is a button for instructing the CPU 41a (threshold setting part 58) of the expansion unit 4a to set the thresholds automatically.

Figure 12:
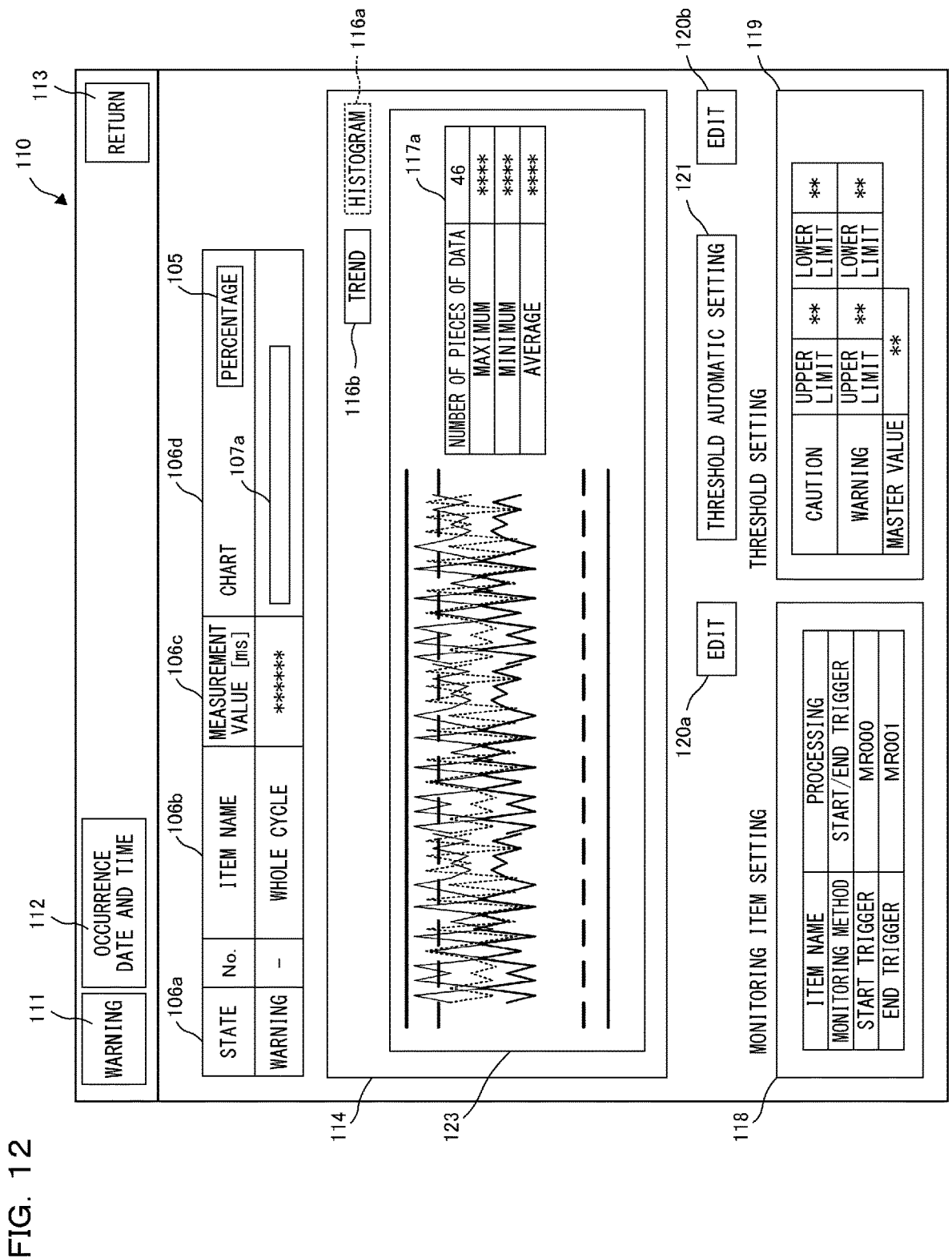
FIG. 12 is a diagram illustrating the display screen.

FIG. 12 illustrates the detail screen 110 to be displayed by pressing the detail button 108. Here, the button 116b has been pressed, and thus, the detailed display area 114 displays a trend graph in a trend graph display area 123. The trend graph display area 123 may display a polygonal line indicating a trend of the maximum value, a polygonal line indicating a trend of the average value, and a polygonal line indicating a trend of the minimum value. Furthermore, the thresholds (upper limit values and lower limit values) of the warning state and the caution state may be displayed in horizontal lines.

Figure 13:
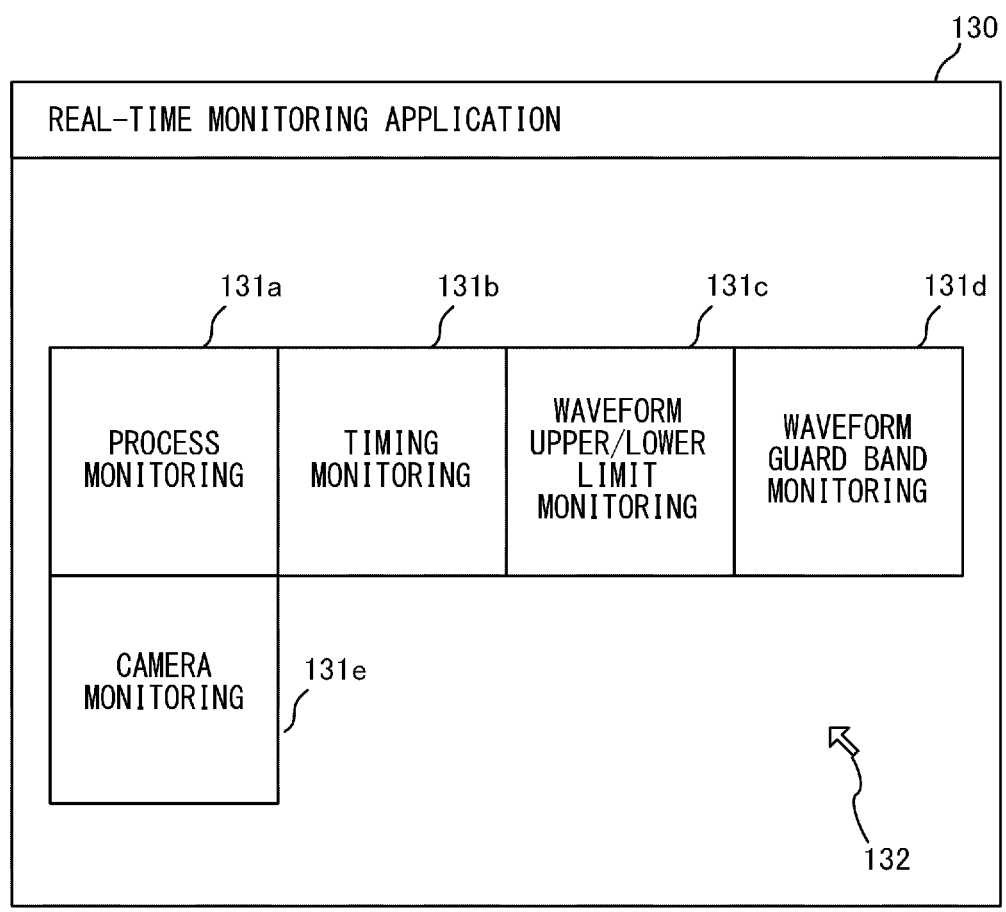
FIG. 13 is a diagram illustrating an application selection screen.

Setting Wizard FIG. 13 illustrates a selection screen 130 to be displayed on the display part 7 of the PC 2 at the time of setting these real-time monitoring applications. Substantially the same selection screen 130 is displayed on the PC 2a and the PC 2b. The selection screen 130 may be displayed on either the PC 2a or the PC 2b. When detecting pressing of a button 131a, the flow/dashboard creation part 51 displays the setting wizard for setting the process monitoring application on the display part 7. When detecting pressing of a button 131b, the flow/dashboard creation part 51 displays a setting wizard for setting a timing monitoring application on the display part 7. When detecting pressing of a button 131c, the flow/dashboard creation part 51 displays a setting wizard for setting a waveform upper/lower limit monitoring application on the display part 7. When detecting pressing of a button 131d, the flow/dashboard creation part 51 displays a setting wizard for setting a waveform guard band monitoring application on the display part 7. When detecting pressing of a button 131e, the flow/dashboard creation part 51 displays a setting wizard for setting the camera monitoring application on the display part 7. The buttons 131a to 131e are operated by a pointer 132.

FIG. 14 illustrates a setting wizard 140 for setting the process monitoring application. An application name setting part 141 receives designation of identification information and a name of the real-time monitoring application to be set. For example, the application name setting part 141 may receive the application name for each application ID (=0, 1, 2, . . . and so on). Furthermore, the application name setting part 141 may receive an input of the application name for each of a plurality of languages.

The maximum monitoring time input part 142 receives an input of a time for which a device value or the like is continuously monitored by the real-time monitoring application. A display mode selection menu 143 is a menu that receives a selection of a display mode of a chart in the chart display area 106d. Here, either the synchronous mode or the asynchronous mode described above is selected. A monitoring method setting part 145a receives a setting of a monitoring method per process. A start designation among the monitoring methods means a monitoring method in which a period from an input of one start trigger to an input of the next start trigger is set as a monitoring period. A start/end designation means a monitoring method in which a period from an input of a start trigger to an input of an end trigger is set as a monitoring period. An item name setting part 145b receives an input of a process name. A start trigger setting part 145c receives a designation of a bit device serving as a start trigger. An end trigger setting part 145d receives a designation of a bit device serving as an end trigger. If a monitoring method is the "start designation", it is unnecessary to set an end trigger. A monitoring enabler 145e receives a designation for whether to enable or disable process monitoring. A caution state threshold setting part 145f receives designations of an upper limit value and a lower limit value of the caution state. A warning state threshold setting part 145g receives designations of an upper limit value and a lower limit value of the caution state. Although not illustrated in FIG. 14, a master data setting part and a detailed setting part (e.g., a threshold automatic setting button, an input part for the number of pieces of data to be used to create a trend graph) may be added.

Among pieces of setting information received by the setting wizard 140, pieces of setting information received by the start trigger setting part 145c, the end trigger setting part 145d, and the like are appropriately selected by understanding the user program executed in the basic unit 3. However, there is a case where a creator of the user program is different from a setter of the real-time monitoring application. In this case, the setter of the real-time monitoring application is likely to understand the user program. Thus, a bit device serving as a start trigger and a bit device serving as an end trigger may be input in a file format. A start trigger and an end trigger for the entire process, and start and end triggers for individual processes may be input in a file format that includes structured data such as CSV. In addition, parameters for a plurality of applications may be collectively input in a file format that includes structured data. The plurality of applications may include the operation record analysis application and the real-time monitoring applications, or the process monitoring application and the timing monitoring application among the real-time monitoring applications may be included. The parameters may include a name of an item, a trigger type (using only the start trigger or both the start trigger and the end trigger), a name of a device as the start trigger and a trigger establishment condition thereof (either raising or falling of the device to be determined as trigger establishment), and a name of a device as the end trigger and a trigger establishment condition thereof.

When the synchronous mode is selected as the display mode, a receiver, which receives a designation of a name of an item or a number of the item which serves as a reference for a synchronous display, may be further displayed.

A language setting button 146 is a button for setting which language is assigned to which set among a plurality of comment sets. For example, a language setting is executed such that Japanese is assigned to Comment set No. 1 and English is assigned to Comment set No. 2. Note that an application name is also input in association with the language setting. For example, if Comment set No. 1 is set to Japanese, an application name set to Comment set No. 1 is written in Japanese.

A translation button 147 is a button for requesting the CPU 41a to translate a word written in one language in one comment set into a word in another selected language in another comment set. When the user designates a language before translation, a language after translation, and a number of a comment set to which a translation result is output, the CPU 41a executes the translation to create the comment set. The CPU 41a may receive a designation of dictionary data to be used for the translation from the user.

A setting save button 148 is a button for commanding the CPU 41a to save setting data input through the setting wizard 140 with a file name. A setting read button 149 is a button for commanding the CPU 41a to read setting data saved in advance and reflect the setting data in the setting wizard 140.

Threshold Automatic Setting

When detecting that the threshold automatic setting button 121 illustrated in FIG. 12 has been pressed, the threshold setting part 58 automatically sets thresholds of the caution state and thresholds of the warning state collectively according to a setting rule (calculation rule) provided in advance. Here, the automatic setting means that the user does not need to manually input at least some thresholds out of all thresholds that need to be set. The threshold setting part 58 may receive an input of a condition necessary for the calculation in the automatic setting. Here, the condition may include a designation of measurement data to be used for threshold calculation and a designation of a calculation technique (calculation rule) of a threshold. As the measurement data, measurement data accumulated to display a histogram may be designated, or new measurement data may be designated. In the latter case, the threshold setting part 58 starts measuring data when detecting pressing of an execution button (not illustrated), acquires new measurement data, and uses the new measurement data for threshold calculation.

FIG. 15 illustrates a condition setting screen 150 to be displayed on the display part 7 of the PC 2b by the threshold setting part 58. In this example, selection menus of calculation techniques are provided respectively for thresholds. In this example, it is selected that an upper limit value (e.g., $+\sigma$) and a lower limit value (e.g., $-\sigma$) of the caution state are set using a standard deviation $\sigma$ of measurement data. When the standard deviation $\sigma$ is used, it is easy to set an appropriate threshold under a stable condition where there is a small long-term offset such as drift. Meanwhile, the upper limit value and the lower limit value may be settable using maximum and minimum values of the measurement data in consideration of the long-term offset. For example, the threshold setting part 58 may set the upper limit value and the lower limit value by multiplying the maximum value and the minimum value by coefficients, such as 1.1 and 0.9, respectively. In addition, regarding the warning state, it is selected that an upper limit value (e.g., $+3\sigma$) and a lower limit value (e.g., $-3\sigma$) of the caution state are set using the standard deviation $\sigma$ of the measurement data. Regarding the warning state, a setting method of using the maximum value and the minimum value may be also prepared similarly to the caution state. Regarding the master value, an average value of the measurement data is adopted. In this manner, the plurality of calculation techniques are proposed by the selection menus, and one calculation technique selected by the user is used for the threshold automatic setting. Note that the check of a check box is released when the user designates the threshold.

Monitoring Item Setting

FIG. 16 illustrates a manual setting screen 200 of a monitoring item to be displayed when the edit button 120a is pressed. In this example, a toggle switch 201, which instructs whether to enable or disable monitoring, is provided. A manual setting part 202 receives a designation of a monitoring method, an item name (process name), a start trigger, and an end trigger from the user. The setting part 80 saves information input through the manual setting screen 200 in the setting data 73.

Threshold Manual Setting

Figure 17:
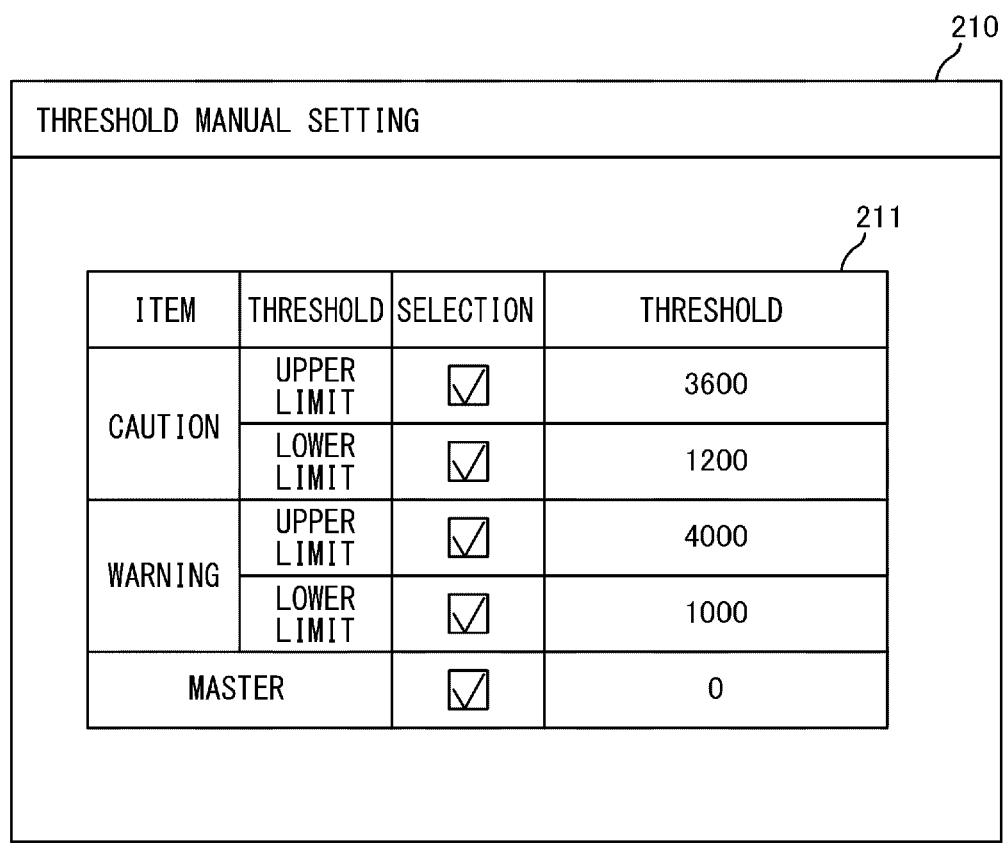
FIG. 17 is a diagram illustrating a threshold setting screen.

FIG. 17 illustrates a manual setting screen 210 of a threshold to be displayed when the edit button 120b is pressed. A threshold input part 211 receives a manual input for a master value in addition to thresholds (upper limit values and lower limit values) related to the caution state and the warning state. The setting part 80 saves information input through the manual setting screen 210 in the setting data 73.

System Setting

FIG. 18 illustrates a system setting tab 160 included in the setting wizard 140. An operation record setting part 161 includes a check box for designating whether or not to save an operation record and a designator for an operation record ID. When this check box is checked, the operation record saving part 93 is enabled. A detail button 165a is a button for receiving a detailed setting related to an operation record. For example, a setting screen of a saving condition of the operation record may be displayed. In this setting screen, as the saving condition, it is selected whether to save the operation record only when the caution state occurs, to save the operation record only when the warning state occurs, or to save the operation record when either the caution state or the warning state occurs.

An event registration setting part 162 includes a check box for receiving a setting of whether or not to register the caution state or warning state in a CPU event/error history of the basic unit 3. When the check box is checked, the above-described event register 92 is enabled. A detail button 165b is a button for receiving a detailed setting related to the event/error history. When the detail button 165b is pressed, a setting screen for a registration condition of the event/error history is displayed. As the registration condition, it is selected whether to execute registration only when the caution state occurs, to execute registration only when the warning state occurs, or to execute registration when either the caution state or the warning state occurs.

Regarding a data setting, a memory card setting part 163 includes a check box for designating whether or not to use a memory card as a saving destination of an operation record, and a menu for designating which memory card attached to which unit is to be used.

A history data setting part 164 includes: a designator that receives a designation of the amount of data of a chart to be saved by the history saving part 94 after occurrence of the caution state or warning state; a designator for the maximum number of saved histories; and a check box for designating whether or not to hold data for displaying a trend graph.

An advanced setting part 166 receives designations of an upper limit number of the number of monitoring items (the number of processes to be monitored), an upper limit value of a length of a character string of an item name, an upper limit value of a length of a variable name designated by the start trigger/end trigger, and the like. Information input through the system setting tab 160 is saved in the setting data 73 by the setting part 80.

Anther Example of Dashboard

Figure 19:
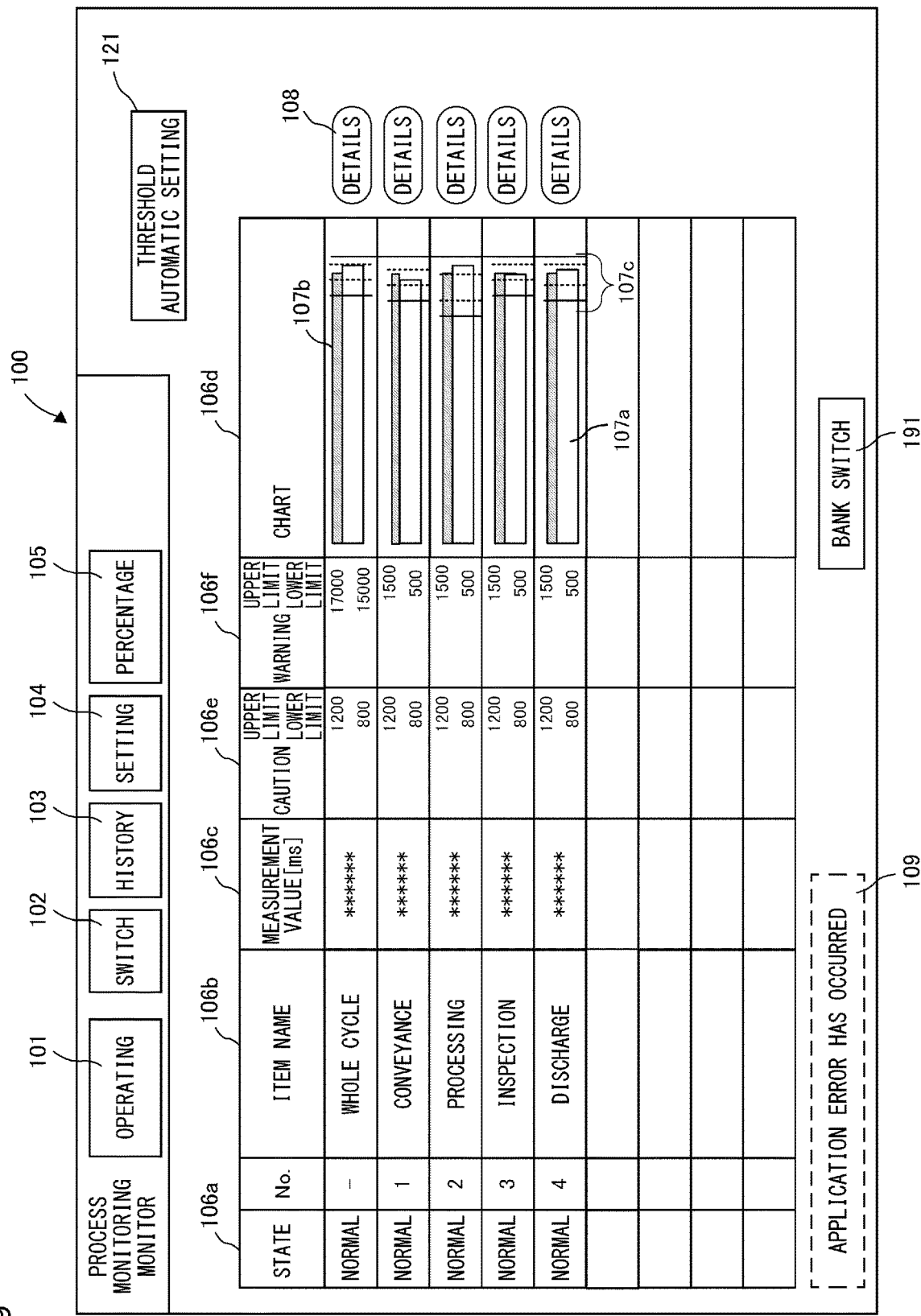
FIG. 19 is a diagram illustrating the display screen.

FIG. 19 illustrates another example of the dashboard 100. The display component that has been already described is denoted by the same reference sign, and the description thereof is omitted. The dashboard 100 illustrated in FIG. 19 includes: a threshold display area 106e for displaying thresholds (an upper limit value and a lower limit value) of the caution state; and a threshold display area 106f for displaying thresholds ((an upper limit value and a lower limit value) of the warning state. These display the upper limit values and the lower limit values as numerical values. Even in the dashboard 100 illustrated in FIG. 19, when the threshold automatic setting button 121 is pressed, the condition setting screen 150 illustrated in FIG. 15 is displayed, and thresholds of all items are automatically set under designated conditions. The other buttons and displays are the same as those described in relation with FIG. 10.

Screen for Switching of Application Operation

Figure 20:
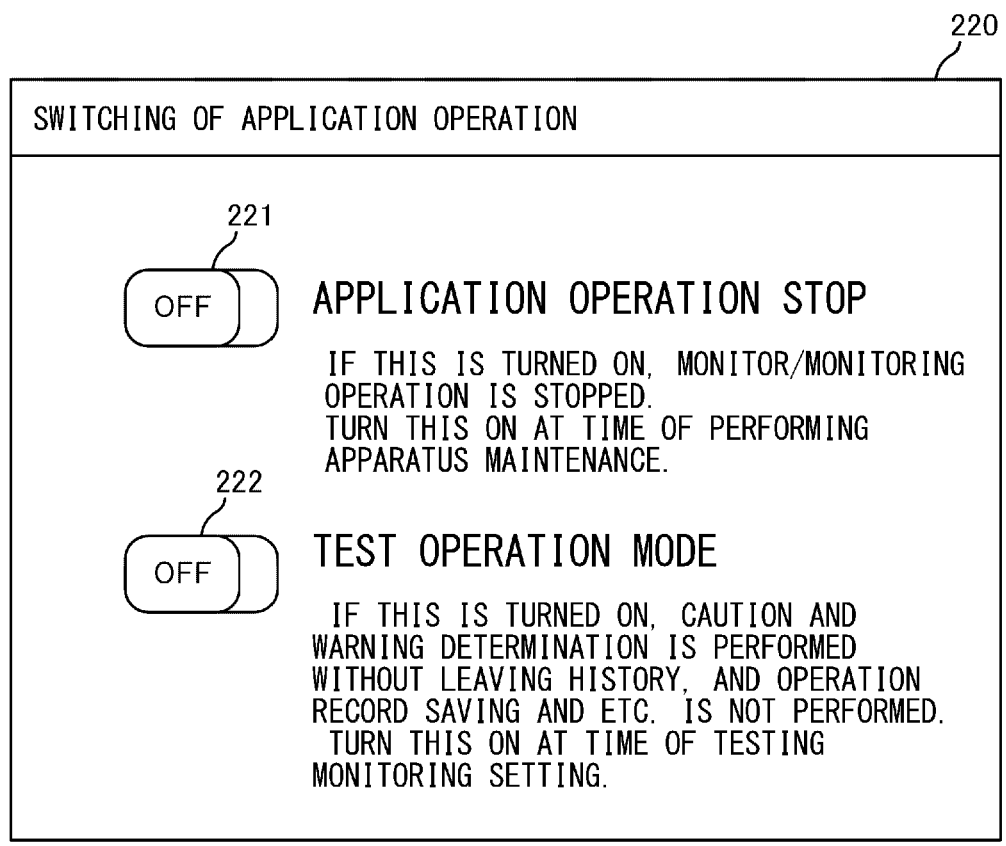
FIG. 20 is a diagram illustrating a screen for receiving switching of an operation of an application.

FIG. 20 illustrates a screen 220 for switching an operation of an application. When the switch button 102 is pressed, the screen 220 is displayed on the display part 7 of the PC 2b by the stop/resumption part 86. A switch 221 is a switch for instructing the stop/resumption part 86 to switch an operation state of an application to "operating" or "stopped". The switch 221 is a switch for instructing the stop/resumption part 86 to switch the test operation mode to be enabled or disabled.

Relation Between Measurement Data and Master Data in Chart

Figure 21:
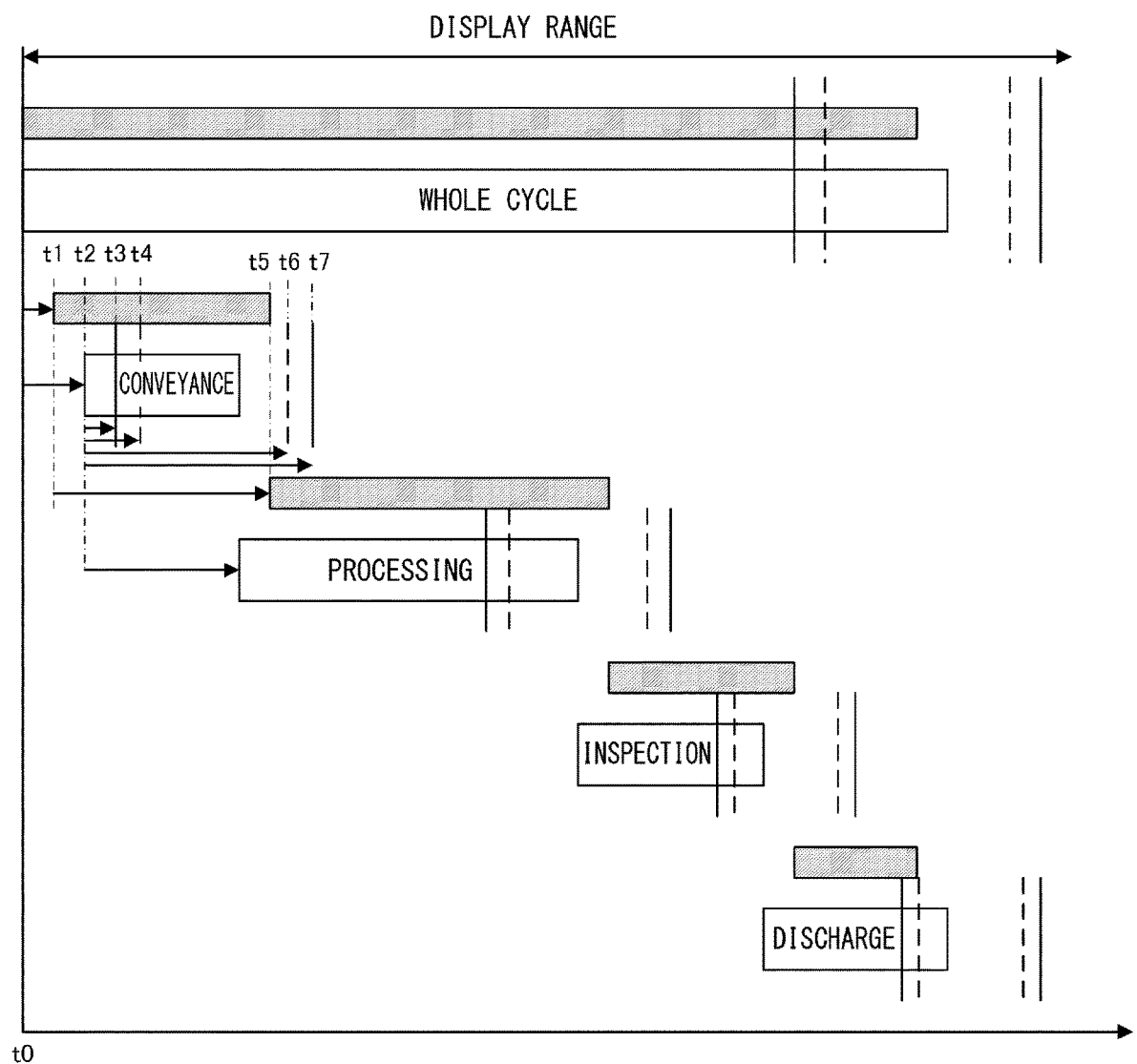
FIG. 21 is a diagram illustrating a chart.

FIG. 21 illustrates a chart in the synchronous mode. A hatched bar-shaped object indicates the master data. A blank bar-shaped object indicates a duration (measurement result) of each process. In this example, a start trigger of a whole cycle is turned on at time to. A conveyance process in the master data has started at time t1. On the other hand, a conveyance process in the measurement data has started at time t2 later than that. Time t3 corresponds to a lower limit value of the warning state with the time t2 as a reference. Time t4 corresponds to a lower limit value of the caution state with the time t2 as the reference. Time t5 is the time when the conveyance process in the master data has ended, and is the start time of a processing process. Time t6 corresponds to an upper limit value of the caution state with the time t2 as the reference regarding the conveyance process. Time t7 corresponds to an upper limit value of the caution state with the time t2 as the reference regarding the conveyance process. In practice, the time t1 to the time t7 and the like are managed as each length of time. For example, the lower limit value of the warning state for the conveyance process is stored in advance as a time length T1 from the time t2 to the time t3. The lower limit value of the caution state for the conveyance process is stored in advance as a time length T2 from the time t2 to the time t4. The upper limit value of the caution state for the conveyance process is stored in advance as a time length T3 from the time t2 to the time t6. The upper limit value of the warning state for the conveyance process is stored in advance as a time length T4 from the time t2 to the time t7. Since the time t2 changes every time, the time length T1 to T4 is added to the time t2 if the time t2 is determined, and a display position of each threshold is determined.

Bar-shaped objects each indicating a time length (measurement value) of each process may be colored according to the state. Similarly, vertical lines each indicating the threshold of each of the states may also be colored according to the state. For example, the normal state may be colored in green, the caution state may be colored in yellow, and the warning state may be colored in red.

In a display range, (1) a maximum monitoring time of a whole cycle, or (2) a maximum value among a threshold, a master value (master data), and a measurement value (measurement data) of a previous whole cycle. (1) is a case where neither the threshold nor the master value is set. (2) is a case where either the threshold or the master value is set.

[Details of Timing Monitoring Application]

The timing monitoring application is a function-reduced version of the above-described process monitoring application. For example, the process monitoring application has the synchronous mode, the asynchronous mode, and the percentage display mode, while the timing monitoring application has only the percentage display mode. In addition, if a history saving event occurs, charts of all processes are saved as a history in the process monitoring application, but only a chart of a process that caused the history saving event is saved in the timing monitoring application. The timing monitoring application is mainly used to monitor an operation of an actuator (e.g., an air cylinder). In other words, the timing monitoring application is provided independently of the process monitoring application in order to make it easier for the user to understand a difference between a use of the process monitoring application and a use of the timing monitoring application. Therefore, a monitoring technique that can be executed in the timing monitoring application can also be executed in the process monitoring application. The setting wizard is also simplified since the reduced functions are provided in the timing monitoring application. This may improve the usability.

FIG. 22 illustrates the setting wizard 140 of the timing monitoring application. The setting wizard 140 of the timing monitoring application is substantially the same as the setting wizard 140 of the process monitoring application. Since the display mode is fixed to the percentage display mode, the selection menu of the display mode is omitted. On the other hand, a setting part 145h that receives a setting of a maximum monitoring time per process is provided. The maximum monitoring time in the timing monitoring application is the timeout time of an end trigger. Although one maximum monitoring time is set for the whole cycle in the process monitoring application, the maximum monitoring time is set per process in the timing monitoring application.

[Waveform Upper/Lower Limit Monitoring Application]

Upper/Lower Limit Monitoring

Figure 23:
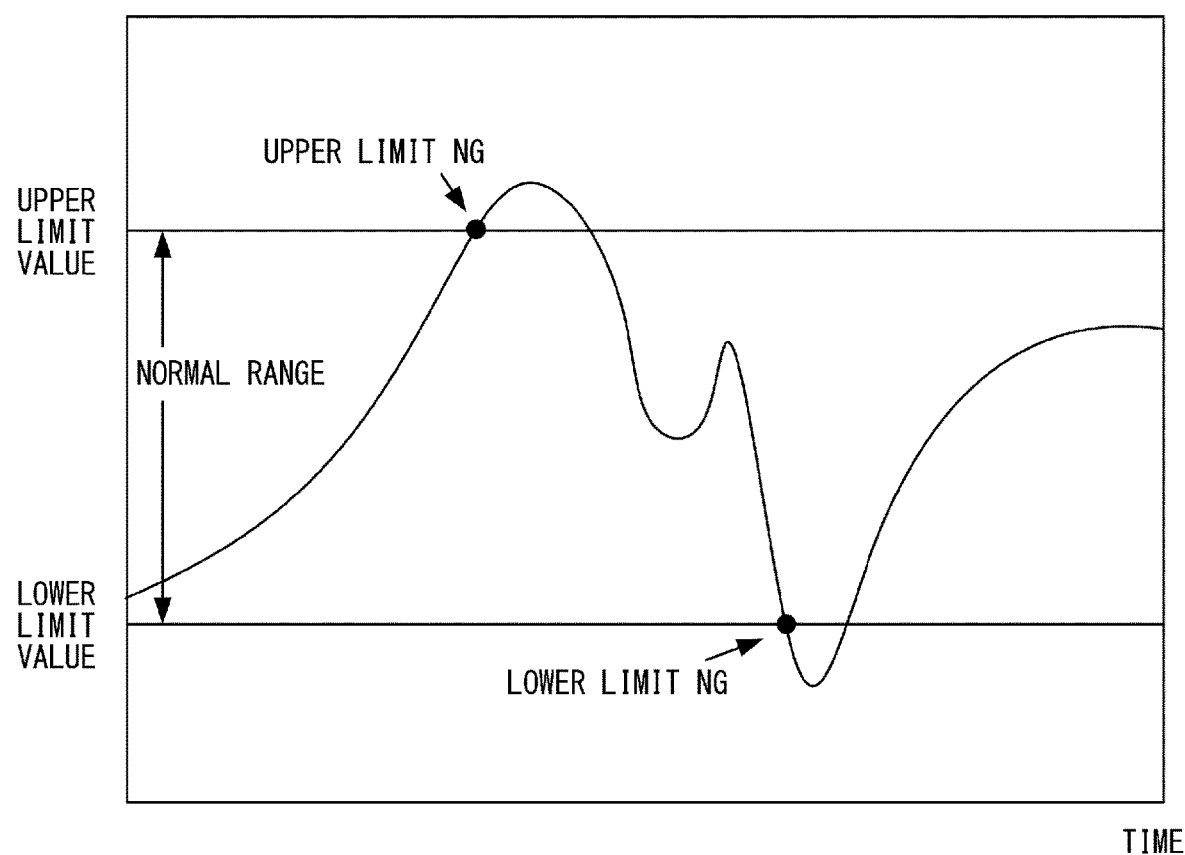
FIG. 23 is a diagram illustrating a waveform upper/lower limit monitoring application.

FIG. 23 is a diagram illustrating a monitoring technique (upper/lower limit monitoring) in a waveform upper/lower limit monitoring application. A horizontal axis represents time. A vertical axis represents the magnitude of a measurement value. The upper/lower limit monitoring is a technique of monitoring whether all of time-series measurement values measured within a certain measurement time are equal to or more less than an upper limit value and equal to or more than a lower limit value. Here, the upper limit value and the lower limit value may be two thresholds set for the warning state, or two thresholds set for the caution state. In FIG. 23, a normal range is a range that is equal to or less than the upper limit value and equal to or more than the lower limit value. When a measurement value exceeds the upper limit value of the warning state, the CPU 41a determines that upper limit NG has occurred and issues a warning notification. NG means "defective" (abnormal). When a measurement value falls below the lower limit value of the warning state, the CPU 41a determines that lower limit NG has occurred and issues a warning notification. Note that the same determination process and notification process are executed for the caution state.

Peak (Bottom) Upper/Lower Limit Monitoring

Figure 24:
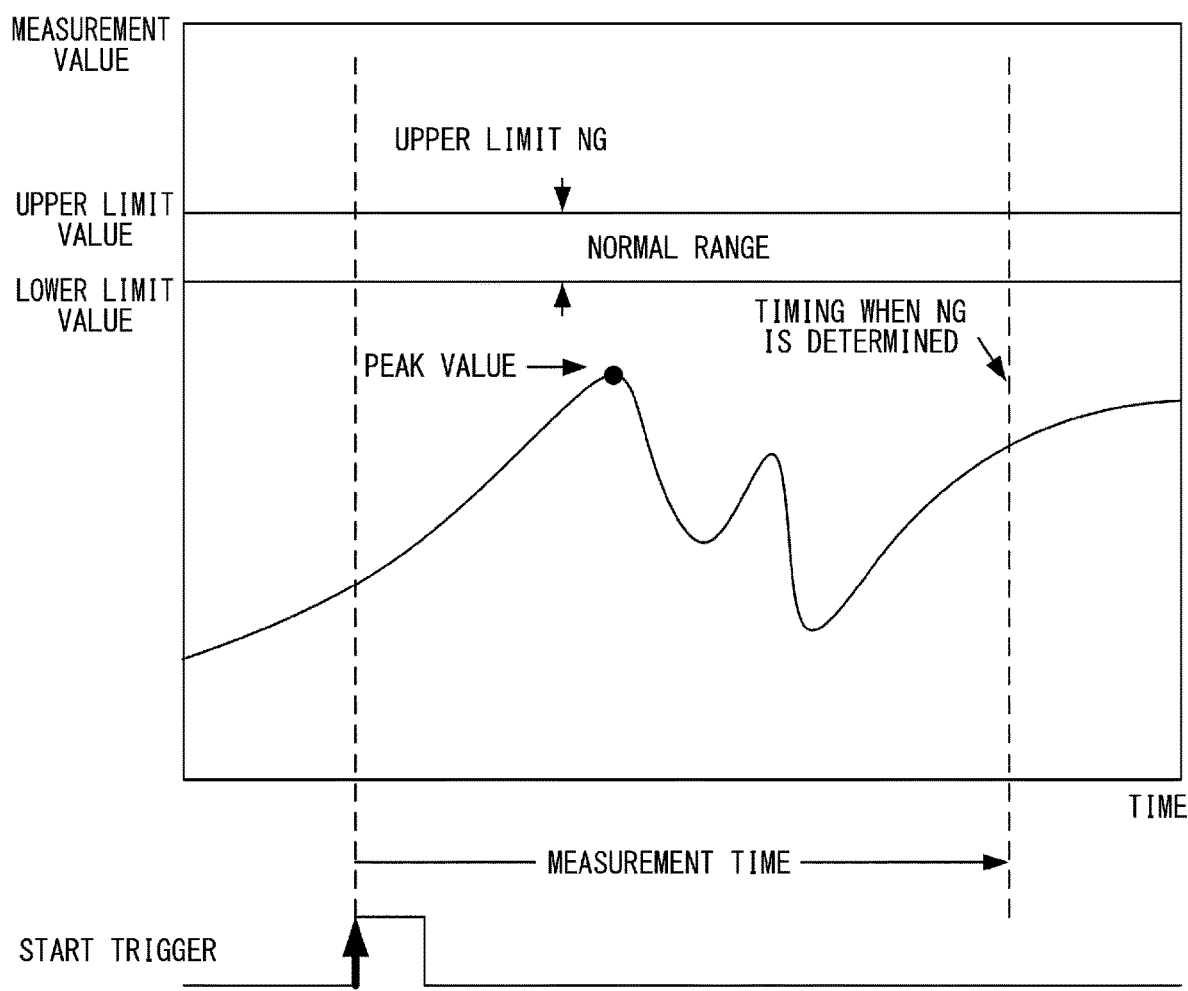
FIG. 24 is a diagram illustrating the waveform upper/lower limit monitoring application.

FIG. 24 is a diagram illustrating a monitoring technique (peak (bottom) upper/lower limit monitoring) in the waveform upper/lower limit monitoring application. A horizontal axis represents time. The vertical axis represents a measurement value. The peak (bottom) upper/lower limit monitoring is a technique of monitoring whether a peak value (or bottom value) among time-series measurement values measured within a certain measurement time is equal to or less than an upper limit value and equal to or more than a lower limit value. Here, the upper limit value and the lower limit value may be two thresholds set for the warning state, or two thresholds set for the caution state. In FIG. 24, a normal range is a range that is equal to or less than the upper limit value and equal to or more than the lower limit value. When the peak value (or bottom value) is not within the normal range, the CPU 41a (the analyzer 54 and the application notifier 91) determines that peak value (or bottom value) NG has occurred, and issues a warning notification. Note that the same determination process and notification process are executed for the caution state. The measurement time is designated in advance by the user. The measurement time is measured from rising (falling) of a start trigger, for example. In FIG. 24, the peak values measured within the measurement time do not reach the normal range, and thus, the analyzer 54 determines that the peak value NG has occurred, and the application notifier 91 issues a notification. In the case of FIG. 24, a timing when the analyzer 54 determines NG is the end of the measurement time.

Figure 25:
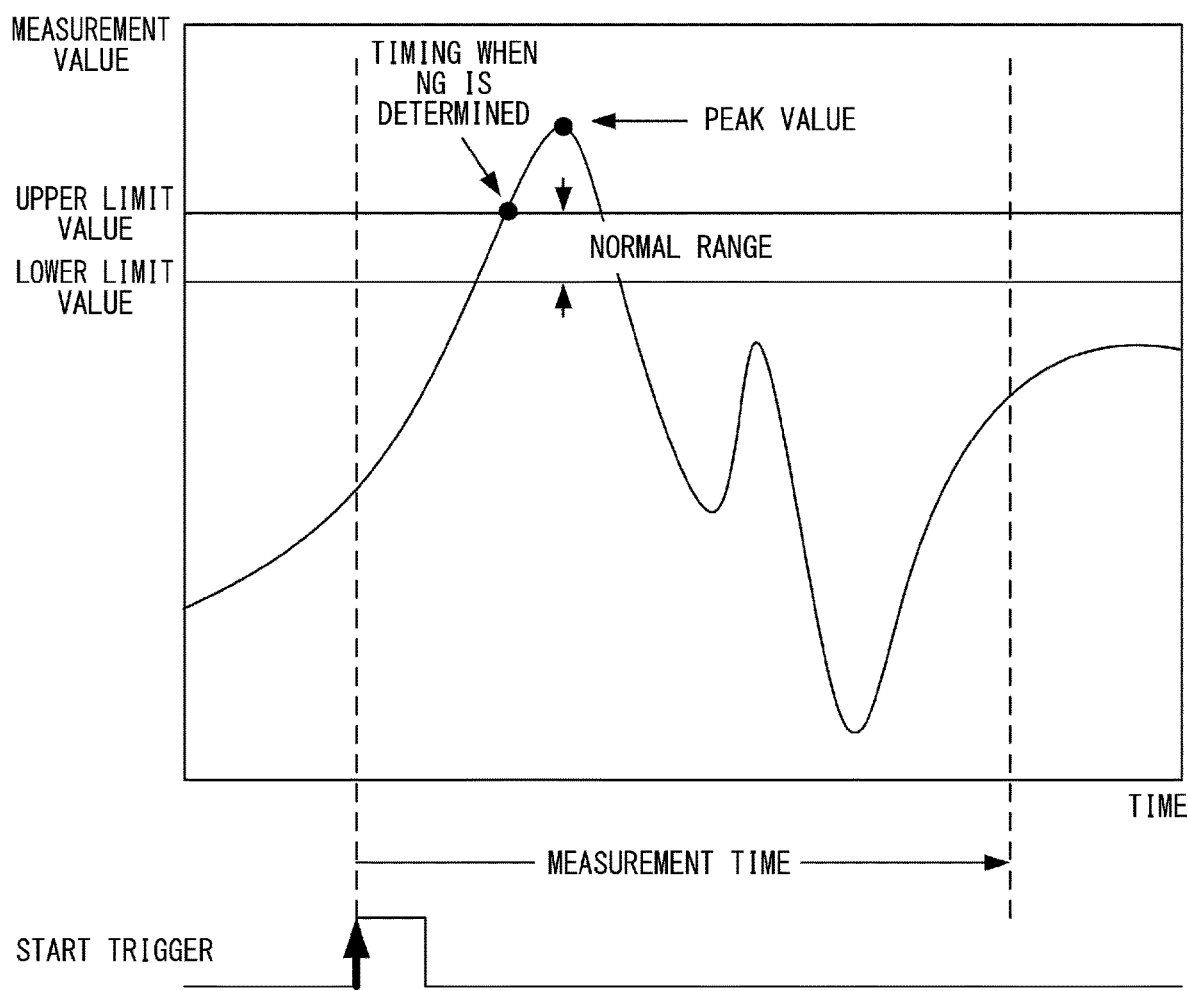
FIG. 25 is a diagram illustrating the waveform upper/lower limit monitoring application.

FIG. 25 illustrates another example of the peak (bottom) upper/lower limit monitoring. In FIG. 25, the measurement value deviates from the normal range in the middle of the measurement time. In this case, the CPU 41a (the analyzer 54 and the application notifier 91) issues a notification indicating that the peak value exceeds the upper limit value at a timing when the measurement value exceeds the upper limit value. When the upper/lower limit monitoring of the peak value is executed in this manner, the notification notifying NG is issued at the timing when the measurement value exceeds the upper limit value.

Note that, in a case where the bottom value is not equal to or less than the upper limit value and equal to or more than the lower limit value within the measurement time when the upper/lower limit monitoring of the bottom value is performed, the CPU 41a notifies NG. A determination timing in this case is an end timing of the measurement time. On the other hand, in a case where the measurement value falls below the lower limit value in the middle of the measurement time, the CPU 41a immediately issues the NG notification.

Timing Upper/Lower Limit Monitoring

Figure 26:
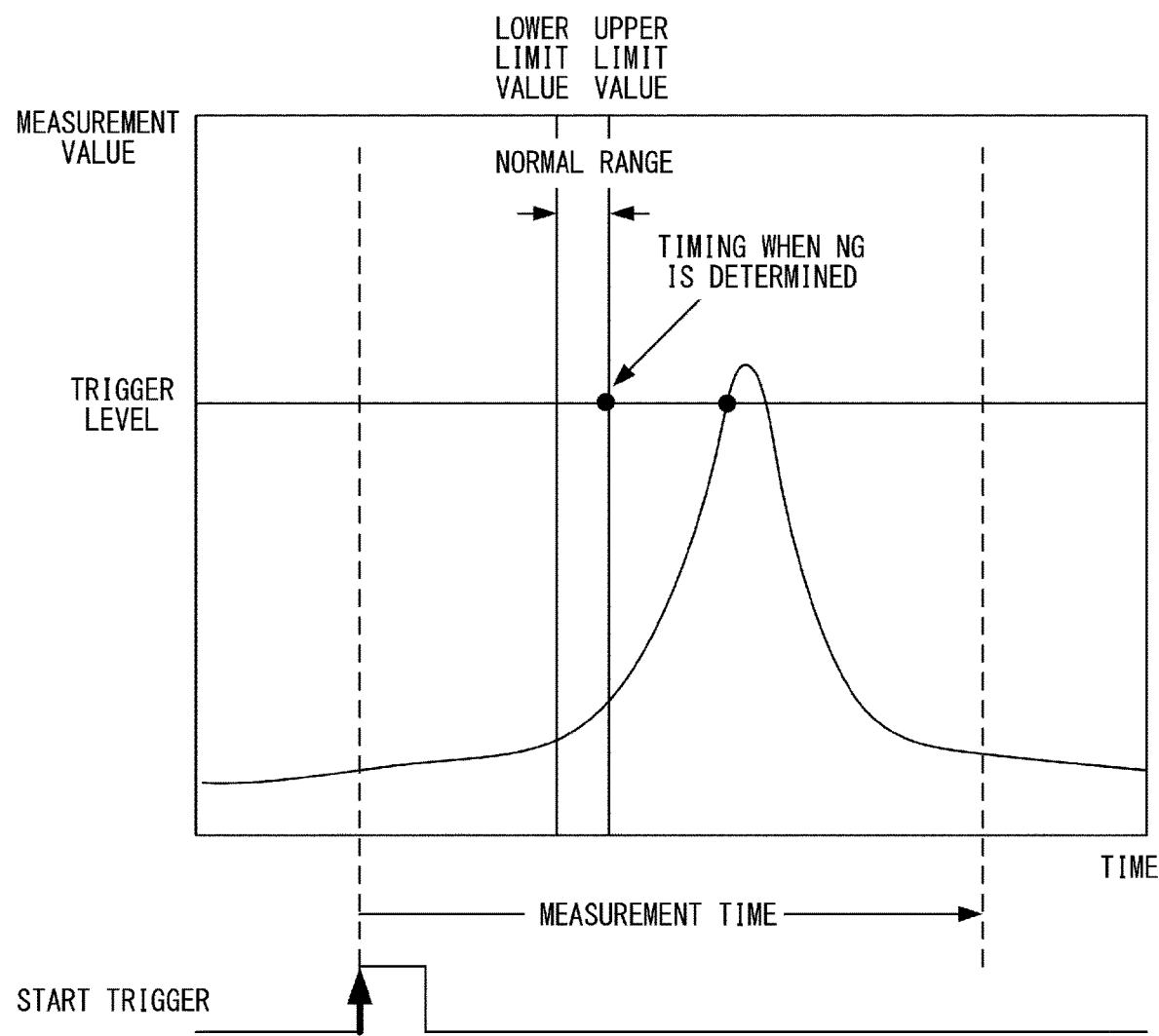
FIG. 26 is a diagram illustrating the waveform upper/lower limit monitoring application.

FIG. 26 is a diagram illustrating timing upper/lower limit monitoring. The timing upper/lower limit monitoring refers to monitoring a change timing of a measurement value. The change timing is, for example, a timing when the measurement value exceeds a threshold (trigger level) or the like.

The CPU 41a (analyzer 54) determines whether the timing when the measurement value exceeds the threshold (trigger level) is within a normal range. That is, if the timing when the measurement value exceeds the trigger level is equal to or more than a lower limit value and equal to or less than an upper limit value, the CPU 41a determines that the state is normal. In FIG. 26, the timing when the measurement value exceeds the trigger level exceeds the upper limit value, and thus, the CPU 41*a* (application notifier 91) issues a notification notifying NG. A determination timing in this case is a timing corresponding to the upper limit value.

Figure 27:
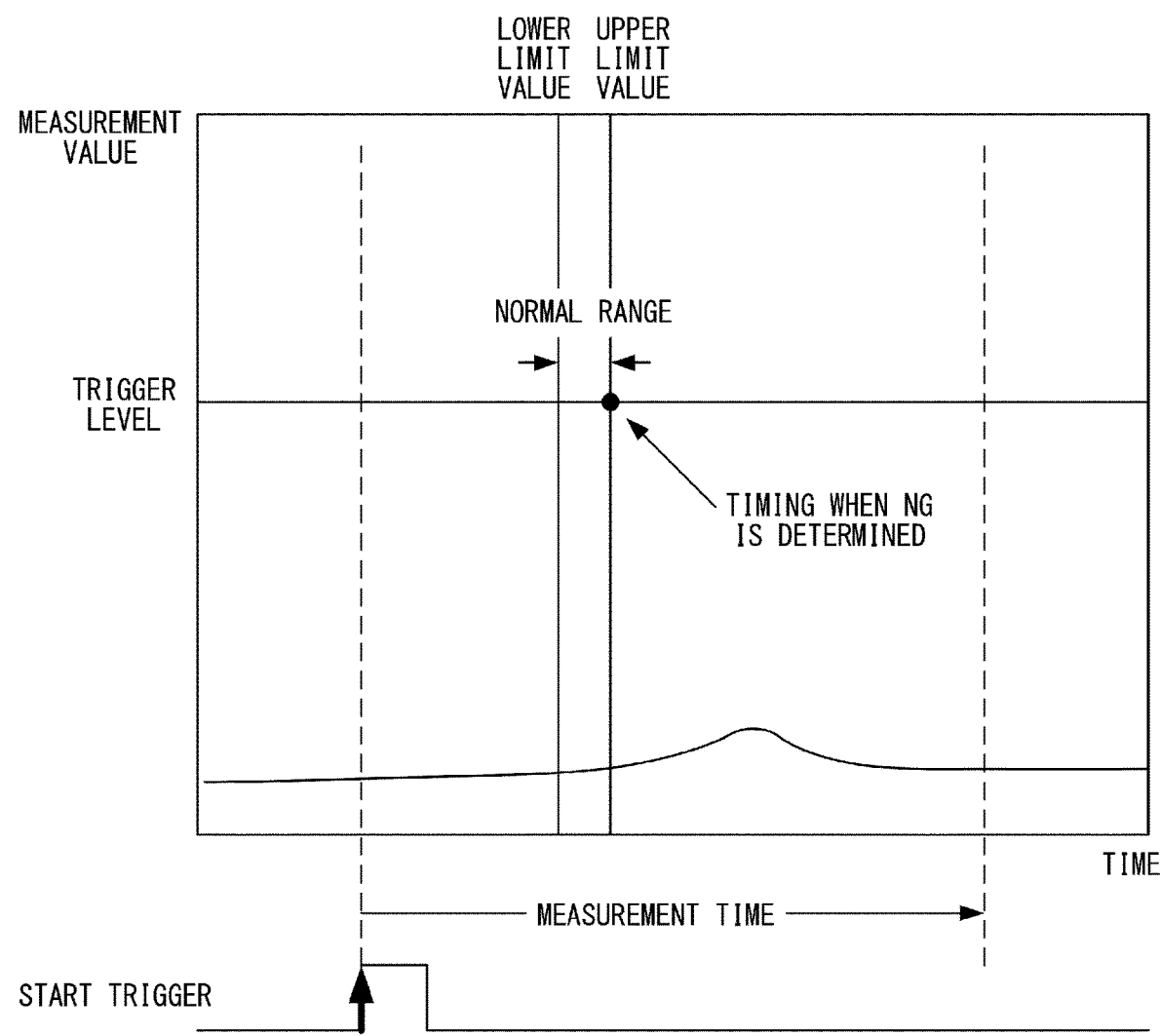
FIG. 27 is a diagram illustrating the waveform upper/lower limit monitoring application.

FIG. 27 illustrates a case where the measurement value has not exceeded the trigger level within the normal range. The CPU 41*a* (the analyzer 54 and the application notifier 91) issues the notification notifying NG because the measurement value has not reached the trigger level within the normal range. A determination timing in this case is a timing corresponding to the upper limit value.

Figure 28:
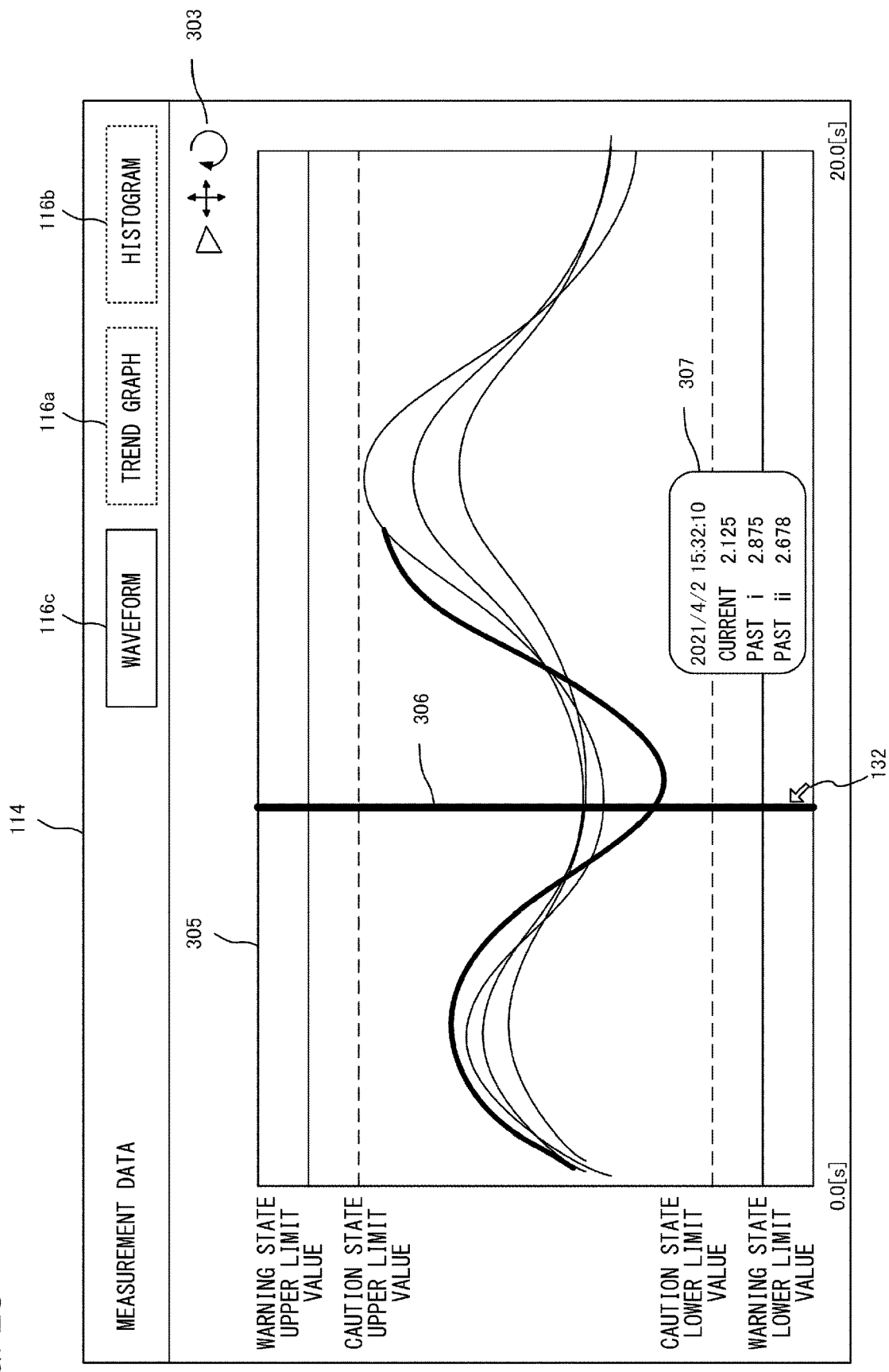
FIG. 28 is a diagram illustrating the waveform upper/lower limit monitoring application.

FIG. 28 illustrates a UI of the detailed display area 114 in the waveform upper/lower limit monitoring application. In the waveform upper/lower limit monitoring application, a button 116*c* for instructing a waveform display is provided in the detailed display area 114 of the UI illustrated in FIG. 12. The buttons 116*a* to 116*c* may be implemented as tabs.

When the button 116*c* is pressed, the CPU 41*a* (display processor 84) displays a waveform, which is time-series data of measurement values, in a waveform display area 305. In this example, a length of a horizontal axis (display range) of the waveform display area 305 corresponds to one measurement time. The CPU 41*a* determines a vertical axis (display range) of the waveform display area 305 based on a maximum value and a minimum value in past measurement values. That is, a scale of the vertical axis is set such that the maximum value and the minimum value in the past measurement values are not out of the display range. The CPU 41*a* may display thresholds of the warning state and the caution state in the waveform display area 305. The CPU 41*a* may display a cursor 306 in the waveform display area 305. The cursor 306 can be moved in the horizontal-axis direction in response to the user's operation, and designates a collection time (collection timing) of a measurement value displayed on a tooltip 307. The tooltip 307 displays a current measurement value and past measurement values for the same elapsed time with a start trigger as a reference. A display control 303 may include a control object for instructing the CPU 41*a* to stop or resume updating of the display of the waveform display area 305. The display control 303 may include a control object for instructing the CPU 41*a* to enlarge or reduce the horizontal axis (time axis) of the waveform display area 305. The CPU 41*a* may receive a movement operation of the enlarged display range and move the display range of the waveform according to the movement operation.

In FIG. 28, a plurality of waveforms are displayed in the synchronous mode, but the waveforms may be displayed in the asynchronous mode. For example, if a waveform cut-out technique is not set, the CPU 41*a* displays the most recent measurement value at a right edge of the waveform display area 305. When the most recent measurement value is updated, the CPU 41*a* displays the most recent measurement value on the right edge of the waveform display area 305 and displays the past measurement value on the left side thereof. As a result, the waveform is displayed such that the waveform moves from the right edge to a left edge of the waveform display area 305. In this case, the display range of the horizontal axis of the waveform display area 305 may be set according to a maximum monitoring time. The CPU 41*a* (the display processor 84 and the setting part 80) may adjust the display range of the vertical axis according to a maximum value and a minimum value in a plurality of measurement values acquired so far.

The CPU 41*a* (display processor 84) may display thresholds of the respective states in the waveform display area 305. In this case, the CPU 41*a* may set display colors of the current measurement value, the past measurement value, and the thresholds of the respective states in different colors.

Monitoring Technique

FIG. 29 illustrates a relation between a monitoring technique (waveform cut-out technique) and a determination technique in the waveform upper/lower limit monitoring application. "Only start trigger" is a monitoring technique in which a time from one start trigger to the next start trigger is set as a measurement time (monitoring time). "Start trigger/end trigger" is a monitoring technique in which a time from a start trigger to an end trigger is set as a measurement time (monitoring time). "Start trigger/monitoring time" is a monitoring technique in which a predetermined time starting from a start trigger is set as a monitoring time. "Constant monitoring" is a technique of constantly performing monitoring. "Sample trigger" is a technique of monitoring a value only at the moment when a sample trigger enters.

As illustrated in FIG. 29, there are five waveform display patterns obtained by combining the monitoring techniques and state determination techniques. In a first pattern, a waveform does not move, and the left edge of the waveform display area 305 corresponds to a start trigger occurrence time. A position of a right edge of the waveform display area 305 is a position corresponding to a maximum range of a waveform cut-out range (monitoring time) applied to a waveform acquired in the past. When generation timings of triggers are non-cyclic, a variation occurs in the waveform cut-out range (monitoring time). Therefore, the position of the right edge of the waveform display area 305 may be set according to such a variation. Not only the most recent waveform but also one or more past waveforms may be displayed in the waveform display area 305. In addition, thresholds corresponding to the respective states may be displayed as horizontal bars.

A second pattern is a technique in which a waveform is continuously displayed so as to move from a right edge to a left edge in the waveform display area 305. A display range of the horizontal axis of the waveform display area 305 is a maximum measurement time set by the user in advance. Thresholds corresponding to the respective states are displayed as horizontal bars.

A third pattern is a technique in which a waveform is continuously displayed so as to move from a right edge to a left edge in the waveform display area 305. A display range of the horizontal axis of the waveform display area 305 is a maximum measurement time set by the user in advance. Thresholds corresponding to the respective states are displayed as horizontal bars.

In a fourth pattern, a waveform does not move, and a left edge of the waveform display area 305 corresponds to a start trigger occurrence time. A position of a right edge of the waveform display area 305 is a position of the end of a waveform cut-out range (monitoring time). Not only the most recent waveform but also one or more past waveforms may be displayed in the waveform display area 305. In addition, thresholds corresponding to the respective states are displayed as horizontal bars.

In a fifth pattern, a waveform does not move, and a left edge of the waveform display area 305 corresponds to a start trigger occurrence time. A position of a right edge of the waveform display area 305 is a position of the end of a waveform cut-out range (monitoring time). Not only the most recent waveform but also one or more past waveforms may be displayed in the waveform display area 305. In addition, thresholds corresponding to the respective states are displayed as vertical bars. Furthermore, a horizontal bar indicating the trigger level to be used for determination is also displayed at the change timing.

Figure 30:
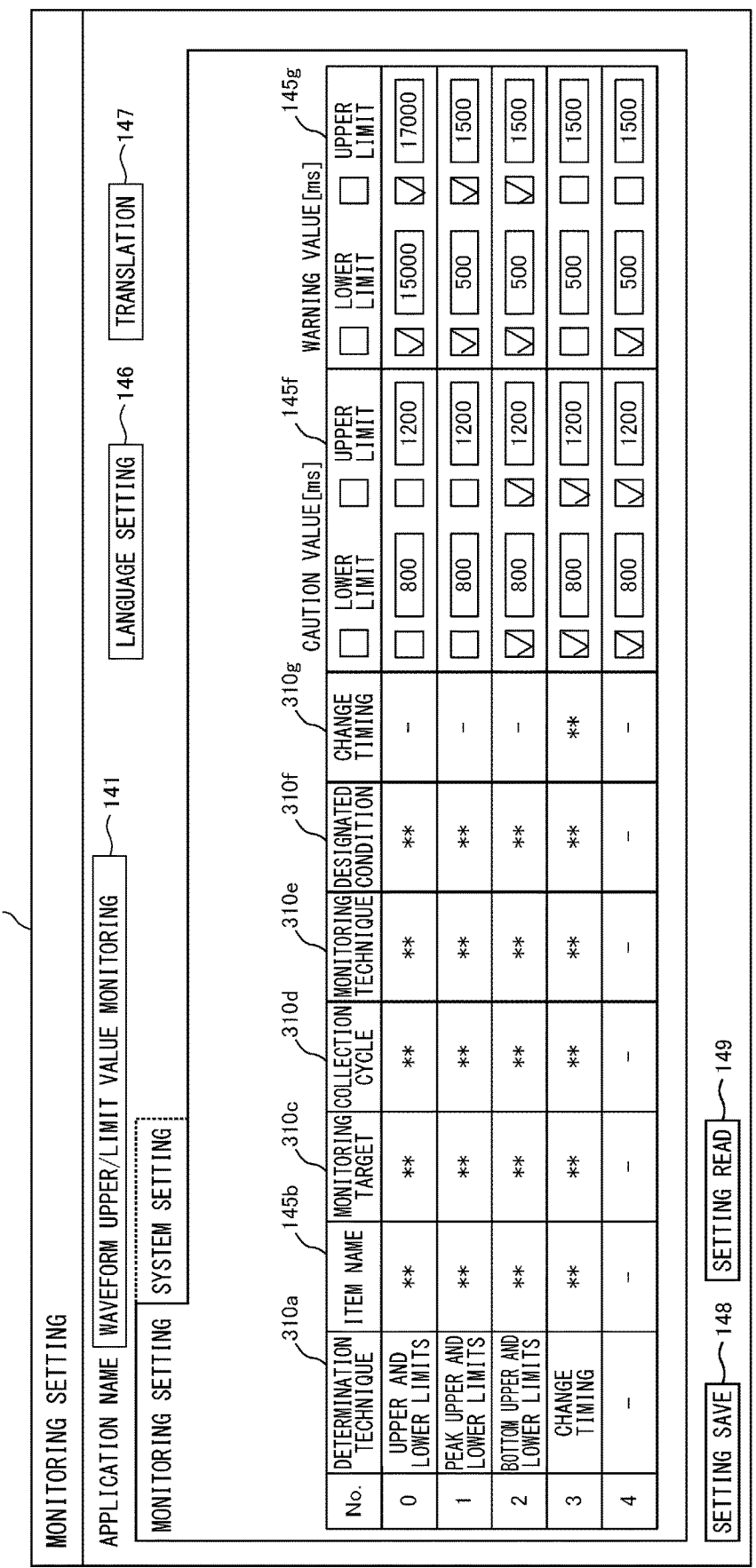
FIG. 30 is a diagram illustrating the setting wizard.

FIG. 30 illustrates the setting wizard 140 for the waveform upper/lower limit monitoring application. The portion that has been already described is denoted by the same reference sign.

A determination technique setting part 310a receives a setting of any of the waveform determination techniques described above. A monitoring target setting part 310c receives settings of a unit, a device (or variable), a data type, or the like which serves as a monitoring target. A collection cycle setting part 310d receives a setting a collection cycle (e.g., a fixed cycle or scan time) for the monitoring target. If the fixed cycle is selected, a setting of a specific cycle length (e.g., 50 milliseconds) or the like is also received. A monitoring technique setting part 310e selects one of the monitoring techniques described above (e.g., "only start trigger", "start trigger/end trigger", and the like). A designation condition setting part 310f receives settings of a device serving as a trigger, a timing (falling or rising) of a trigger signal, a monitoring time, and the like. A change timing setting part 310g receives the trigger level and a condition for the trigger level when the determination technique is the change timing (timing upper/lower limit monitoring). The condition for the trigger level means, for example, comparing a time (measurement time) required until a measurement value exceeds (or falls below) the trigger level with an upper limit value or a lower limit value of each state. For example, "exceed" or "below" may be selected as the condition for the trigger level.

Although being omitted in FIG. 30, the monitoring enabler 145e, which receives a designation of whether to enable or disable monitoring may be provided per item. In addition, a detailed setting button or the like may be provided. When the detailed setting button is pressed, for example, a setting of the number of decimal places of a numerical value displayed on a dashboard may be received.

[Waveform Guard Band Monitoring Application]

Waveform guard band monitoring refers to monitoring whether a waveform formed of measurement values is within a normal range (guard band) defined by an upper limit value waveform and a lower limit value waveform. The upper limit value waveform and the lower limit value waveform may be called guard band waveforms (threshold waveforms). Note that the waveform guard band monitoring application and the waveform upper/lower limit monitoring application are substantially common applications. However, these have different thresholds in the determination technique. In the waveform upper/lower limit monitoring application, the threshold is designated as a fixed value. On the other hand, the threshold is designated as the waveform in the waveform guard band monitoring application. Furthermore, only "start trigger/measurement time" is used as the monitoring technique in the waveform guard band monitoring application. This is because a time length of a measurement waveform needs to match a time length of a threshold waveform in order to compare the measurement waveform with the threshold waveform. In the waveform upper/lower limit monitoring application, any pattern among the five types of patterns illustrated in FIG. 29 is used.

Figure 31:
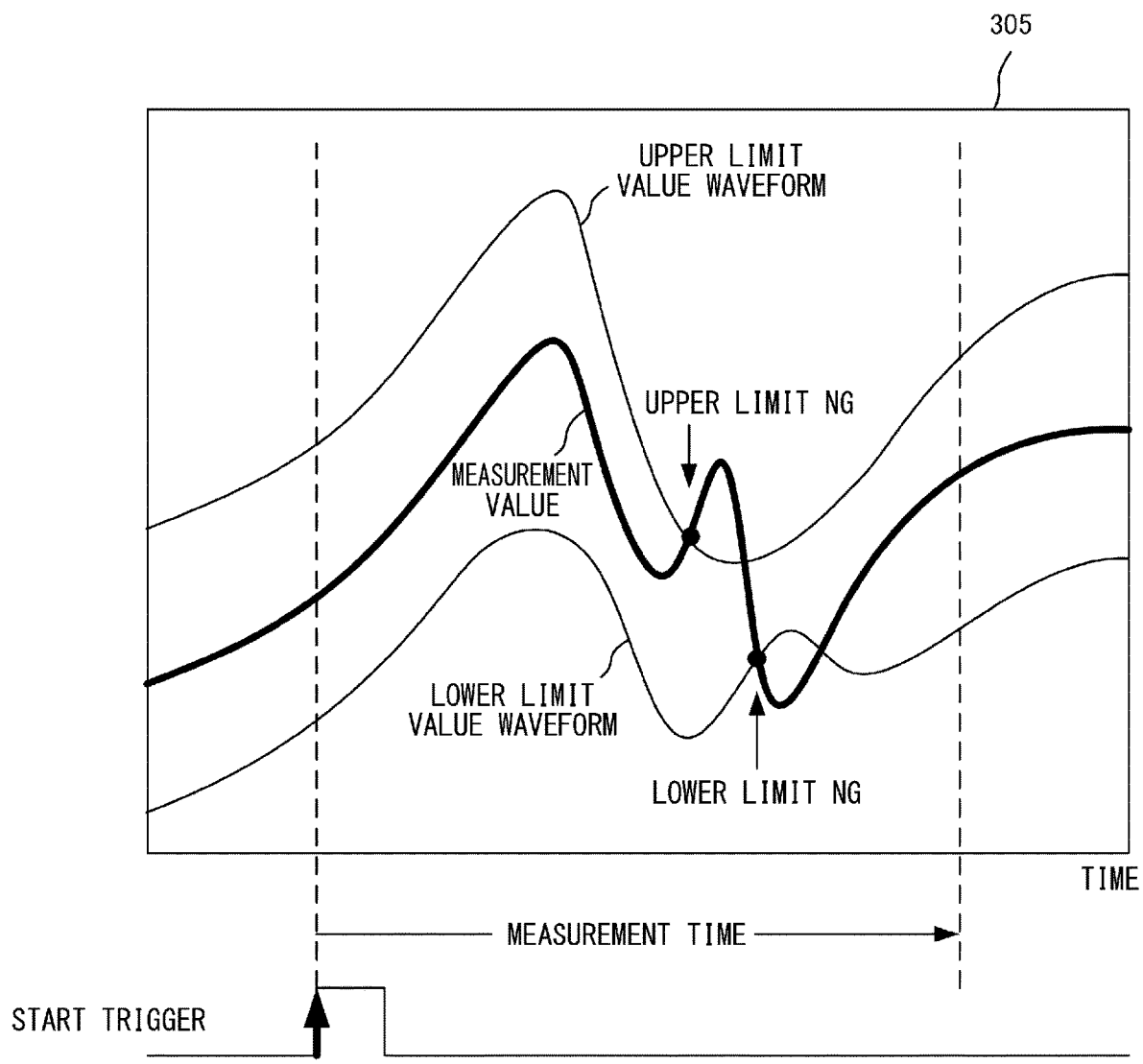
FIG. 31 is a diagram illustrating a waveform guard band monitoring application.

FIG. 31 illustrates waveforms to be displayed in the waveform display area 305 of the waveform guard band monitoring application. The CPU 41a sets a threshold waveform and a measurement waveform to be synchronized with a start trigger as a reference, and compares a measurement value acquired over time with the threshold waveform. In this example, a normal range is a band-shaped range (guard band) between an upper limit value waveform and a lower limit value waveform. In FIG. 31, the measurement value exceeds the upper limit value waveform at a certain timing, and thus, the CPU 41a (the analyzer 54 and the application notifier 91) determines that upper limit NG has occurred and issues a notification. In FIG. 31, the measurement value is below the lower limit value waveform at another timing, the CPU 41a determines that lower limit NG has occurred and issues a notification.

Setting Method of Threshold Waveform

Figure 32:
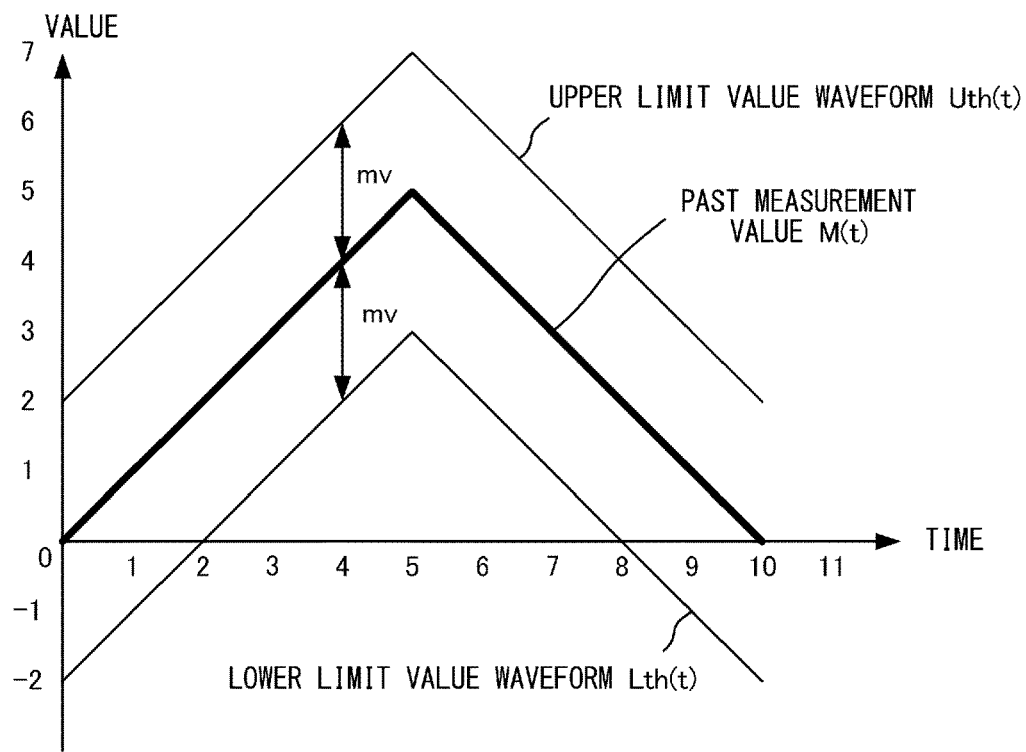
FIG. 32 is a diagram illustrating a technique for determining a threshold waveform.

FIG. 32 illustrates a setting method (calculation rule) of a threshold waveform. A vertical axis represents a value, and a horizontal axis represents time. The CPU 41a (threshold setting part 58) determines an upper limit value waveform and a lower limit value waveform based on past measurement data and a value tolerance width my designated in advance by the user. The past measurement data may be measurement data obtained by one-time measurement or an average value data of measurement data obtained by a plurality of times of measurement. In this example, an upper limit value waveform Uth(t) is calculated by adding the value tolerance width my to a past measurement value M(t). Similarly, a lower limit value waveform Lth(t) is calculated by subtracting the value tolerance width my from the past measurement value M(t).

Figure 33:
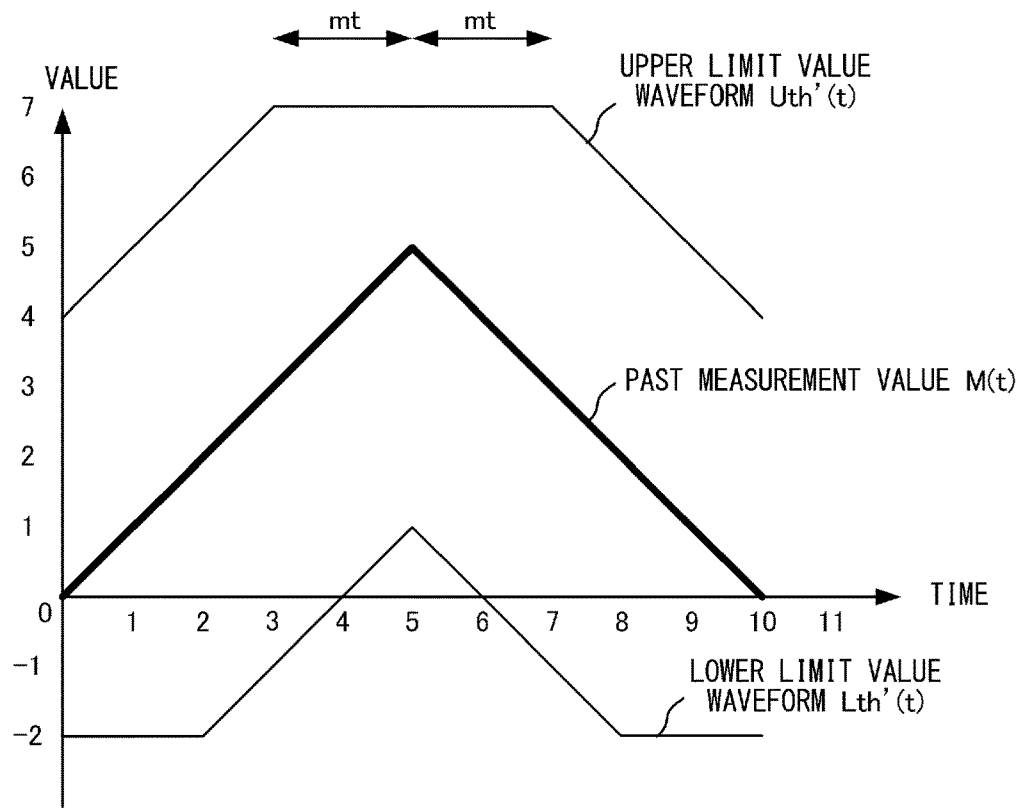
FIG. 33 is a diagram illustrating the technique for determining a threshold waveform.

FIG. 33 illustrates another setting method (calculation rule) of a threshold waveform. In this example, the upper limit value waveform Uth(t) and the lower limit value waveform Lth(t) obtained using the value tolerance width my are deformed using a time tolerance width mt. For example, when the time tolerance width mt is 2, a new upper limit value waveform Uth'(t) is obtained as follows. First, a maximum value Uth_max(t) is obtained among Uth(t−2), Uth(t−1), Uth(t), Uth(t+1), and Uth(t+2). When t=3, Uth_max(3) is 7. Accordingly, Uth'(3) is determined to be 7.

A new lower limit value waveform Lth'(t) is obtained as follows. When the time tolerance width mt is 2, a minimum value Lth_min(t) is obtained among Lth(t−2), Lth(t−1), Lth(t), Lth(t+1), and Lth(t+2). When t=3, Lth_min(3) is −1. Accordingly, Lth'(3) is determined to be −1.

In this manner the upper limit value Uth'(t) at certain time t is determined to be the maximum value among (mt+1) measurement values (Uth when the value tolerance width my is used) acquired between time t−mt and time t+mt. Similarly, the lower limit value Lth'(t) at certain time t is determined to be the maximum value among (mt+1) measurement values (Lth when the value tolerance width my is used) acquired between time t−mt and time t+mt.

Figure 34:
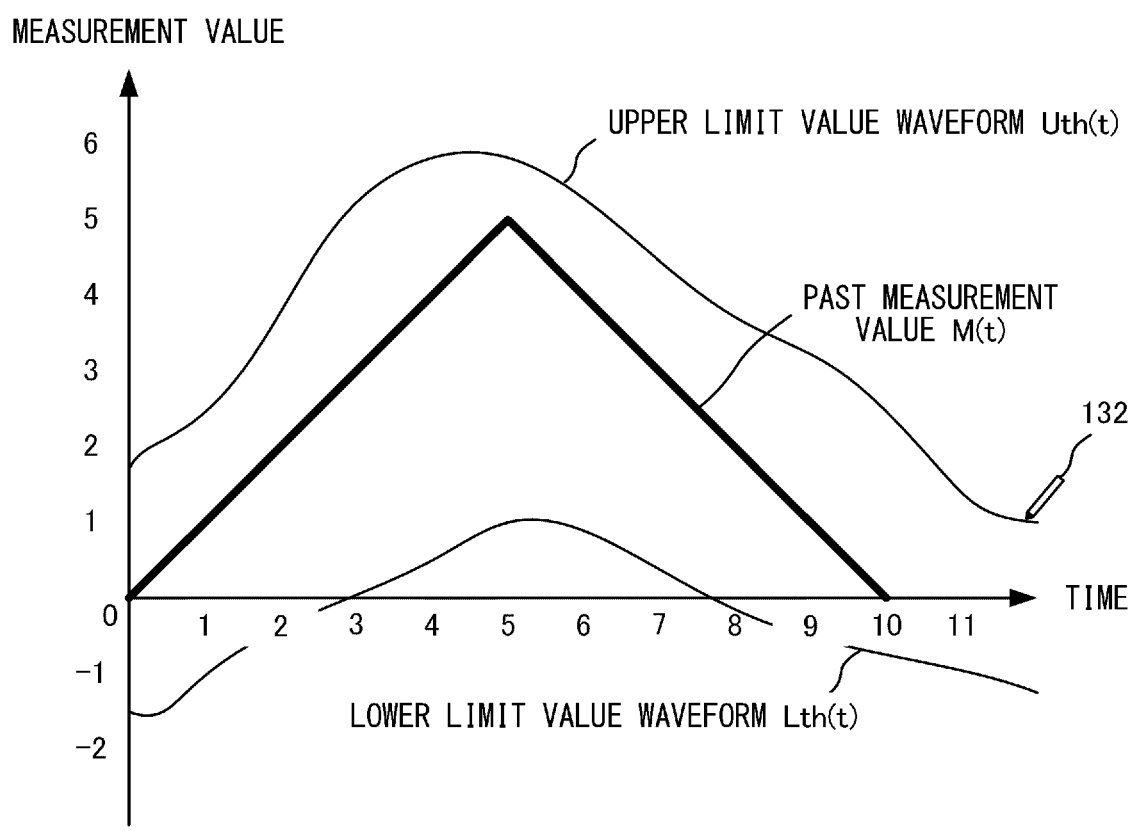
FIG. 34 is a diagram illustrating the technique for determining a threshold waveform.

FIG. 34 illustrates still another setting method of a threshold waveform. The CPU 41a (threshold setting part 58) may determine a free curve, drawn based on a trajectory of the pointer 132 linked to the operation of the operation part 8 of the PC 2b, or the like as the upper limit value Uth(t) and the lower limit value Lth(t). For example, the CPU 41a may save coordinate data of the trajectory (free curve) of the pointer 132 as a file in a CSV format. The CPU 41a creates a file path by combining an application ID and a number of a monitoring item and saves the file in the CSV format with the file path. As a result, the file in the CSV format including the upper limit value and the lower limit value for each combination of the monitoring application and the monitoring item is saved.

Figure 35:
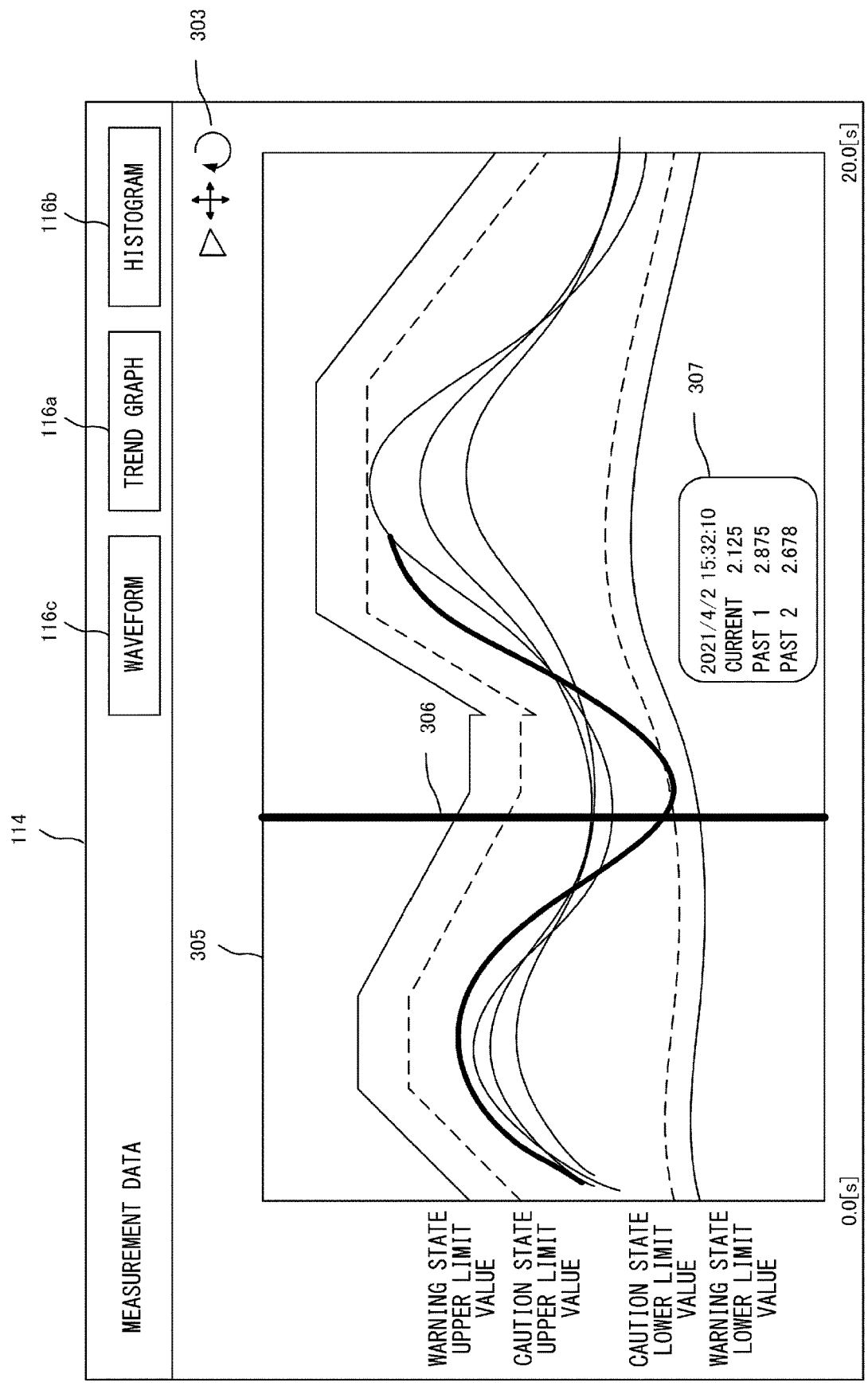
FIG. 35 is a diagram illustrating the display screen.

FIG. 35 illustrates a UI of the detailed display area 114 in the waveform guard band monitoring application. A different point in FIG. 35 as compared with FIG. 28 is that a threshold of each state is set as a waveform. The other display techniques in the waveform guard band monitoring application are the same as those in the waveform upper/lower limit monitoring application. For example, three waveforms measured in the past may also be displayed in addition to the current waveform.

As described above, the monitoring techniques of the waveform guard band monitoring application are defined using the start trigger and the measurement time. However, in a rare case, a monitoring technique is not set by the user. In such a case, the CPU 41*a* (display processor 84) updates a display as time elapses such that the most recent measurement value in a measurement waveform is displayed at a right edge of the waveform display area 305. That is, the waveform moves from the right edge to a left edge of the waveform display area 305 in the same manner as in the asynchronous mode. The CPU 41*a* may display a threshold waveform of each state with a start trigger as a reference, together with the measurement waveform. Note that a display range of a horizontal axis of the waveform display area 305 is set to a maximum monitoring time determined by the user in advance.

Figure 36:
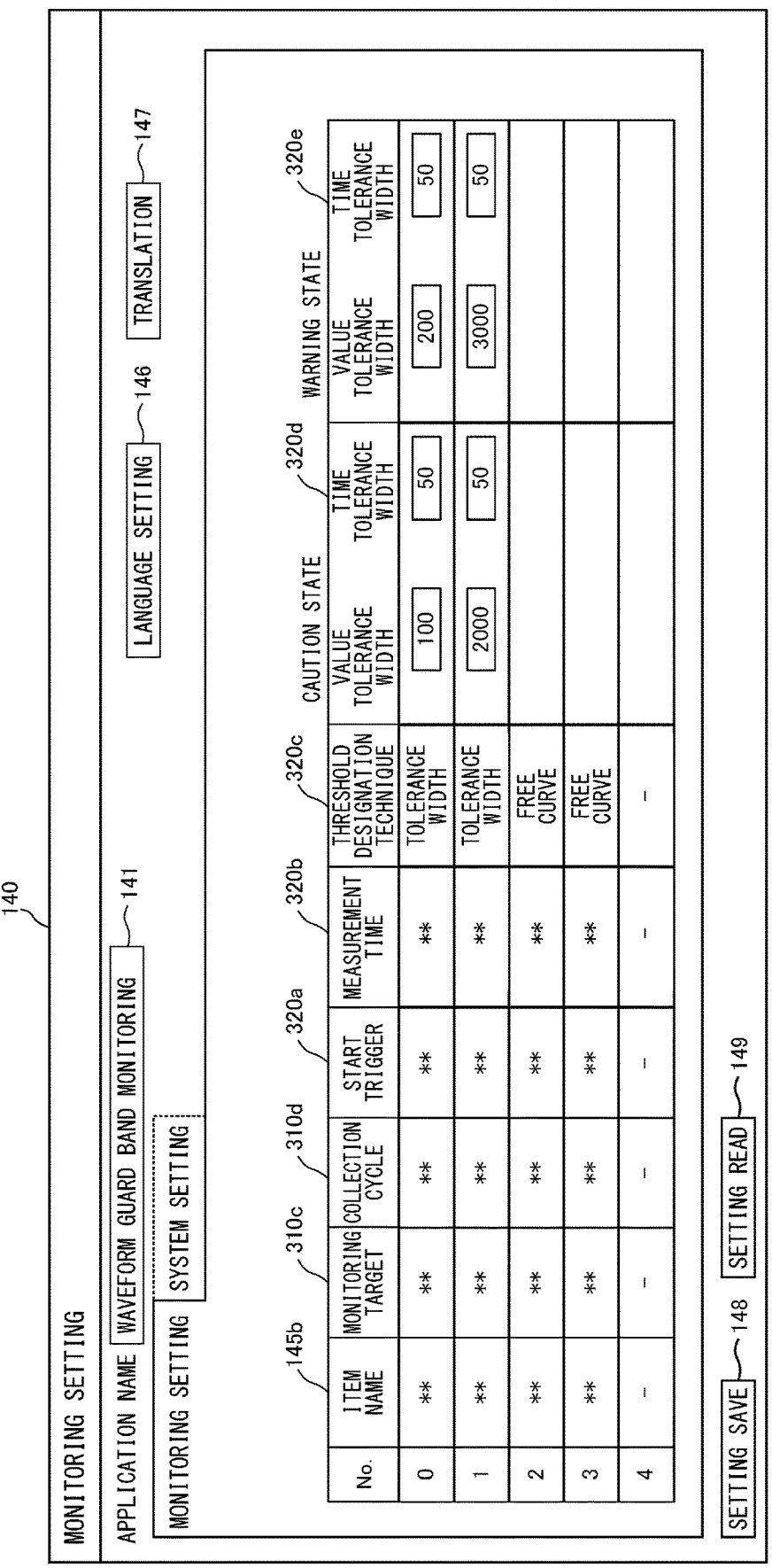
FIG. 36 is a diagram illustrating the setting wizard.

FIG. 36 illustrates the setting wizard 140 for the waveform guard band monitoring application. The portion that has been already described is denoted by the same reference sign. The setting part 80 displays the setting wizard 140 on the PC 2*b* and receives various settings. A start trigger setting part 320*a* receives a setting of a device or the like that serves as a start trigger. A measurement time setting part 320*b* receives a setting of a measurement time (monitoring time) with the start trigger as a reference. A threshold designation technique setting part 320*c* receives a setting of a threshold designation technique. As described above, either the technique of designating the tolerance width (value tolerance width and time tolerance width) and the past measurement data or the technique of designating the threshold waveform using the free curve may be selected by the user. If another technique has been implemented, the another technique also serves as an option. In a tolerance width setting part 320*d*, a setting of the value tolerance width my and the time tolerance width mt related to the caution state is received. In a tolerance width setting part 320*e*, a setting of the value tolerance width my and the time tolerance width mt related to the warning state is received. The tolerance width setting part 320*d* and the tolerance width setting part 320*e* receive the common value tolerance width my and time tolerance width mt for the upper limit threshold waveform and the lower threshold waveform, but this is merely an example. The value tolerance width my and the time tolerance width mt for the upper limit threshold waveform, and the value tolerance width my and the time tolerance width mt for the lower limit threshold waveform may be individually received.

[Flowchart]

Process Monitoring Application and Timing Monitoring Application

Figure 37:
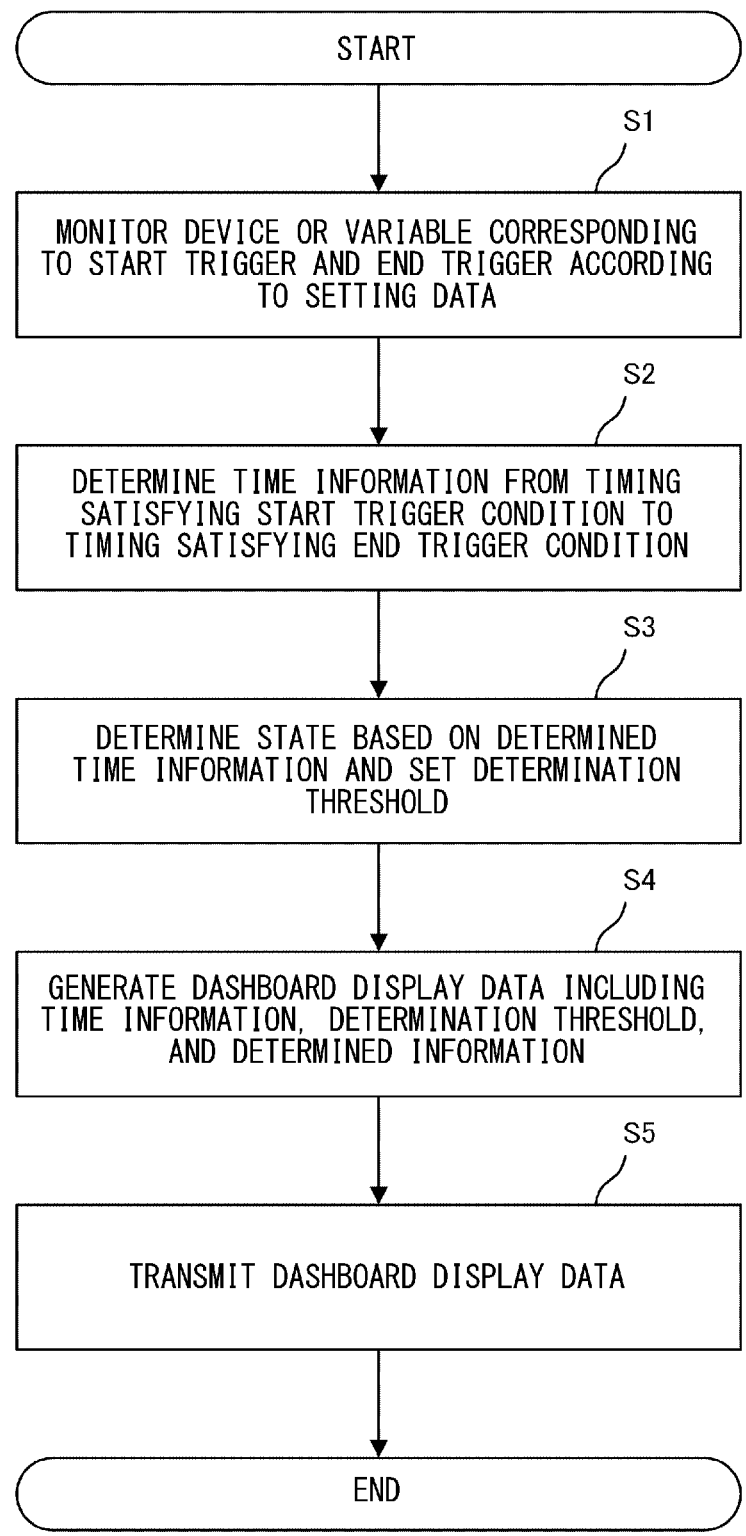
FIG. 37 is a flowchart illustrating process monitoring and timing monitoring.

FIG. 37 is a flowchart illustrating a monitoring process executed by the CPU 41*a* of the expansion unit 4*a*. Since the timing monitoring application is the function-reduced version (subset) of the process monitoring application as described above, the processing applied to both the applications will be described hereinafter. In addition, the monitoring application includes a data utilization program executed in the expansion unit 4*a* and a web application executed in the web browser of the PC 2*b*.

In S41, the CPU 41*a* (collector 82) monitors a device or a variable corresponding to a start trigger and an end trigger according to the setting data 73. The setting data 73 holds a name of the device or variable used as the start trigger and a predetermined value stored in the device or variable. A timing when the value of the device or variable has changed to a predetermined value may be set as a starting timing, or a condition that a change of the device or variable is a rising edge or a falling edge may be set as a start condition. The same also applies for the end trigger. The CPU 41*a* (collector 82) executes the data utilization program based on the setting data 73 to collect the device value as a collection target designated by the setting data 73, and stores the device value in the memory 42*a* as the collected data 76. Here, the collected data 76 may be time-series data collected at different times. In addition to the data utilization program, a collection program that executes the collection operation according to the collection setting data 74*a* in the setting data 73 may be provided.

In S2, the CPU 41*a* (data processor 83) executes the data utilization program designated by the utilization program template 72. The CPU 41*a* (data processor 83) executes the data utilization program to determine time information from a timing of satisfying a condition of the start trigger to a timing of satisfying a condition of the end trigger based on the collected data 75 (device value). The CPU 41*a* (data processor 83) monitors whether the device or variable set as a monitoring target satisfies the condition such as the rising edge. Here, the timing of satisfying the condition, that is, the timing of satisfying the condition of the start trigger is monitored. The CPU 41*a* (data processor 83) monitors whether the device or variable set as a monitoring target satisfies the condition such as the rising edge. Here, the timing of satisfying the condition, that is, the timing of satisfying the condition of the end trigger is monitored. The time information determined by the CPU 41*a* (data processor 83) may be a time width (measurement time) from the timing of satisfying the condition of the start trigger to the timing of satisfying the condition of the end trigger.

In S3, the CPU 41*a* (data processor 83) determines a state based on the time information determined in S2 and a determination threshold set according to the setting data 73. The CPU 41*a* (data processor 83) executes this determination by executing the data utilization program. There is a case where upper limit values and lower limit values for a caution state and a warning state are set as the determination threshold. In this case, the CPU 41*a* (data processor 83) determines whether or not the determined time information, which is a measurement value, exceeds the upper limit value. In addition, the CPU 41*a* (data processor 83) determines whether or not the determined time information is below the lower limit value. The state as a monitoring target may include a normal state, the caution state, and the warning state. The caution state and the warning state are distinguished based on the degree of discrepancy of a measurement value with respect to the normal state. A difference between a measurement value in the normal state (a normal value) and a measurement value in the warning state (a warning value) is greater than a difference between the measurement value in the normal state and a measurement value in the caution state (a caution value). Therefore, a value, which is more discrepant from the normal value than a threshold of the caution state, is set as a threshold of the warning state. There is a case where the threshold of the caution state and the threshold of the warning state are set as upper limit values, respectively. In this case, the CPU 41*a* (data processor 83) determines that the monitoring target state is the "normal state" when the determined time information is equal to or less than the threshold of the caution state. The CPU 41*a* (data processor 83) determines that the monitoring target state is the "caution state" when the determined time information exceeds the threshold of the caution state and is equal to or less than the threshold of the warning state. The CPU 41a (data processor 83) determines that the monitoring target state is the "warning state" when the determined time information exceeds the threshold of the warning state. As a result, the interpreted data 76 is created and saved in the memory 42a.

There is a case where the threshold of the caution state and the threshold of the warning state are set as lower limit values, respectively. In this case, the CPU 41a (data processor 83) determines that the monitoring target state is the "normal state" when the determined time information is equal to or more than the threshold of the caution state. The CPU 41a (data processor 83) determines that the monitoring target state is the "caution state" when the determined time information is less than the threshold of the caution state and is equal to or more than the threshold of the warning state. The CPU 41a (data processor 83) determines that the monitoring target state is the "warning state" when the determined time information is less than the threshold of the warning state. As a result, the interpreted data 76 is created and saved in the memory 42a.

There is a case where each of the threshold of the caution state and the threshold of the warning state is set by an upper limit value and a lower limit value. In this case, the CPU 41a (data processor 83) determines that the monitoring target state is the "normal state" when the determined time information is equal to or more than a lower limit value of the caution state and the determined time information is equal to or less than a threshold upper limit of the caution state. The CPU 41a (data processor 83) determines that the monitoring target state is the "caution state" when the determined time information is less than an upper limit value of the warning state and is equal to or more than an upper limit threshold of the caution state. Similarly, the CPU 41a (data processor 83) determines that the monitoring target state is the "caution state" when the determined time information is less than a lower limit value of the caution state and is equal to or more than the lower limit value of the warning state. The CPU 41a (data processor 83) determines that the monitoring target state is the "warning state" when the determined time information is less than a lower limit threshold of the warning state or when the determined time information exceeds an upper limit threshold of the warning state. As a result, the interpreted data 76 is created and saved in the memory 42a.

In S4, the CPU 41a (display processor 84) generates dashboard the display data 77 including the time information determined in S42, the determination threshold, and the monitoring target state determined in S3. The CPU 41a (display processor 84) reflects the time information determined based on the dashboard template 71 and the setting data 73, the determination threshold, and the determined monitoring target state in a variable assigned to the dashboard template 71. For example, the CPU 41a creates the display data 77 such that a measurement value indicating the time width from the timing of satisfying the condition of the start trigger to the timing of satisfying the condition of the end trigger is displayed in a format of a bar graph in the chart display area 106d. The display data 77 may be created as a part of the web application. This timing and a time from the timing of satisfying the condition of the start trigger to the timing of satisfying the condition of the end trigger may be displayed in band shapes. As a result, a dashboard indicating not only the time width but also any timing in the cycle at which each monitoring target is operating is displayed in the control of the cycle operation. The CPU 41a may create the display data 77 by periodically updating display target data. The CPU 41a creates the display data 77 using the display target data such as the collected data 75 and/or the interpreted data 76.

In S5, the CPU 41a (web server 85) provides the display data 77 to the PC 2b. The CPU 41a may display the display data 77 on a display (HMI 16) of the PLC 1. The display of the PLC 1 may be built in the PLC 1 or may be connected to the PLC 1 in a wired or wireless manner.

Figure 38:
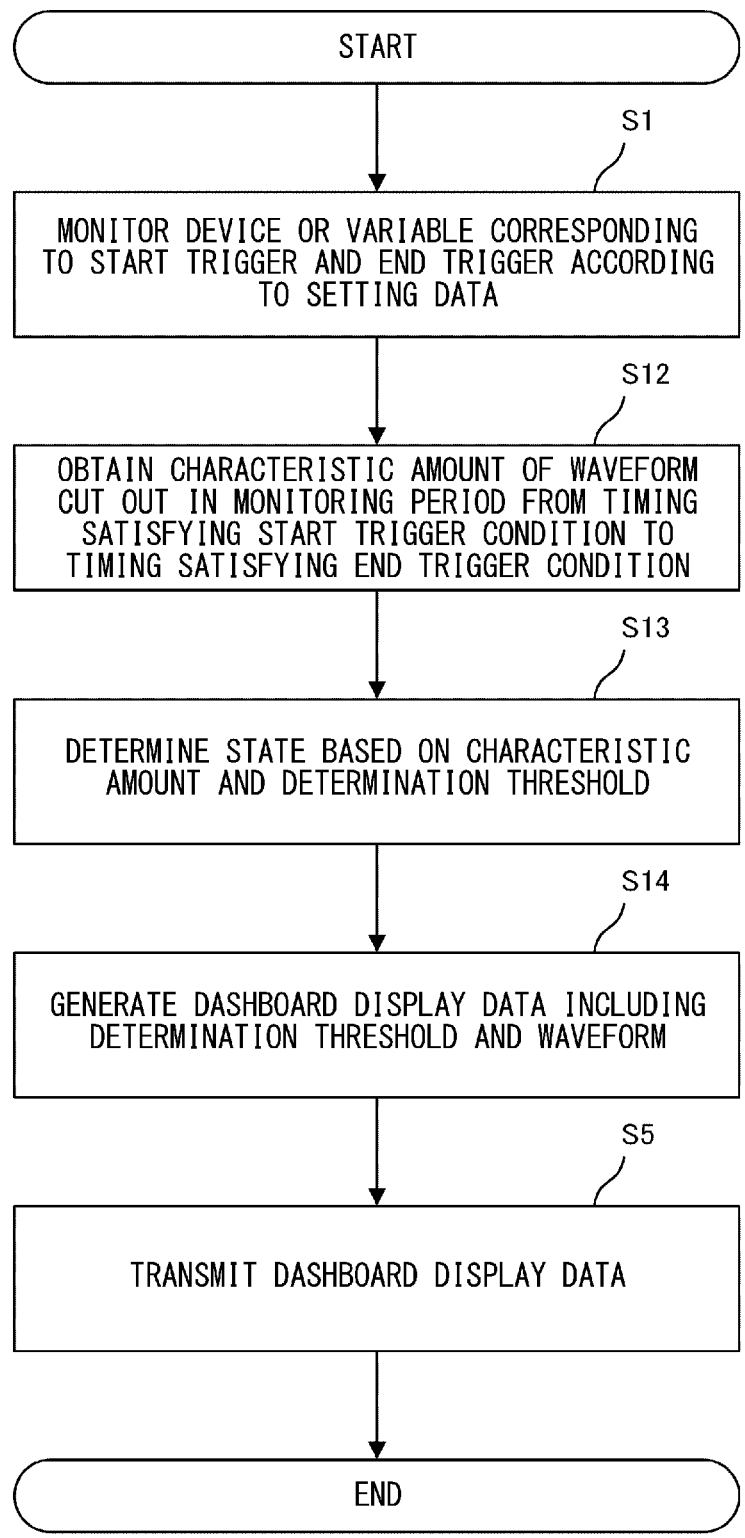
FIG. 38 is a flowchart illustrating waveform monitoring.

Waveform Upper/Lower Limit Monitoring Application and Waveform Guard Band Monitoring Application FIG. 38 is a flowchart illustrating a monitoring process related to the waveform monitoring application. In FIG. 38, the process common to that in FIG. 37 is denoted by the same reference sign, and a description thereof is omitted. Subsequently to the above-described 51, the CPU 41a proceeds to S12.

In S12, the CPU 41a (data processor 83) determines a characteristic amount of a waveform cut out during a monitoring period from the timing of satisfying the start trigger condition to the timing of satisfying the end trigger condition based on the collected data 75 (device value) according to the setting data 73. A characteristic amount in the upper/lower limit monitoring application is a measurement value itself. A characteristic amount in the peak upper/lower limit monitoring is a maximum value (peak value) among all measurement values measured during the monitoring period. A characteristic amount in the bottom upper/lower limit monitoring is a minimum value (bottom value) among all measurement values measured during the monitoring period. A characteristic amount in the change timing monitoring is a time until measurement time when a measurement value exceeds a trigger level for the first time after the start trigger is turned on.

In S13, the CPU 41a (data processor 83) determines a state based on the characteristic amount and the determination threshold. The determination threshold differs according to a determination technique. For example, in the waveform guard band monitoring application, the determination threshold is provided as waveform data (such as a file of a CSV format). As described in S3, the characteristic amount and the determination threshold (upper limit value and lower limit value which are the thresholds of each state) are compared to classify a state of a monitoring target item into the normal state, the caution state, or the warning state.

In S14, the CPU 41a (display processor 84) generates display data 77 for displaying the determination threshold, the waveform (measurement value or characteristic amount), and the determined information (determination result) on the dashboard. The display data 77 of the dashboard 100 is provided to the PC 2a, the PC 2b or the HMI 16 in S5.

[Details of KPI Calculation Application]

Figure 40:
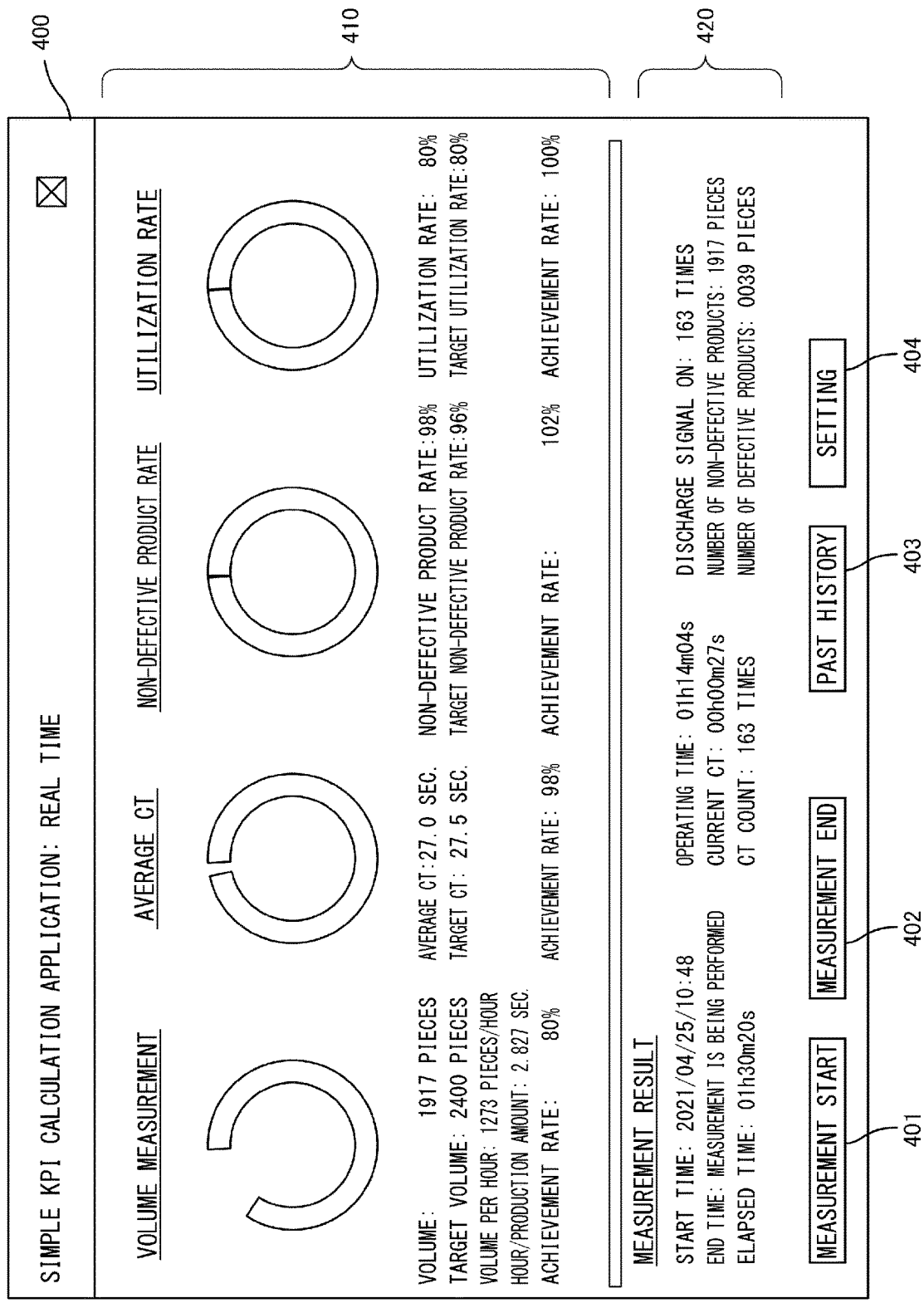
FIG. 40 is a diagram illustrating a dashboard of a KPI calculation application.

FIG. 40 illustrates a dashboard 400 of a KPI calculation application displayed on the PC 2b. The KPI calculation application may, for example, calculate a KPI of a production preparation period. The dashboard 400 of the KPI calculation application displays the calculated KPI. Here, the KPI includes a KPI in a certain period. For example, a volume per hour, a utilization rate, a non-defective product rate, a cycle time, and the like may be included. The KPI calculation application may calculate not only the KPI but also an achievement rate against a target value of the KPI and display the achievement rate. The KPI in the certain period may be a KPI in a measurement period from the time when a measurement start button 401, displayed on the dashboard 400 of the KPI calculation application, has been pressed to the time when a time measurement end button 402 is pressed. In this manner, the KPI in the measurement period designated by a user input may be calculated. Alternatively, a device that specifies the measurement period may be set. In this case, a KPI in a measurement period determined according to a device value of the set device may be calculated.

The dashboard 400 of the KPI calculation application includes an item display part 410 of the KPI and a measurement result display part 420. The item display part 410 displays items related to volume measurement, items related to an average CT (cycle time), items related to the non-defective product rate, and items related to the utilization rate as the KPI items. The measurement result display part 420 displays raw data (measurement results) used for the KPI calculation. The measurement results may include measurement start time, measurement end time, an elapsed time, an operating time, a cycle time, a cycle time measurement count, a product discharge count, the number of non-defective products, number of defective products, and the like. The dashboard 400 of the KPI calculation application displays the KPI calculated based on measurement values from a measurement start to the current time from the measurement start to a measurement end. The dashboard 400 displays the KPI calculated based on measurement values from the measurement start to the measurement end after the measurement end. The dashboard 400 displays the measurement start time based on a user input and a device input in a display field of start time. The dashboard 400 displays the measurement end time based on a user input and a device input in a display field of end time. The dashboard 400 displays a time from the measurement start to the current time in a display field of an elapsed time. The display field of the end time may display a fact that measurement is being performed if the measurement has not yet ended.

The KPI calculation application (flow/dashboard creation part 51) receives a parameter setting for calculating each KPI item. The flow/dashboard creation part 51 receives designations of devices respective corresponding to, for example, an operation signal indicating that a production facility is operating, a discharge signal indicating that a product has been discharged in the production facility, the number of outputs per cycle, and the number of defective products per cycle. As the operation signal, a bit device to be turned on during the operation may be designated. As the discharge signal, a bit device to be turned on each time a product is discharged may be designated. As the number of outputs per cycle, a constant indicating the number of outputs or a word device storing the constant may be designated. As the number of defective products per cycle, a device storing the number of defective products per cycle may be designated.

As the cycle time, a time (measurement value) of a whole cycle measured in the process monitoring application may be designated. The KPI calculation application acquires values measured by other applications, that is, the cycle time or the cycle time measurement count. The KPI calculation application may automatically acquire a measurement value of the whole cycle and the number of times of measurement the cycle time from the process monitoring application. The cycle time measurement count is obtained by counting one-time measurement from a start to an end of the whole cycle. Therefore, the cycle time measurement count indicates the number of repetitions of the whole cycle.

The dashboard 400 displays the operating time measured based on an ON time of the bit device to be turned on during the operation in an operating time display field. The dashboard 400 displays a current cycle time automatically acquired from the process monitoring application in a current CT display field, and displays the cycle time measurement count in a CT count display field. The dashboard 400 displays an ON count of the bit device to be turned on each time the product is discharged in a display field of discharge signal ON. The dashboard 400 displays the number of non-defective products in a display field of the number of non-defective product, and displays the number of defective products in a display field of the number of defective products. The number of non-defective products is a cumulative number of pieces obtained by adding the number of pieces obtained by subtracting the number of defective products per cycle from the number of outputs per cycle each time the discharge signal is turned on. The number of defective products is a cumulative number of pieces obtained by adding the number of defective products per cycle each time the discharge signal is turned on.

The item display part 410 of the dashboard 400 may display each target value entered by the user, each KPI item calculated based on the measurement result, and an achievement rate corresponding to each item together with a graph of the achievement rate. The achievement rate for each item indicates an actual value (calculated KPI) for each target of each KPI item. The volume corresponds to the number of non-defective products. The average CT is obtained by dividing a cumulative value of measurement values of the whole cycle by the cycle time measurement count. The non-defective product rate is obtained by dividing the number of non-defective products by a total number of products. The total number of products is a cumulative number of pieces obtained by adding the number of outputs per cycle each time the discharge signal is turned on. In the example of FIG. 40, the ON count of the discharge signal is 163 times. The number of outputs is 12 pieces. The number of non-defective products is 1917 pieces. Therefore, the non-defective product rate is calculated as 1917/(163×12). The utilization rate is obtained by dividing the operating time by the elapsed time. Note that the dashboard 400 of the KPI calculation application may have a setting button 404 for displaying a setting screen for setting the KPI calculation application and a history display button 403 for displaying a history screen that displays a past history in addition to the real-time screen described above.

Summary

[Viewpoint 1]

The storage apparatus 32 and the memories 42a and 42b may be used as a storage section that stores an application program. The CPUs 31, 41a, and 41b may function as an execution section that executes the application program.

The collector 82 is an example of a collection section that collects symbol values stored in symbols, which are devices or variables serving as collection targets, according to the application program. The flow executer 81 (analyzer 54) may function as a determination section or an analysis section that determines or analyzes whether or not the symbol value collected by the collection section according to the application program satisfies a normal condition set for the application program to detect a status different from usual regarding the symbol value. The display processor 84 functions as a generation section that generates a display screen (e.g., the dashboard 100) including a determination result or an analysis result and information indicating the symbol value collected by the collection section according to the application program. The dashboard 100 may be displayed on either the PC 2a, which is a programming support apparatus, the PC 2b having a web browser, or the HMI 16. The display data 77 required for displaying the display screen may be an image or a video, or may be implemented as a web application. In addition, the symbol value may be collected and displayed in real time. That is, the symbol value may be updated and displayed in real time while the display screen is displayed.

[Viewpoint 2]

The determination section or analysis section (e.g., the flow executer 81) may determine or analyze whether a duration of a process executed by the PLC 1 (e.g., a time from a start trigger to an end trigger) satisfies the normal condition. Note that the duration may be referred to as a monitoring time or a measurement time.

[Viewpoint 3]

The symbol values (e.g., device values or values stored in the variables) may include a device value of a start device indicating a start of the process and a device value of an end device indicating an end of the process. The duration may be a time from a timing when the device value of the start device has changed to a timing when the device value of the end device has changed. The duration may be a time from a first start trigger to a second start trigger. The second start trigger is a start trigger subsequent to the first start trigger. In addition, the duration may be a predetermined time starting from the first start trigger.

[Viewpoint 4]

The collection section (e.g., the collector 82) may collect symbol values for obtaining the duration for each of a plurality of the processes forming one operating cycle (e.g., whole cycle, conveyance process, processing process, inspection process, discharge process, or the like). The generation section (e.g., the display processor 84) may be configured to generate the display screen for displaying the duration for each of the plurality of processes.

[Viewpoint 5]

The display screen may be configured to display a graphical object (e.g., a bar-shaped object) indicative of the duration for each of the plurality of processes, and a graphical object indicative of master data to be contrasted with the duration for each of the plurality of processes. Since the master data is data that indicates the same state as usual, the user may be able to easily recognize any process where an event different from usual has occurred.

[Viewpoint 6]

As described with respect to the asynchronous mode, the graphical object may be displayed to move in one direction on the display screen as time elapses. As described with respect to the synchronous mode, the graphical object may be displayed to extend in one direction starting from a predetermined position on the display screen.

[Viewpoint 7]

The display screen may be configured to display a graphical object (e.g., a vertical line, a horizontal line, a waveform, or a band) indicating the normal condition together with the graphical object.

[Viewpoint 8]

The alerting part 90 may function as a notification section that issues a notification when the symbol value satisfies the notification condition set by the user.

[Viewpoint 9]

Figure 39:
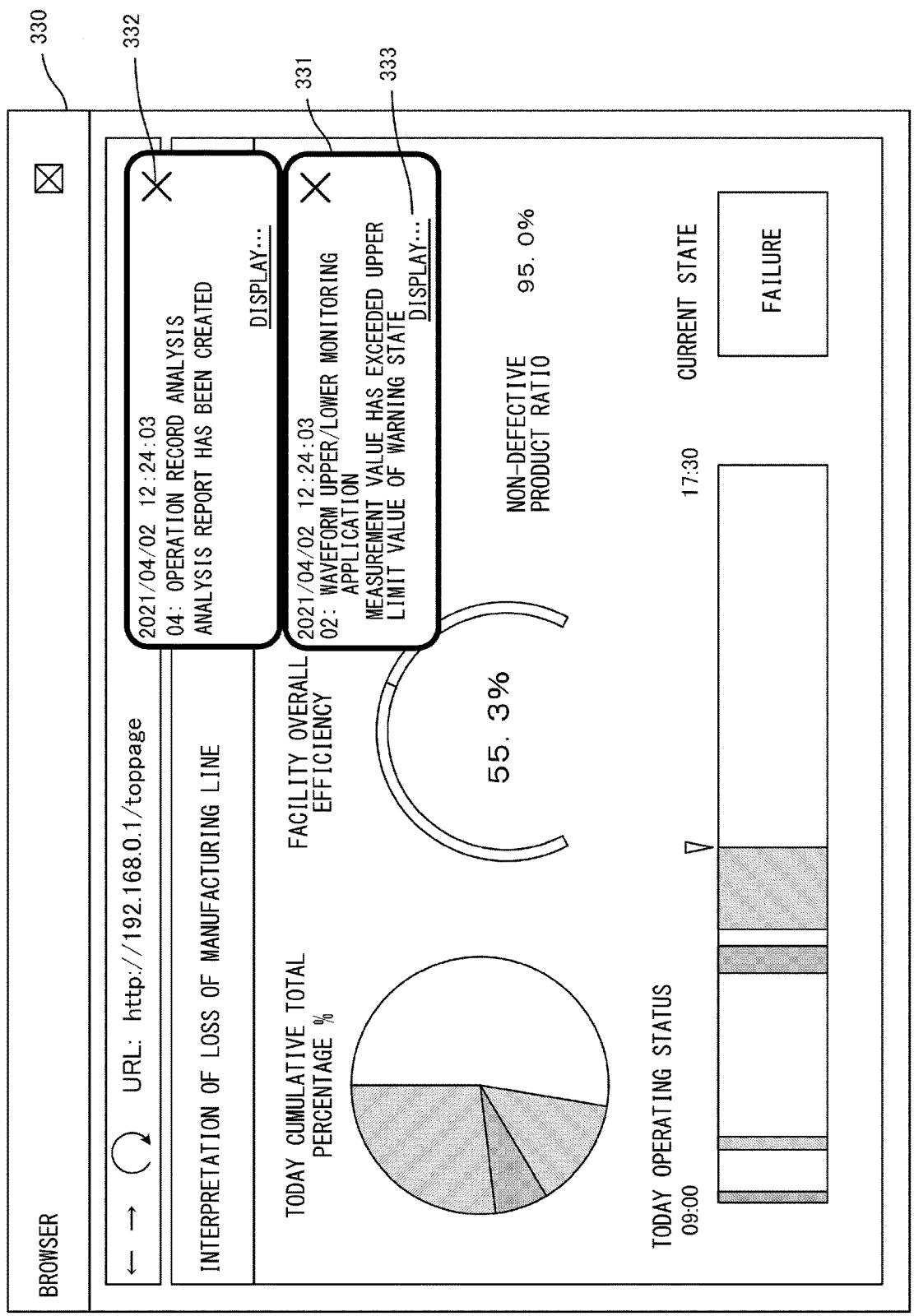
FIG. 39 is a diagram illustrating a notification dialog.

The notification section may be configured to transmit the notification to peripheral equipment that displays the display screen. As exemplified in FIG. 19 and the like, the application notifier 91 may display a notification on the dashboard 100. As exemplified in FIG. 39, the application notifier 91 may display a dialog 331 to be superimposed on a dashboard 330. The dialog 331 may include a message indicating that a monitoring state of an application has changed from the normal state to the caution state or the warning state. When a plurality of notifications are generated at time intervals, the application notifier 91 may display only the most recent notification per monitoring application in the dialog 331. The dialog 331 may be provided with a clear button 332. The application notifier 91 may erase the dialog 331 when detecting that the clear button 332 has been pressed by the user. The application notifier 91 may hold a notification for each monitoring target device. When the clear button 332 is pressed, the application notifier 91 may delete all notifications for the monitoring target devices associated with the dialog 331 including the clear button 332. Note that there is a case where the dashboard 100 or 330 is not displayed on the PC 2*b* or the like when a notification related to a monitoring target device is generated. In this case, the application notifier 91 may display the dialog 331 indicating the notifications that have been held so far on the PC 2*b* when the dashboard 100 or 330 is displayed on the PC 2*b*. Note that the CPU 11 or the HMI 16 of the PC 2*a* or 2*b* may execute polling on the application notifier 91 to acquire a notification and display the dialog 331. A display link 333 is a link for calling the dashboard 100 or 330 of the monitoring application that is monitoring a device notified by the dialog 331. When detecting that the display link 333 has been pressed, the display processor 84 transmits the display data 77 of the dashboard 100 or 330 associated with the display link 333 to the PC 2*b* via the web server 85. As a result, a chart indicating a device value when the notification has been generated is displayed on the dashboard 100 or 330.

[Viewpoint 10]

The event register 92 may function as a registration section that registers a history of an error or an event occurring in the PLC 1. The event register 92 may be configured to perform registration in the history when the symbol value satisfies a registration condition (e.g., the caution state or the warning state). For example, this history may be held by the CPU 31 of the basic unit 3. The event register 92 may request the CPU 31 to perform registration in the history via the internal bus 19.

[Viewpoint 11]

The operation record saving part 93 functions as an operation record saving section that saves the symbol value as an operation record when the symbol value satisfies a saving condition (e.g., the caution state or the warning state). In this case, the CPU 41*a* (flow executer 81) may analyze an operation record and create an analysis report that indicates an analysis result and displays the analysis report on a peripheral apparatus.

[Viewpoint 12]

When a symbol value deviating from the normal condition is detected, the history saving part 94 functions as a history saving section that saves the symbol value, the normal condition, and the display screen as a history. For example, if a symbol value deviating from the normal condition is detected, not only the symbol value but also the display data 77 for the symbol value may be saved.

[Viewpoints 13 and 14]

As illustrated in FIG. 12, the display screen may include a symbol value or a trend graph indicating a trend of time obtained from the symbol value. As illustrated in FIG. 12, the display screen may include a symbol value or a histogram of time obtained from the symbol value.

[Viewpoints 15 and 16]

The setting part 80, the setting wizard 140, and the like function as a setting section that sets the normal condition. As described with reference to FIGS. 32 and 33, the setting section (the threshold setting part 58) may be configured to create the normal condition by applying a predetermined calculation rule to a symbol value acquired in advance. For example, the threshold setting part 58 may use a calculation rule designated by the user as the predetermined calculation rule.

[Viewpoint 17]

The memory 42a may function as a condition storage section that stores a plurality of condition sets having mutually different normal conditions. The bank switcher 59 may function as a selection section that selects one condition set among the plurality of condition sets stored in the condition storage section according to a user instruction. As a result, it may be possible to easily change the normal condition. The plurality of condition sets may be prepared, for example, for each type of product to be produced on a production line controlled by the PLC 1.

[Viewpoint 18]

The stop/resumption part 86 and the switch button 102 are examples of an input section that inputs an instruction related to an execution stop or an execution resumption of the application program. The stop/resumption part 86 stops executing the application program when an instruction related to the execution stop the application program is input. When an instruction related to the execution resumption of the application program is input, the stop/resumption part 86 resumes executing the application program. As a result, the user can easily instruct the stop and the resumption of the application program.

[Viewpoint 19]

The application error detector 87 may be configured to detect an event that prevents a normal execution of the application program and report the event. As such an event, there is a case where a device not used in a ladder program or the like is designated as a monitoring target device. In addition, a case where a variable designated as a monitoring target is not described in a user program may be detected as a kind of error. In addition, a case where a free space of a memory card designated as a saving destination of the collected data 75 and the interpreted data 76 is insufficient may be detected as a kind of error. This is because all of these errors prevent the normal execution of the application program.

[Viewpoint 20]

As illustrated in FIGS. 23, 28, and the like, the generation section (the display processor 84) may generate the display screen such that a plurality of symbol values collected by the collection section as time-series data are displayed as a waveform.

[Viewpoint 21]

As illustrated in FIG. 28, the generation section (the display processor 84) may display a first waveform (thick line), which indicates a plurality of symbol values collected as time-series data by the collection section in a first collection period, and a second waveform (thin line), which indicates a plurality of symbol values collected as time-series data by the collection section in a second collection period prior to the first collection period, to overlap each other. The user may latch the first waveform by performing a latch operation during the display of the first waveform, and use the latched waveform as the second waveform. As a result, it may be easier for the user to contrast the current waveform with some past waveforms.

[Viewpoint 22]

The generation section (the display processor 84) may generate the display screen such that a line, which indicates a threshold (e.g., an upper limit value or a lower limit value of the caution state or the warning state) for regulating a peak value or a bottom value of the waveform, the threshold being included in the normal condition, is displayed together with the waveform. As a result, it may be easier for the user to visually understand how much the peak value or bottom value has a margin for the threshold.

[Viewpoint 23]

As illustrated in FIGS. 26 and 27, the generation section (the display processor 84) may generate the display screen such that a line, which indicates a threshold for regulating a timing at which the symbol value exceeds a predetermined value (e.g., a trigger level), the threshold being included in the normal condition, is displayed together with the waveform.

[Viewpoint 24]

As described with reference to FIGS. 32 and 33, the threshold setting part 58 may function as a threshold determining section that determines a threshold waveform which is a set of a measurement waveform based on the symbol value and a threshold based on a user input. The user input may include, for example, a coefficient (e.g., the value tolerance width my) that is added or subtracted for the measurement waveform. The user input may include designation information for designating a waveform interval (e.g., the time tolerance width mt) before and after a caution timing, the waveform interval being considered to determine a threshold of the caution timing in the threshold waveform among a plurality of the symbol values forming the measurement waveform. As a result, it is possible to easily set the threshold.

[Viewpoint 27]

As illustrated in FIG. 34, the threshold setting part 58 may function as a threshold determining section that determines a threshold waveform which is a set of thresholds based on a free curve drawn by the user.

The invention is not limited to the above embodiment, and various modifications and changes can be made within a scope of a gist of the invention.

What is claimed is:

1. A programmable logic controller comprising:
    a storage section that stores an application program; and
    an execution section that executes the application program,
    wherein the execution section comprises:
    a collection section that collects symbol values stored in symbols, which are devices or variables serving as collection targets, according to the application program;
    a determination section that determines whether or not the symbol value collected by the collection section according to the application program satisfies a normal condition set for the application program to detect a status different from usual regarding the symbol value; and
    a generation section that generates a display screen including a determination result of the determination section and information indicating the symbol value collected by the collection section according to the application program.

2. The programmable logic controller according to claim 1, wherein
    the determination section determines whether or not a duration of a process executed by the programmable logic controller satisfies the normal condition.

3. The programmable logic controller according to claim 2, wherein the symbol values include a device value of a start device indicating a start of the process and a device value of an end device indicating an end of the process, and the duration is a time from a timing at which the device value of the start device has changed to a timing at which the device value of the end device has changed.

4. The programmable logic controller according to claim 3, wherein the collection section collects the symbol value to obtain the duration for each of a plurality of the processes forming one operating cycle, and the generation section is configured to generate a display screen for displaying the duration for each of the plurality of processes.

5. The programmable logic controller according to claim 4, wherein the display screen is configured to display a graphical object indicative of the duration for each of the plurality of processes, and a graphical object indicative of master data to be contrasted with the duration for each of the plurality of processes.

6. The programmable logic controller according to claim 5, wherein the graphical object is displayed so as to move in one direction on the display screen or extend in one direction starting from a predetermined position on the display screen as time elapses.

7. The programmable logic controller according to claim 6, wherein the display screen is configured to display a graphical object indicating the normal condition together with the graphical object.

8. The programmable logic controller according to claim 1, further comprising a notification section that issues a notification when the symbol value satisfies a notification condition set by a user.

9. The programmable logic controller according to claim 8, wherein the notification section is configured to transmit the notification to peripheral equipment that displays the display screen.

10. The programmable logic controller according to claim 8, further comprising a registration section that registers a history of an error or an event occurring in the programmable logic controller, wherein the registration section is configured to register an event related to the notification in the history when the notification section issues the notification.

11. The programmable logic controller according to claim 1, further comprising an operation record saving section that saves the symbol value as an operation record when the symbol value satisfies a saving condition.

12. The programmable logic controller according to claim 1, further comprising a history saving section that saves the symbol value, the normal condition, and the display screen as a history when the symbol value deviating from the normal condition is detected.

13. The programmable logic controller according to claim 1, further comprising a setting section that sets the normal condition, wherein the setting section is configured to create the normal condition by applying a predetermined calculation rule to a symbol value acquired in advance.

14. The programmable logic controller according to claim 13, wherein the setting section uses a calculation rule designated by a user as the predetermined calculation rule.

15. The programmable logic controller according to claim 1, further comprising:

a condition storage section that stores a plurality of condition sets having mutually different conditions each serving as the normal condition; and a selection section that selects one condition set among the plurality of condition sets stored in the condition storage section according to a user instruction.

16. The programmable logic controller according to claim 1, further comprising an input section that inputs an instruction related to an execution stop or an execution resumption of the application program, wherein the execution section stops executing the application program when an instruction related to the execution stop of the application program is input, and resumes executing the application program when an instruction related to the execution resumption of the application program is input.

17. The programmable logic controller according to claim 3, wherein the generation section is configured to generate the display screen so as to display a plurality of symbol values, collected as time-series data by the collection section, as a waveform.

18. The programmable logic controller according to claim 17, wherein the generation section is configured to display a first waveform, which indicates a plurality of symbol values collected as time-series data by the collection section in a first collection period, and a second waveform, which indicates a plurality of symbol values collected as time-series data by the collection section in a second collection period prior to the first collection period, to overlap each other.

19. The programmable logic controller according to claim 17, wherein the generation section is configured to generate the display screen such that a line, which indicates a threshold for regulating a peak value or a bottom value of the waveform, the threshold being included in the normal condition, is displayed together with the waveform.

20. The programmable logic controller according to claim 17, wherein the generation section is configured to generate the display screen such that a line, which indicates a threshold for regulating a timing at which the symbol value exceeds a predetermined value, the threshold being included in the normal condition, is displayed together with the waveform.

* * * * *